(12) United States Patent
Sahashi et al.

(10) Patent No.: US 6,491,440 B1
(45) Date of Patent: Dec. 10, 2002

(54) WHEEL BEARING APPARATUS

(75) Inventors: Koji Sahashi, Iwata (JP); Motoharu Niki, Iwata (JP); Eiji Tajima, Iwata (JP); Akira Torii, Iwata (JP); Kazuhiko Hozumi, Iwata (JP); Keisuke Sone, Iwata (JP); Masahiro Ozawa, Iwata (JP); Nobuyoshi Yamashita, Iwata (JP); Yutaka Yamauchi, Iwata (JP); Masayuki Kuroda, Osaka (JP); Masuo Takaki, Osaka (JP)

(73) Assignee: NTN Corporation, Osaka (JP)

( * ) Notice: Subject to any disclaimer, the term of this patent is extended or adjusted under 35 U.S.C. 154(b) by 2 days.

(21) Appl. No.: 09/666,590

(22) Filed: Sep. 20, 2000

(30) Foreign Application Priority Data

| Sep. 22, 1999 | (JP) | ............................................ | 11-269037 |
| Oct. 27, 1999 | (JP) | ............................................ | 11-305865 |
| Nov. 5, 1999 | (JP) | ............................................ | 11-315927 |
| Dec. 15, 1999 | (JP) | ............................................ | 11-356430 |
| Feb. 17, 2000 | (JP) | ............................................ | 2000-040069 |

(51) Int. Cl.$^7$ ............................................ F16C 19/08
(52) U.S. Cl. ............................................ 384/544
(58) Field of Search ............................................ 384/544, 513, 384/589, 569, 537

(56) References Cited

U.S. PATENT DOCUMENTS 5,975,767 A * 11/1999 Mizukoshi et al. ......... 277/321
6,059,374 A * 5/2000 Goddard .................... 188/18 A

* cited by examiner

*Primary Examiner*—Lenard A. Footland
(74) *Attorney, Agent, or Firm*—Arent Fox Kintner Plotkin & Kahn, PLLC

(57) ABSTRACT

A tire wheel bearing apparatus comprises an outer member having multi rows of track surfaces integrally provided on an inner periphery, an inner member having a tire wheel mounting flange provided at one end thereof, a cylindrical small diameter step portion provided at another end thereof and double-rows of track surfaces formed on the inner wheels force fitted to the small diameter step portion so as to oppose to the track surfaces of the outer member, and double-rows of rolling elements respectively interposed between the track surfaces in the outer member and the inner member, the inner wheels being fixed to the inner member by radially outwardly caulking the end portion of the small diameter step portion of the inner member, the track surfaces in the outer member and the inner member and the rolling elements has a contact angle with a bearing clearance being set to be negative.

3 Claims, 36 Drawing Sheets

$P_0 > P_1 + P_2$
$\triangle a = \triangle a' - S$

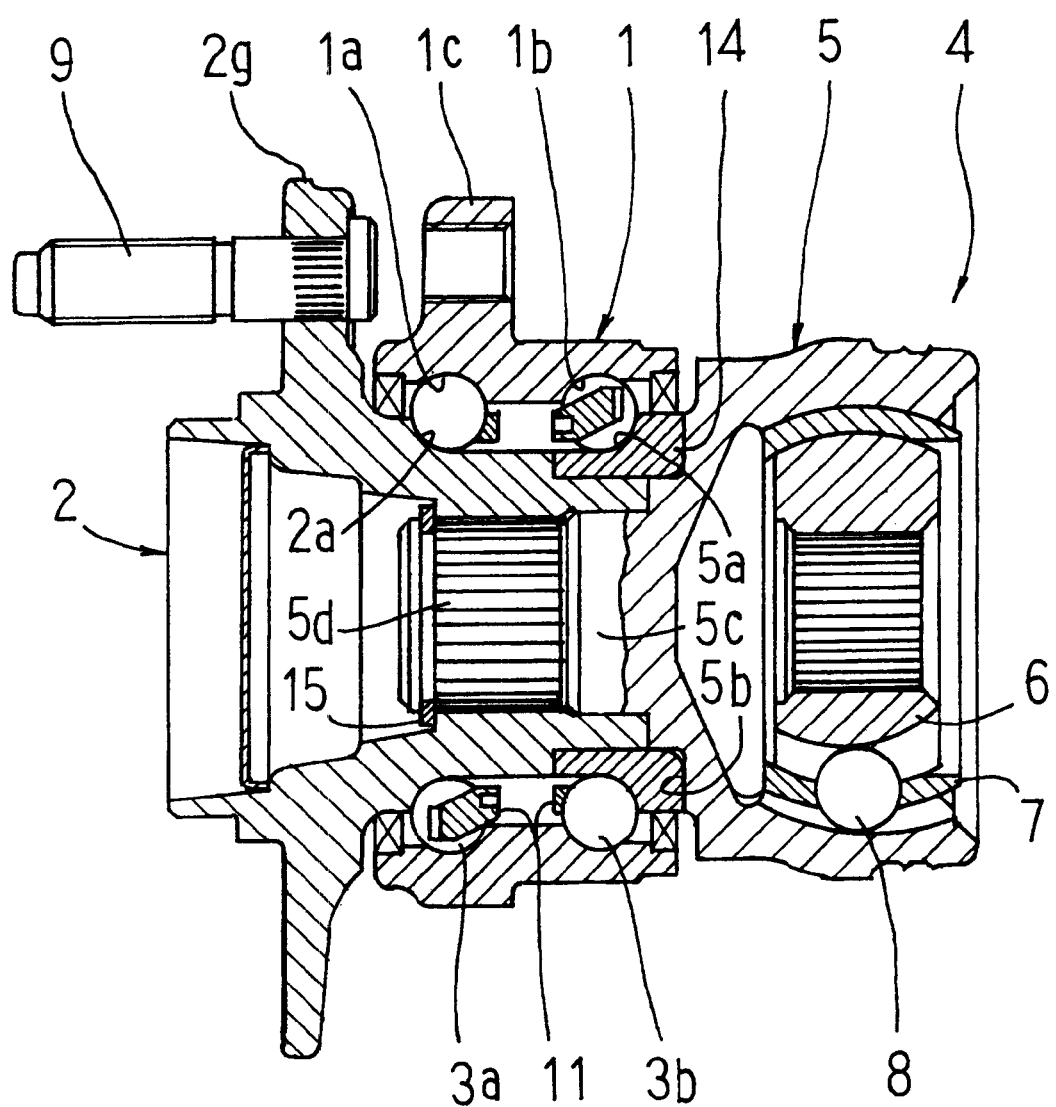

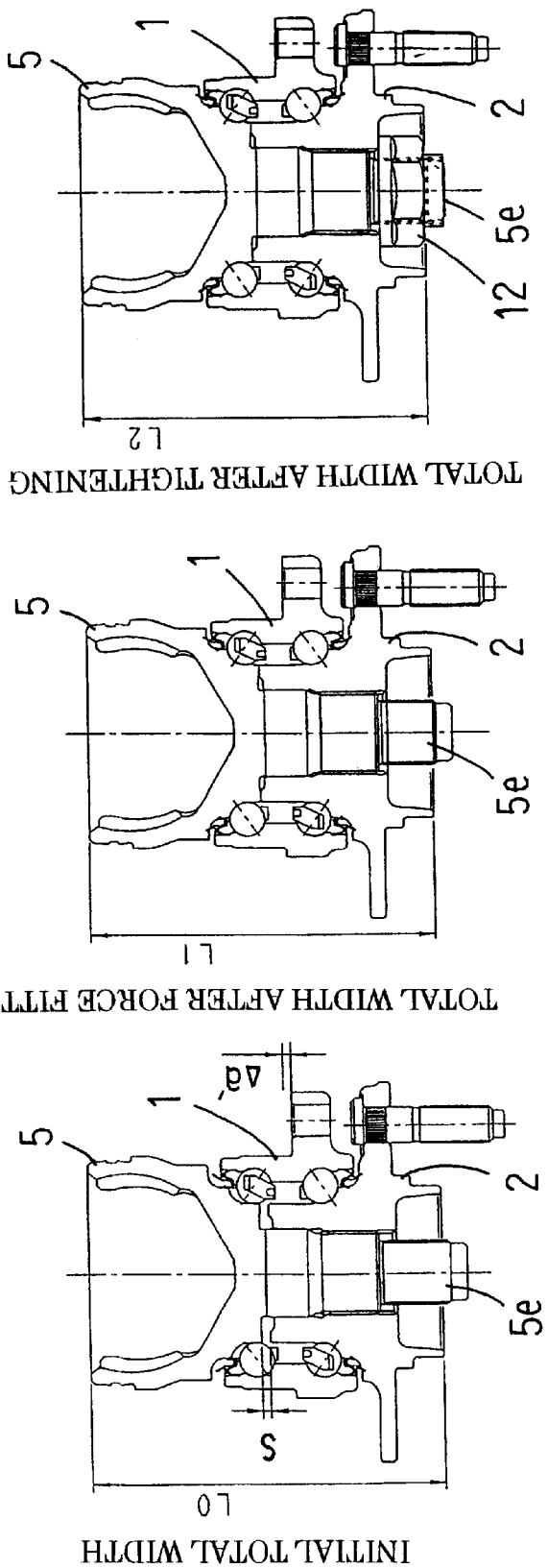

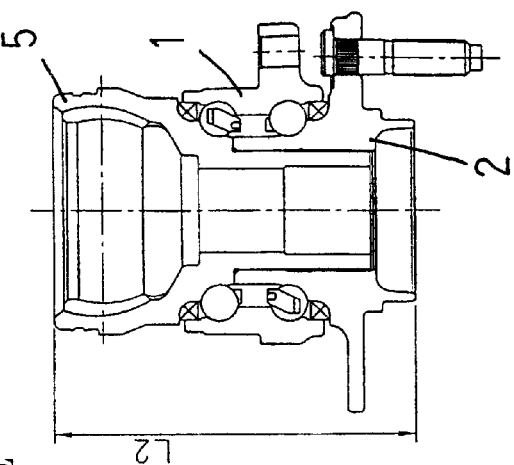
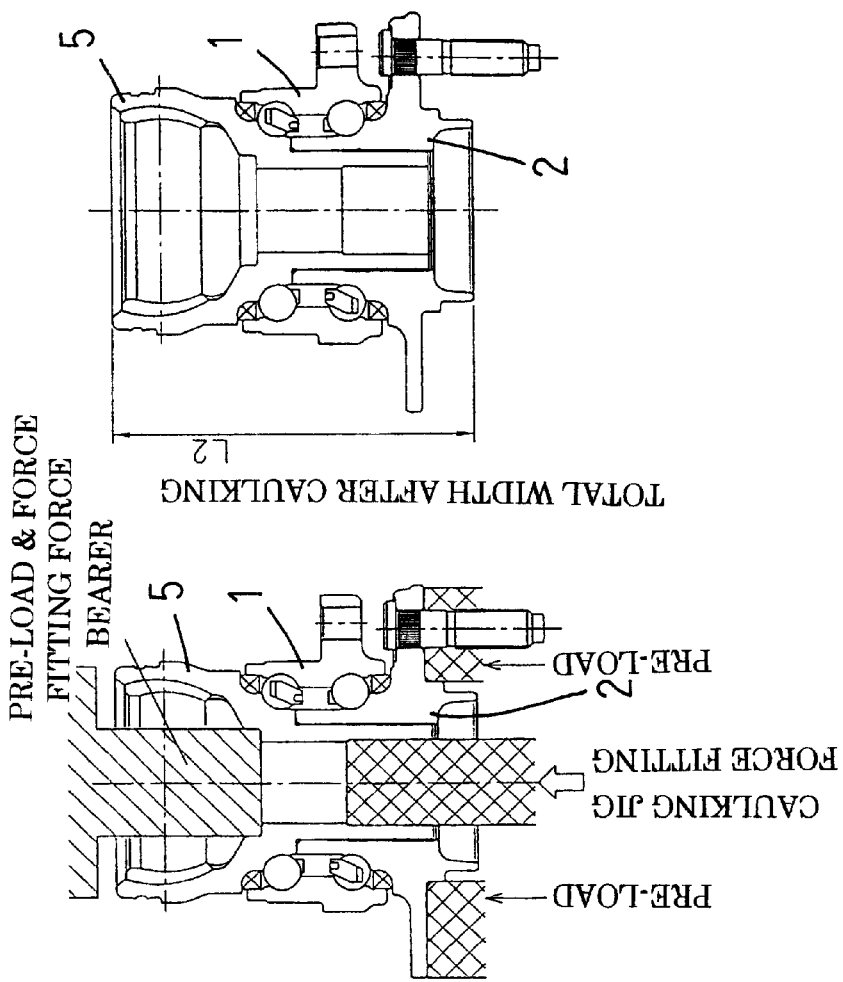
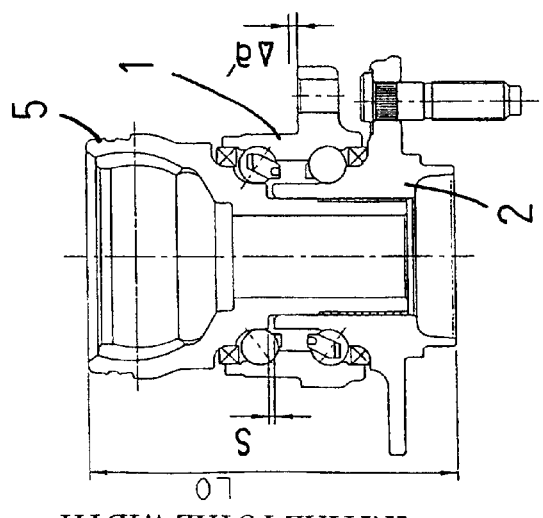

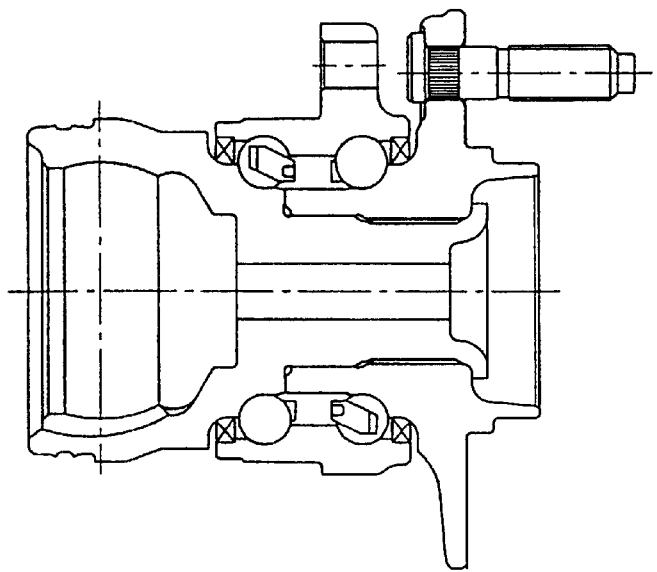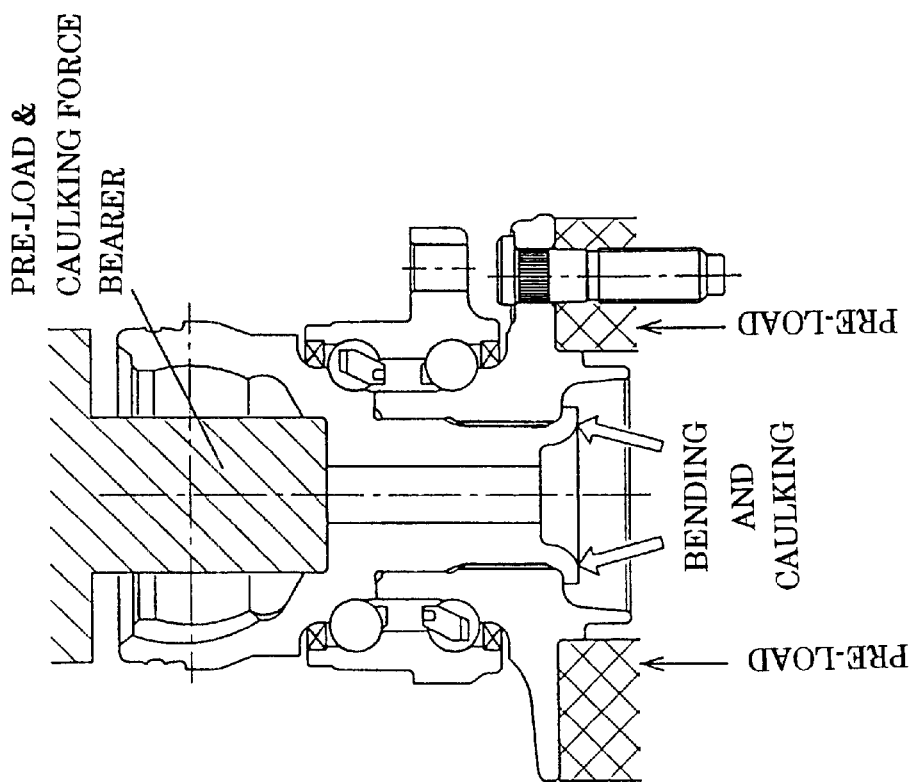

WHEEL BEARING APPARATUS

BACKGROUND OF THE INVENTION

1. Field of the Invention

The present invention relates to a tire wheel bearing apparatus for use in an automobile.

2. Description of the Prior Art

FIG. 4 shows an embodiment of a tire wheel bearing apparatus used in an automobile and a structure in the case of being employed for a driven wheel. The bearing apparatus is structured such that a hub wheel 1 is rotatably supported by an axle bearing 2, a tire wheel is fixed to the hub wheel 1 and the axle bearing 2 is supported by a suspension apparatus of a vehicle body via a knuckle 3. The axle bearing 2 is a double-row ball-or roller bearing and is constituted by an outer wheel 6 in which double-rows of track surfaces 4 and 5 are formed on an inner diameter surface, inner wheels 9 and 10 in which track surfaces 7 and 8 are formed on an outer diameter surface, double-rows of rolling elements 11 interposed between the outer wheel 6 and the inner wheels 9 and 10, and a retainer 12 retaining the rolling elements 11 in the respective rows at equally spaced interval in a circumferential direction. The outer wheel 6 is force fitted to the knuckle 3 and fixed by a stop ring 13. In order to prevent foreign materials from entering into the axle bearing 2 and prevent a grease filled therewithin from leaking out, seals 14 and 15 are provided. In the illustrated example, a double-row angular ball bearing is employed as the axle bearing 2. The hub wheel 1 is provided with a flange 16, and hub bolts 17 for fixing the tire wheel is mounted to the flange 16 at equally spaced interval in a circumferential direction. Further, a brake rotor 18 is fixed to the flange 16 of the hub wheel 1 by the hub bolts 17. The inner wheels 9 and 10 of the axle bearing 2 are force fitted to an outer diameter of an end portion of the hub wheel 1, and a protruding end portion of the hub wheel 1 is fixed by a nut 19, whereby an assembly is performed.

In the conventional tire wheel bearing apparatus mentioned above, since the outer wheel 6 of the axle bearing 2 is force fitted to the knuckle 3 having the outer non-circular profile in a strong tight manner, there is a case that the track surfaces 4 and 5 of the outer wheel 6 are deformed. Due to the deformation mentioned above, an axial run out of the bearing or the like is deteriorated, and an axial run out (or a surface run out) is generated in the brake rotor 18 mounted to the flange 16 of the hub wheel 1 after force fitted to the knuckle 3, thereby causing a vibration at a time of braking after a high speed travel of the automobile and causing uneven wear of the brake. Further, it can be considered that a high preload is applied so as to increase a rigidity of the bearing, however, since there is a fitting portion between the hub wheel 1 and a pair of inner wheels 9 and 10 and between the outer wheel 6 and the knuckle 3, it is unavoidable that a dispersion range of a gap reduction amount due to the preload is increased in view that the fitting tolerances are accumulated, so that the structure can not always apply a sufficient preload.

SUMMARY OF THE INVENTION

Accordingly, an object of the present invention is to provide a tire wheel bearing apparatus which can restrict an axial run out of a brake rotor by improving a rigidity of a bearing.

According to an embodiment of the present invention, a tire wheel bearing apparatus comprises:

an outer member having double-rows of track surfaces integrally provided on an inner periphery;

an inner member having a tire wheel mounting flange provided at one end thereof, a cylindrical small diameter step portion provided at another end thereof and double-rows of track surfaces formed by force fitting the inner wheel to the small diameter step portion so as to oppose to the track surfaces of the outer member; and double-rows of rolling elements interposed between both of the track surfaces in the outer member and the inner member;

the inner wheel force fitted being fixed to the inner member by caulking the end portion of the small diameter step portion of the inner member radially outwardly, wherein each of the rolling elements is installed between the track surfaces in the outer member and the inner member with contact agnle, and a bearing clearance is set to be negative.

The present invention is applicable to a structure of the type in which the track surface in the tire wheel mounting flange side among the track surfaces of the inner member is directly formed on an outer periphery of the inner member, as well.

In accordance with the present invention, the following advantages can be obtained:

(1) It is possible to so design that a span of the bearing is set to be wide within the same space and it is possible to largely improve a rigidity of the bearing.

(2) It is possible to change specifications of the inner portion within the same space, increase the number of the rolling elements so as to improve the rigidity of the bearing and optimize a thickness of the outer member and a thickness of the flange so as to restrict a deformation of the outer member, thereby improving the rigidity of the bearing.

(3) It is possible to restrict a dispersion range of an amount of a preload after being assembled to a narrow range. The higher the preload is, the higher the rigidity of the bearing is. In the tire wheel bearing apparatus in accordance with the present invention, since the number of the fitting portion is reduced, a dispersion component of the gap reduction amount due to the fitting tolerance becomes zero, so that a low preload area generated due to the accumulation of the tolerance is eliminated.

In the tire wheel bearing apparatus in accordance with the present invention, the structure can be made such that the rolling element is a ball. Further, the structure can be made such that a vehicle body mounting flange is integrally formed on an outer periphery of the outer member, the inner member is formed in a hollow shape, and an uneven engaging structure for transmitting a torque, for example, any one selected among a serration, a spline and a key is integrally provided in the inner member.

The bearing rigidity can be easily improved, and the axial run out of the brake rotor can be restricted in the case of attaching the brake rotor to the tire wheel mounting flange of the inner member. Further, in the bearing structure, since the inner wheel force fitted is fixed to the inner member by caulking the end portion of the small diameter step portion of the inner member radially outwardly, it is possible to easily realize the light weight and the compact size of the whole of the apparatus.

Further, when the structure is made such that the inner member is formed in a hollow shape, or the uneven engagement portion for transmitting the torque, for example, any one selected among the serration, the spline and the key, is integrally provided in the inner member, the tire wheel bearing apparatus in accordance with the present invention can be commonly used for the drive wheel in addition to the structure for the driven wheel. In the drive wheel side, at a time of assembling the constant velocity joint, it is not necessary to adjust the bearing clearance due to the control of the fastening torque of the nut.

Another object of the present invention is to provide a tire wheel bearing apparatus which can more restrict uneven wear of a brake rotor and a brake judder by paying attention to the other reasons for generating a surface run out of the brake rotor then an improvement of accuracy in each of the parts themselves.

According to another embodiment of the present invention, a tire wheel bearing apparatus comprises:

an outer member having double-rows of track surfaces on an inner periphery;

an inner member having track surfaces opposing to the respective track surfaces;

a bearing constituted by double-rows of rolling elements interposed between the outer member and the inner member;

the inner member and a connected member being integrally by fastening means; and a tire wheel mounting flange being provided in any one of the outer member, the inner member and the connected member, wherein a preload is applied to the bearing and the inner member and the connected member are integrally connected by the fastening means with a predetermined axial force or more. In this case, for example, in the case of applying the present invention to the bearing apparatus of the front wheels of the Front Wheel drive vehicle, the connected member becomes an outer joint member of a constant velocity joint. Further, the present invention can be applied to a structure that the outer member is rotated in addition to the structure that the inner member is rotated.

In addition to the improvement of each of the parts themselves such as the run out of the mounting surface of the brake rotor itself, the flange run out of the hub wheel itself, the axial run out of the bearing, the assembling error (the misalignment) or the like, the rigidity of the bearing itself and the axial force between the inner member and the connected member can be improved, thereby further restrict the surface run out of the brake rotor and completely preventing the uneven wearof the brake rotor and the brake judder in an easy manner. Specifically, a rigidity of the bearing itself can be increased by applying the preload to the bearing, and a combining force (an axial force) between the inner member and the connected member can be increased by integrally connecting the inner member to the connected member by the fastening means with the predetermined axial force or more. Accordingly, in the case that the automobile is turned, since the predetermined axial force or more exists even when a load in a direction opposing to the axial force is generated due to a moment load or the like, the connection portion may not have an end playis not shaky, so that it is possible to restrict a surface run out of the brake rotor.

In the present invention, the preload is applied to the bearing, however, it is desirable to set an amount of the preload of the bearing to 981 to 9810 N (100 to 1000 kgf). When the amount of the preload is smaller than 981 N (100 kgf), it is hard to increase a rigidity of the bearing itself and the bearing clearance causes the surface run out of the brake rotor. On the contrary, when the amount of the preload is greater than 9810 N (1000 kgf), it is possible to increase the rigidity of the bearing itself, however, since the load of the bearing is increased at that degree, an excessive preload invites reduction of a service life of the bearing. Further, the axial force for integrally connecting the inner member to the connected member by the fastening means is preferably set to 9810 N (1000 kgf) or more.

Further, in accordance with the present invention, the structure is desirably made such that in the tire wheel bearing apparatus in which the brake rotor is mounted to the tire wheel mounting flange, a width of the run out of the brake rotor is restricted to a standard value in a state of being assembled in the automobile when rotating the brake rotor with reference to a fixed side member of any one of the outer member and the inner member. The tire wheel bearing apparatus with the brake rotor in which the width of the run out is previously restricted as mentioned above has a high reliability, and the problem of the surface run out of the brake rotor can be solved by using the apparatus as it is in the automobile assembling plant. In this case, it is desirable that the standard value of the axial run out of the brake rotor is set to 50 $\mu$m or less.

Other object of the present invention is to provide a bearing apparatus for a drive wheel which can solve the problems in the prior art mentioned above, is compact and light and improves a durability.

In accordance with other embodiment of the present invention, a bearing apparatus for a drive wheel comprises:

a tire wheel bearing portion in which a rolling element is assembled between an outer member having a mounting flange for mounting to a vehicle body and an inner member having a tire wheel mounting flange for mounting a tire wheel so as to rotatably support the inner member;

a constant velocity joint portion provided at one end of a drive shaft and constituted by an outer joint member having a track groove formed on an inner periphery, an inner joint member having a track groove opposing to the track groove of the outer joint member formed on an outer periphery, and a ball assembled between the track groove of the outer joint member and the track groove of the inner joint member;

a rotation of the outer joint member in the constant velocity joint portion being transmitted to the inner member of the tire wheel bearing portion, wherein a serration portion fitted to the inner member is formed in the outer joint member by hardening, the outer joint-member has a caulked portion at an end portion, and the caulked portion is not hardened.

In accordance with the present invention, the non-hardened area having a low hardness is provided in the end portion of the outer peripheral surface of the inner fitting member among the inner member (the hub wheel) and the outer joint member fitted to each other, whereby there can be obtained a hardening pattern optimum for the bearing apparatus for the drive wheel of the type caulking the end portion so as to connect both of the members. That is, since the portion serving as the connecting means between the inner member and the outer joint member can be stably caulked by applying a service life resistance to the track surface on which the rolling elements roll, in particular, the inner track surface portion and on the contrary providing the non-hardened area in the end portion, it is possible to obtain the bearing apparatus for the drive wheel with no preload extraction and having a compact structure. Further, since the connection between the inner member and the outer joint member is not performed by welding, it is possible to solve the disadvantages that a thermal strain is generated on the track surface or the like. The torque transmission between both of the elements can be securely achieved by the serration portion.

The rolling element may be constituted by double-rows of rolling elements, double-rows of outer track surfaces are formed on the outer member, and one of double-rows of inner track surfaces opposing to the double-rows of outer track surfaces is arranged in the inner member and the other in the outer joint member. Here, since it is possible to employ a spline in place of the serration as is well known, the serration in this case means a serration or a spline. Further, the axial size is made 10% or more compact by forming the track surface (the inner track surface in the inboard side) in the outer joint member of the constant velocity joint. A turning radius of the automobile is restricted by the maximum operating angle of the fixed type constant velocity joint. Accordingly, in recent years, there is required a constant velocity joint which can set the operating angle to be greater for reducing the turning radius. The bearing apparatus for the drive wheel in accordance with the present invention is compact in the axial direction so as to coincide the center of operation of the fixed type constant velocity joint with the center of the king pin, thereby making the turning radius of the automobile small.

A continuous hardened layer may be formed between the another inner track surface portion and the serration portion among an outer surface of the outer joint member.

The outer joint member may be of a carbon steel containing 0.45 weight % or more carbon amount. By using the carbon steel containing 0.45 weight % or more, preferably 0.5 to 0.7 weight % carbon amount for the material constituting the outer joint member, it is possible to provide a portion in which a desired hardened layer is formed in accordance with a heat treatment and a portion having a ductility for being caulked, in the outer joint member. Further, by making the outer joint member of the carbon steel containing 0.45 weight % or more carbon amount, it is sufficiently secure a rolling fatigue service life (a flaking service life) of the another inner track surface (the inner track surface on the inboard side) formed in the outer joint member, in spite of a load repeatedly applied from the rolling elements. That is, in order to secure the rolling fatigue service life, it is necessary to set a hardness of the surface portion of the inner track surface in the inboard side to be high to a degree, for example, about Hv 550 to 900. When the hardness of the surface portion is low, the rolling fatigue service life of the inner track surface in the inboard side becomes short. In the case of forming the outer joint member by the carbon steel containing the carbon less than 0.45 weight %, a necessary hardness can not be obtained even if a hardening treatment is applied to the inner track surface on the inboard side. On the contrary, since the outer joint member is made of the carbon steel containing 0.45 weight % or more carbon amount and the inner track surface portion in the inboard side is hardened in accordance with a hardening treatment, it is possible to sufficiently increase the hardness of the inner track surface portion in the inboard side so as to secure a rolling fatigue service life of the inner track surface portion in the inboard side. Even in the case of securing the rolling fatigue service life of the inner track surface portion in the inboard side in the manner mentioned above, an axial end portion of the outer joint member is kept raw without being applied a hardening treatment. Accordingly, it is not troublesome to work the caulked portion for connecting the outer joint member and the hub wheel.

The outer joint member before being hardened may have hardness between Hv 200 and 300.

A hardened layer may be formed on an inner surface of the inner member. Since the hardened layer is formed on the inner surface of the inner member, it is possible to prevent the inner member from being deformed even when a great load is applied to the inner member together with the caulking process of the axial end portion of the outer joint member, thereby preventing a bearing clearance (positive or negative) from being shifted from a desired value. That is, in order to caulk and widen the axial end portion of the outer joint member so as to form the caulked portion, it is necessary to apply a great load directing outward in a diametrical direction to this axial end portion. As a result, a great surface pressure is applied to the inner peripheral surface and the end surface of the inner member together with a forming operation of the caulked portion. Accordingly, when the hardness of the inner member is low, the inner member is deformed due to the surface pressure mentioned above and the bearing clearance is shifted from the desired value. On the contrary, since the hardened layer is formed on the inner surface of the inner member, a hardness of the inner member is sufficiently high, so that it is possible to prevent the inner member from being deformed in spite of the great surface pressure, and it is possible to keep the bearing clearance in the desired value. Further, it is possible to prevent the diameter of the one inner track surface (the inner track surface on the outboard side) formed on the outer peripheral surface of the inner member from being changed and prevent an accuracy of shape (deviation from circular form and cross sectional shape) from being deteriorated, thereby preventing the rolling fatigue service life of the inner track surface on the outboard side from being reduced.

The constant velocity joint part may comprise an outer joint member in which eight curved track grooves extending in an axial direction are formed on a spherical inner peripheral surface, an inner joint member in which eight curved track grooves extending in an axial direction are formed on a spherical outer peripheral surface, torque transmitting balls assembled in each of eight ball tracks formed by pairs of the track grooves of the outer joint member and the track grooves of the inner joint member one by one, and a retainer for retaining the torque transmitting balls within the same plane. It is possible to achieve a light weight, a compact size, a low heat generation and a high efficiency in comparison with the constant velocity joint using six torque transmitting balls by employing the constant velocity joint using eight torque transmitting balls, and a light weight can be achieved by being integrally formed with the tire wheel bearing together with the compact size in the axial direction. It becomes very important in view of protecting an environment and saving an energy to reduce the weight of the whole of the automobile. In the parts used in the tire wheel portion such as the bearing apparatus for the drive wheel, it is possible to reduce an unsprung weight, thereby largely improving a steering stability of the automobile and applying a comfortable feeling. Further, a torque loss at a time of transmitting a rotational force is 30% improved, and the effect can be further improved particularly when a large operating angle is employed. Since the heat generation from the constant velocity joint at a time of driving can be about 20° C. reduced in comparison with the comparative products, an influence with respect to the bearing service life can be reduced even when forming the track surface in the outer joint member of the constant velocity joint. Since the heat radiating performance of the constant velocity joint and the bearing portion is improved by employing the hollow structure, the resisting service life of the constant velocity joint and the bearing portion is largely improved and a reliability is increased.

The ratio ($r1 = PCD_{BALL}/D_{BALL}$) between a pitch circle diameter ($PCD_{BALL}$) of the torque transmitting ball and a diameter ($D_{BALL}$) of the torque transmitting ball may be equal to or more than 3.3 and equal to or less than 5.0 ($3.3 \leq r1 \leq 5.0$). Here, the pitch circle diameter ($PCD_{BALL}$) of the torque transmitting ball is twice a length of a line connecting between a center of the track groove of the outer joint member or a center of the track groove of the inner joint member and a center of the torque transmitting ball ($PCD_{BALL} 2 \times PCR$). The length of the line connecting between the center of the track groove of the outer joint member and the center of the torque transmitting ball is equal to the length of the line connecting between the center of the track groove of the inner joint member and the center of the torque transmitting ball. Accordingly, a constant velocityity of the joint can be secured. Hereinafter, the size is referred to as "PCR". The relation $3.3 \leq r1 \leq 5.0$ is established because a strength of the outer joint member or the like and a load volume and a durability of the joint can be secured to be equal or more that of the structure using six torque transmitting balls. That is, in the constant velocity joint, it is hard to widely change the pitch circle diameter ($PCD_{BALL}$) of the torque transmitting ball within a limited space range. Accordingly, a value r1 is mainly dependent upon the diameter ($D_{BALL}$) Of the torque transmitting ball. In the case that the ratio r1 is smaller than 3.3 ($r1<3.3$) mainly corresponding to the case that the diameter $D_{BALL}$ is great, a thickness of the outer joint member, the inner joint member and the other parts is too thin to generate a risk in view of strength. On the contrary, in the case that the ratio r1 is over 5.0 ($r1>5.0$) mainly corresponding to the case that the diameter $D_{BALL}$ of the torque transmitting ball is small, the load volume becomes small, thereby generating a risk in view of durability. Further, since a contact oval of a contact portion becomes small when the diameter $D_{BALL}$ becomes small, a surface pressure of the contact portion between the torque transmitting ball and the track groove is increased, and there is a risk of causing a lack of a groove shoulder edge portion in the track groove or the like. By establishing the relation $3.3 \leq r1 \leq 5.0$, it is possible to secure the strength of the outer joint member and the load volume and the durability of the constant velocity universal joint to be equal or more than those of the structure using six torque transmitting balls.

The ratio $r2$ ($=D_{OUTER}/PCD_{SERR}$) between an outer diameter ($D_{OUTER}$) of the outer joint member and a pitch circle diameter ($PCD_{SERR}$) of a tooth form formed in an axial hole of the inner joint member may be equal to or more than 2.5 and equal to or less than 3.5 ($2.5 \leq r2 \leq 3.5$). The relation $2.5 \leq r2 \leq 3.5$ is established for the following reasons. That is, the pitch circle diameter ($PCD_{SERR}$) of the tooth form of the inner joint member can not be largely changed in connection with a strength of an opposing shaft or the like. Accordingly, the value r2 is mainly dependent upon the outer diameter ($D_{OUTER}$) of the outer joint member. In the case that the value r2 is smaller than 2.5 mainly corresponding to the case that the outer diameter $D_{OUTER}$ is small, a thickness of the outer joint member, the inner joint member and the other parts is too thin to generate a risk in view of a strength. On the contrary, in the case that the ratio r2 is over 3.5 mainly corresponding to the case that the outer $D_{OUTER}$ is great, there is a case that a problem on practical use is generated in view of a size or the like, and it is impossible to achieve a target for making compact. By establishing the relation $2.5 \leq r2 \leq 3.5$, it is possible to secure the strength of the outer joint member and the like and the durability of the joint to be equal or more than those of the structure using six torque transmitting balls, and it is possible to satisfy a requirement on practical use. In particular, there is an advantage that the outer size can be made compact by establishing the relation $2.5 \leq r2 > 3.2$. In this case, in the structure using six torque transmitting balls, the relation $r2 \geq 3.2$ is generally established.

A hollow cylindrical portion may be provided in at least an end portion of the shaft portion of the outer joint member.

The hollow cylindrical portion may extend through the shaft portion of the outer joint member so as to be communicated with a bottom of the mouth portion.

The bearing apparatus for a drive wheel may comprise:
  a bearing portion in which a rolling element is assembled between an outer member having a mounting flange for mounting to a vehicle body and a hub wheel having a tire wheel mounting flange for mounting a tire wheel so as to rotatably support the hub wheel;
  a constant velocity joint portion provided at one end of a drive shaft and constituted by an outer joint member having a track groove formed on an inner periphery, an inner joint member having a track groove opposing to the track groove of the outer joint member formed on an outer periphery, and a ball assembled between the track groove of the outer joint member and the track groove of the inner joint member;
  the outer joint member of the constant velocity joint portion and the hub wheel of the bearing portion being fitted to each other so as to transmit a rotation of the outer joint member to the hub wheel,
  wherein the fitting portion is formed by an inserting portion and a serration portion, and an end portion of an inner fitting member among the outer joint member and the hub wheel fitted to each other is caulked so as to fix both elements.

The inserting portion may be shorter than a length of the serration portion. By setting a relation between a length LF of the inserting portion and a length LS of the serration portion to LS>LF, the serration portion at first starts engaging at a time of assembling the outer joint member in the hub wheel, and an inserting operation is started after a phase in a peripheral direction is aligned, so that a force fitting operation can be easily performed.

The length of the inserting portion may be one fourth or more of a diameter of the inserting portion. Since a radial load of the bearing is applied to the inserting portion, the surface pressure becomes high in the case that the length of the inserting portion is less than one fourth of the axial diameter of the inserting portion, thereby causing a problem.

A fastening margin of the inserting portion may be equal to or more than 0 and equal to or less than 60 $\mu$m. A lower limit of the fastening margin of the inserting portion is set to $0 \mu m \leq S$ in view of the bearing retaining rigidity, and an upper limit thereof is set to $S \leq 60 \mu m$ so that a force fitting force obtained by combining the serration portion and the inserting portion becomes equal to or less than an axial force of the nut.

A still other object of the present invention is to achieve a practical use of a kind of bearing apparatus for a drive wheel by securely and easily controlling a negative clearance of a bearing in a bearing apparatus of a drive wheel structured such as to form one inner track surface among double-rows of inner track surfaces on an outer periphery of an axle and form another inner track surface on an outer periphery of an outer joint member in a constant velocity joint.

The present invention has the following effects.

(1) Since in the manufacturing (assembling) step of the bearing, the force fitting of the axle to the outer joint member is temporarily stopped in a state that the bearing axial clearance is positive, the axial moving amount of the outer wheel is measured in this state, and the axle is further force fitted at an amount over the measured value, whereby the force fitting is completed, it is possible to accurately and easily measure the bearing negative clearance of the bearing apparatus of the tire wheel obtained by integrally assembling the tire wheel bearing and the constant velocity joint so as to unit. Further, it is possible to apply to the bearing apparatus for the drive wheel using no nut, thereby being excellent in a wide use.

(2) It is possible to obtain a significantly high reliability in view of a bearing service life, a rigidity and a fretting of the bearing apparatus of the tire wheel in which the tire wheel bearing and the constant velocity joint are integrally assembled so as to be united.

(3) By bringing the shoulder portion of the outer joint member into contact with the end surface of the axle so as to complete the force fitting, a positional shift due to a fine movement of the outer joint member can be avoided and a stable bearing negative clearance can be maintained, whereby a reliability can be improved.

In accordance with a still other embodiment of the present invention, a bearing apparatus for a drive wheel comprises:

a tire wheel bearing portion having an outer member provided with a mounting flange for mounting to a vehicle body on an outer periphery and double-rows of track surfaces on an inner periphery, and an inner member arranged in an inner side of the outer member via a rolling element and provided with a tire wheel mounting flange for mounting a tire wheel and track surfaces on an outer periphery;

a constant velocity joint portion provided at one end of a drive shaft and including an outer joint member having a track groove formed on an inner side, an inner joint member having a track groove corresponding to the track groove of the outer joint member formed, and a ball arranged between both track grooves of the outer joint member and the inner joint member;

one row of the track surfaces of the tire wheel bearing portion being provided on an outer diameter surface of the outer joint member so as to integrally form the tire wheel bearing portion and the constant velocity joint member, wherein a bearing clearance of the tire wheel bearing portion is a negative clearance controlled on the basis of a measured value in a state that the inner member is brought into contact with the shoulder portion of the outer joint member.

Alternatively, a bearing apparatus for a drive wheel may comprises:

a tire wheel bearing portion having an outer member provided with a mounting flange for mounting to a vehicle body on an outer periphery and double-rows of track surfaces on an inner periphery, and an inner member arranged in an inner side of the outer member via a rolling element and provided with a tire wheel mounting flange for mounting a tire wheel and track surfaces on an outer periphery;

a constant velocity joint portion provided at one end of a drive shaft and including an outer joint member having a track groove formed on an inner side, an inner joint member having a track groove corresponding to the track groove of the outer joint member formed, and a ball arranged between both track grooves of the outer joint member and the inner joint member;

one row of the track surfaces of the tire wheel bearing portion being provided on an outer diameter surface of the outer joint member so as to integrally form the tire wheel bearing portion and the constant velocity joint member, wherein a bearing clearance of the tire wheel bearing portion is a negative clearance controlled on the basis of a measured value in a state that the inner member is connected to the outer joint member.

The track surface may be directly formed on an outer diameter surface of the outer joint member.

The bearing clearance may be controlled by temporarily stopping the force fitting in a state that the bearing axial clearance is positive at a time of integrally forming the outer joint member and the inner member by the force fitting, calculating a clearance (S) between the shoulder portion of the outer joint member and the end surface of the opposing inner member in this state, measuring a bearing axial clearance ($\Delta a'$) in this state and thereafter force fitting until the end surface of the inner member is brought into contact with the shoulder portion of the outer joint member, thereby determining a negative bearing axial clearance ($\Delta a$) from a formula $\Delta a = \Delta a' - S$.

In accordance with an aspect of the present invention, a method of producing a bearing apparatus for a drive wheel may comprise the steps of temporarily stopping a force fitting in a state that the bearing axial clearance is positive at a time of integrally forming the outer joint member and the inner member by the force fitting, calculating a clearance (S) between the shoulder portion of the outer joint member and the end surface of the opposing inner member in this state, measuring a bearing axial clearance ($\Delta a'$) in this state and thereafter force fitting until the end surface of the inner member is brought into contact with the shoulder portion of the outer joint member, thereby determining a negative bearing axial gap ($\Delta a$) from a formula $\Delta a = \Delta a' - S$.

In this case, when the force fitting is temporarily stopped before the end surface of the inner member is brought into contact with the shoulder portion of the outer joint member at a time of force fitting the axle to the outer joint member of the constant velocity joint, the bearing axial clearance is in a positive state, and the axial clearance $\Delta a'$ actually exists. Accordingly, the negative bearing axial clearance $\Delta a$ at a time of completion of the force fitting at which the shoulder portion of the outer joint member is brought into contact with the end surface of the inner member can be securely measured by measuring the interval S between the shoulder portion of the outer joint member at a time of temporarily stopping the force fitting and the end surface of the opposing inner member, and the bearing axial clearance $\Delta a'$ corresponding to an axial amount of movement of the outer member at this time, and subtracting the interval S from the bearing axial clearance $\Delta a'$. The interval S can be measured as by providing an air passage communicating with the interval S in the axle or the like, injecting a compressed air into the interval S from the air passage and detecting a back pressure, a flow amount, a flow speed and the like of the compressed air at this time. Further, the gap S can be also accurately determined by measuring an amount of force fitting stroke of the inner member at a time of moving after temporarily stopping the force fitting of the inner member force fitted to the outer joint member before completing the force fitting.

As mentioned above, since the negative bearing axial clearance $\Delta a$ at a time of completing the force fitting at which the end surface of the inner member is brought into contact with the shoulder portion of the outer joint member can be securely measured, it is possible to accurately and easily measure the negative bearing clearance of the bearing apparatus of the tire wheel in which the tire wheel bearing and the constant velocity joint are integrally assembled so as to form a unit, and it is possible to connect the inner member force fitted to the outer joint member in accordance with a caulking method or the like without using a nut. Further, it is not necessary to provide an interval between the inner member and the outer joint member at a time of completing the force fitting, and a fine movement in an axial direction of both of the elements is lost by making the interval zero, whereby a reliability can be improved. Further, since the bearing negative clearance can be securely secured, it is possible to increase a range of an initial gap of the bearing, whereby it is possible to reduce a rate of inferiority.

Still a further object of the present invention is to control a clearance by actually measuring a bearing axial clearance having a direct relative relation with an amount of a preload in place of indirectly understanding the amount of the preload on the basis of a torque or the like, in order to provide a bearing apparatus of a tire wheel in which a proper preload amount is secured.

The present invention provides a bearing apparatus of a tire wheel in which a proper preload amount is secured by controlling a negative bearing axial clearance on the basis of a value actually measured in a step of assembling the bearing apparatus of the tire wheel. A basic idea of the clearance control in accordance with the present invention is as follows. At first, in a step of assembling the bearing apparatus of the tire wheel, a force fitting is temporarily stopped in the middle of the step of force fitting an inner member (an axle and an inner track wheel or the axle and an outer joint member) and a bearing axial clearance $\delta_0$ and an assembly width $T_0$ between the axle and the inner track wheel or the outer joint member. Next, the force fitting is continuously performed, an assembly width $T_1$ is measured in a state of completing the force fitting, and a bearing axial clearance $\delta_1 = \delta_0 - (T_0 - T_1)$ is determined. Next, a caulking operation is performed, and an assembly width $T_2$ after caulking is measured. Since the bearing axial clearance is reduced due to the caulking operation, the amount of the preload is increased, however, a gap reduction amount (preload increase amount) can be expressed by the formula $T_1 - T_2$. The bearing axial clearance (preload amount) $\delta_2$ in a final assembled product in which the caulking operation is completed can be determined in accordance with the formula $\delta_2 = \delta_1 + (T_1 - T_2)$. Since the preload is controlled by actually measuring the assembly widths $T_0$, $T_1$ and $T_2$ and the initial bearing axial gap $\delta_0$ in the step of assembling the bearing apparatus of the tire wheel, it is possible to control and secure a proper preload amount with respect to all the products, and a reliability of the product can be widely improved. Accordingly, since the bearing apparatus of the tire wheel in accordance with the present invention can directly measure the amount of the preload (the bearing axial gap) in place of converting the torque so as to indirectly understanding the amount of the preload in the structure in accordance with the conventional art mentioned above, it is possible to 100% control the amount of the preload of all of the products within the process so as to secure a shipping quality, whereby a high reliability can be provided. In this case, since the inner track wheel is deformed not only in an axial direction but also in a radial direction so as to give an influence to the bearing axial gap when fixing the inner track wheel by the caulking operation, a more accurate clearance control can be achieved by previously measuring a deforming amount of the inner track wheel mentioned above and converting the value into an axial direction so as to add the value to the actually measured value of the bearing axial clearance.

In accordance with a still further embodiment of the present invention, a bearing apparatus of a tire wheel comprises:

an outer member having a first flange for mounting to a vehicle body on an outer periphery and double-rows of outer wheel tracks on an inner periphery;

an inner member having a second flange for mounting a tire wheel on an outer periphery and double-rows of inner wheel tracks on an outer periphery;

double-rows of rolling elements interposed between the outer wheel tracks and the inner wheel tracks;

the inner member being constituted by an axle having the second flange and an inner track wheel fixed by force fitting to the axle and caulking an end portion of the axle; and the double-rows of inner wheel tracks being arranged in the axle and the inner track wheel in a distributing manner, wherein a bearing clearance is actually measured and controlled to be negative.

One of the double-rows of inner wheel tracks may be directly formed on the outer peripheral surface of the axle.

In accordance with an aspect of the present invention, a method of controlling a bearing clearance in the bearing apparatus of the tire wheel comprises:

an outer member having a first flange for mounting to a vehicle body on an outer periphery and double-rows of outer wheel tracks on an inner periphery;

an inner member having a second flange for mounting a tire wheel on an outer periphery and double-rows of inner wheel tracks on an outer periphery;

double-rows of rolling elements interposed between the outer wheel tracks and the inner wheel tracks;

the inner member being constituted by an axle having the second flange and an inner wheel fixed by force fitting to the axle and caulking an end portion of the axle; and the double-rows of inner wheel tracks being arranged in the axle and the inner track wheel in a distributing manner, wherein the method comprises the steps of:

temporarily stopping a force fitting in a state that the bearing axial gap is positive at a time of force fitting the inner track wheel into the axle, measuring an axial size $T_0$ between a reference surface of the axle in this state and a reference surface of the inner track wheel and an initial bearing axial gap $\delta_0$, and continuously force fitting the inner track wheel; and measuring an axial size $T_1$ between the reference surface of the axle and the reference surface of the inner track wheel after completing the force fitting of the inner track wheel, determining a bearing axial gap $\delta_1$ after completing the force fitting on the basis of the formula $\delta_1 = \delta_0 - (T_0 - T_1)$, fixing the inner track wheel by caulking an end portion of the axle, measuring an axial size $T_2$ between the reference surface of the axle and the reference surface of the inner track wheel after caulking, and determining a bearing axial gap after caulking $\delta_2$ on the basis of the formula $\delta_2 = \delta_1 + (T_1 - T_2)$.

The bearing apparatus of a tire wheel may comprise:
an outer member having a first flange for mounting to a vehicle body on an outer periphery and double-rows of outer wheel tracks on an inner periphery;
an inner member having a second flange for mounting a tire wheel on an outer periphery and double-rows of inner wheel tracks on an outer periphery;
double-rows of rolling elements interposed between the outer wheel tracks and the inner wheel tracks;
the inner member being constituted by an axle having the second flange and an outer joint member of a constant velocity joint fitting to the axle and fixed in accordance with a caulking operation; and
the double-rows of inner wheel tracks being arranged in the axle and the outer joint member in a distributing manner,
wherein a bearing clearance is actually measured and controlled to be negative.

One of the double-rows of inner wheel tracks may be directly formed on the outer joint member.

One of the double-rows of inner wheels may be formed on an independent inner track wheel fitted to the outer joint member.

In accordance with an aspect of the present invention, there is provided a method of controlling a bearing clearance in the bearing apparatus of the tire wheel as previously recited comprising:
an outer member having a first flange for mounting to a vehicle body on an outer periphery and double-rows of outer wheel tracks on an inner periphery;
an inner member having a second flange for mounting a tire wheel on an outer periphery and double-rows of inner wheel tracks on an outer periphery;
double-rows of rolling elements interposed between the outer wheel tracks and the inner wheel tracks;
the inner member being constituted by an axle having the second flange and an outer joint member of a constant velocity joint fitting to the axle and fixed in accordance with a caulking operation; and
the double-rows of inner wheel tracks being arranged in the axle and the outer joint member in a distributing manner,
wherein the method comprises the steps of:
temporarily stopping a force fitting in a state that the bearing axial gap is positive at a time of force fitting the inner member into the outer joint member, measuring an axial size $T_0$ between a reference surface of the axle and a reference surface of the outer joint member and a bearing axial gap $\delta_0$, and continuously force fitting; and
measuring an axial size $T_1$ between the reference surface of the axle and the reference surface of the outer joint member after completing the force fitting, determining an axial gap $\delta_1$ after completing the force fitting on the basis of the formula $\delta_1=\delta_0-(T_0-T_1)$, fixing the member to the outer joint member by the caulking operation, measuring an axial size $T_2$ between the reference surface of the axle and the reference surface of the outer joint member after caulking, and determining an axial gap after caulking $\delta_2$ on the basis of the formula $67_2=\delta_1+(T_1-T_2)$.

The reference surface of the axle may be set to a flange surface of the second flange as in the invention stated in an eighth aspect, and may be set to an end surface of the second flange side as in the invention stated in a ninth aspect.

BRIEF DESCRIPTION OF THE DRAWINGS

FIG. 21 is a sectional view similar to FIG. 15, showing a modification;

FIGS. 22A–22C are sectional views for explaining a gap control;

FIGS. 23A–23C are sectional views for explaining a gap control;

FIGS. 24A and 24B are sectional views for explaining a gap control;

DESCRIPTION OF THE PREFERRED EMBODIMENTS

A description will be in detail given below of an embodiment of a tire wheel bearing apparatus in accordance with the present invention.

Figure 1:
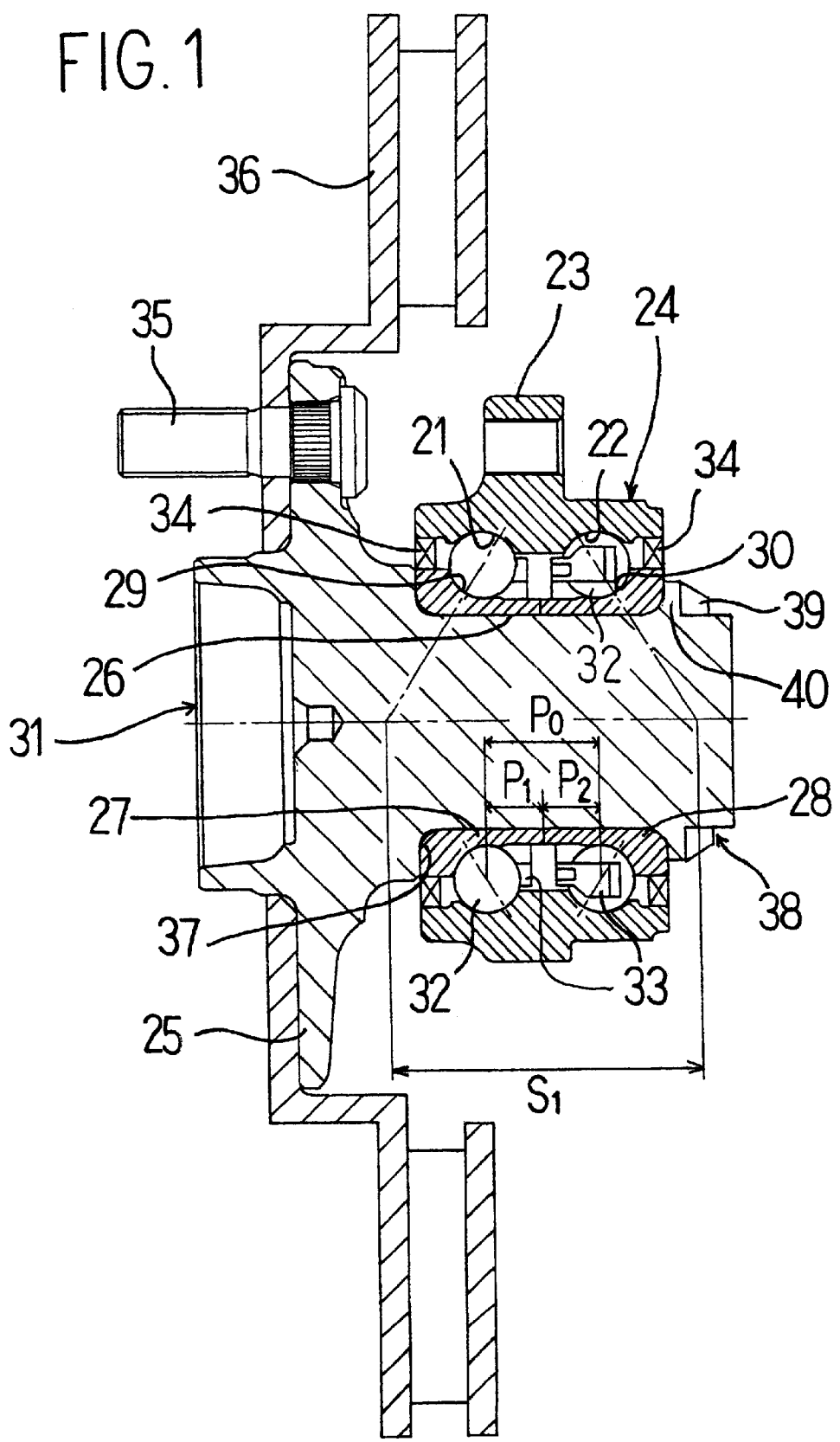
FIG. 1 is a sectional view of a tire wheel bearing apparatus in accordance with an embodiment of the present invention.

A tire wheel bearing apparatus shown in FIG. 1 is provided with an outer member 24 having double-rows of track surfaces 21 and 22 integrally formed on an inner periphery and a vehicle body mounting flange 23 integrally formed on an outer periphery, an inner member 31 having a tire wheel mounting flange 25 provided at one end, a cylindrical small diameter step portion 26 provided at another end and double-rows of track surfaces 29 and 30 formed on an outer diameter of the small diameter step portion 26 by force fitting inner wheels 27 and 28 thereto so as to oppose to the track surfaces 21 and 22 of the outer member 24, double-rows of rolling elements 32 interposed between the respective track surfaces in the outer member 24 and the inner member 31, and a retainer 33 interposed between the inner member 31 and the outer member 24 for retaining the respective rows of rolling elements 32 at a equally spaced interval in a circumferential direction.

Seals 34 are mounted to the inner wheels 27 and 28 and both ends of the outer member 24 so as to prevent foreign materials from entering and prevent a grease filled into an inner portion from leaking out. Hub bolts 35 for fixing a tire wheel is mounted at positions at equally spaced interval in a circumferential direction of the tire wheel mounting flange 25 of the inner member 31. Further, a brake rotor 36 is fixed to the flange 25 of the inner member 31 by the hub bolts 35. Further, the vehicle body mounting flange 23 of the outer member 24 is mounted to a suspension apparatus of a vehicle body via a knuckle (not shown).

Figure 2:
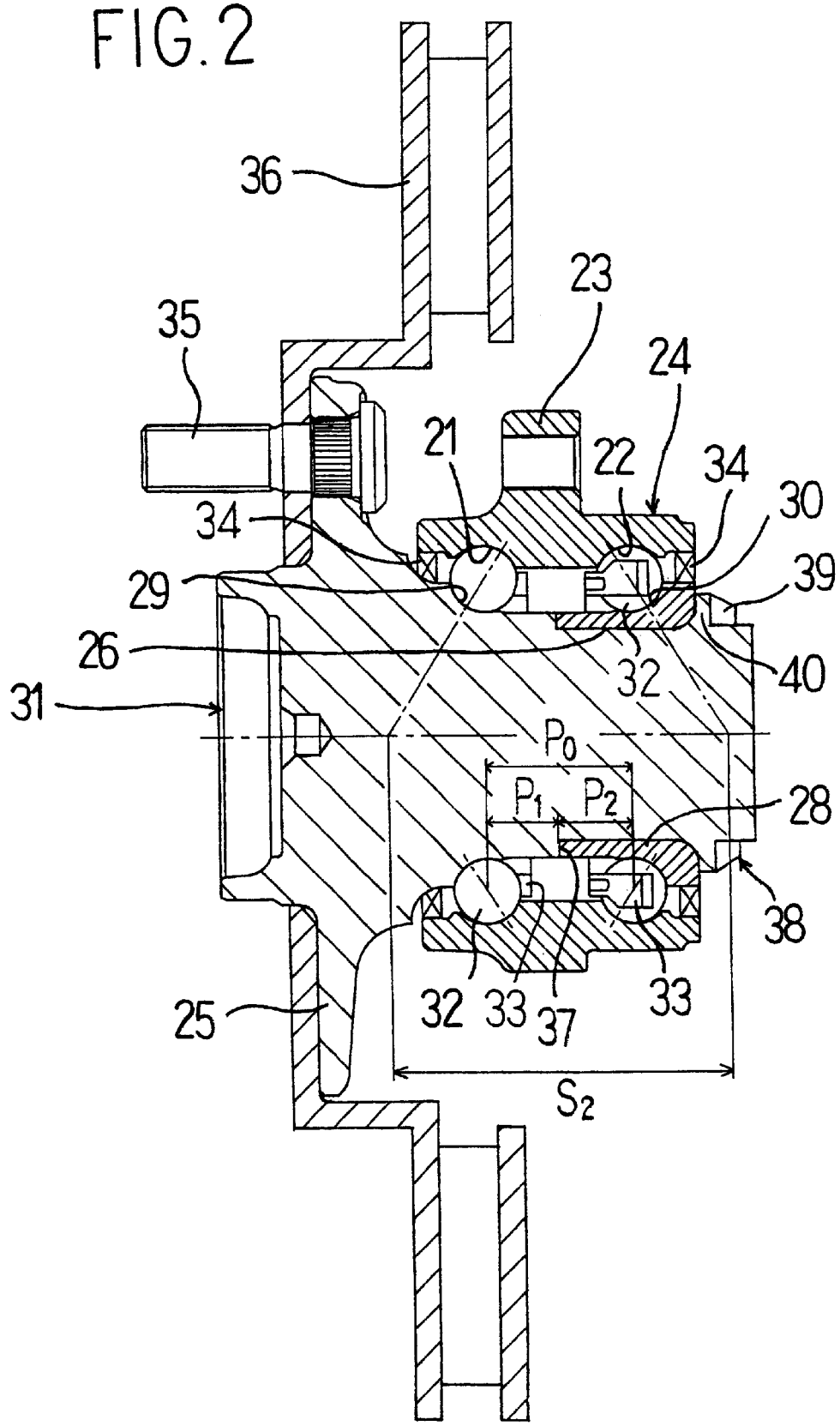
FIG. 2 is a sectional view similar to FIG. 1, showing a modification.

The present invention can employ an embodiment having a structure as shown in FIG. 2 in addition to the embodiment mentioned above. A tire wheel bearing apparatus in accordance with the embodiment is structured such that the track surface 29 in the tire wheel mounting flange side (an outboard side) among the track surfaces 29 and 30 of the inner member 31 is directly formed in the outer diameter of the inner member 31. Since the other structures are the same as those of the embodiment shown in FIG. 1, the same reference numerals designate the same elements and an overlapping explanation will be omitted.

In these embodiments, since the bearing structure is a double-row angular ball bearing structure in which the track surfaces 21 and 22 of the outer member 24 and the track surfaces 29 and 30 of the inner member 31, and the rolling elements 32 form a contact angle, a greater load capacity is assured. As the other bearing structure, it is possible to employ a double-row tapered roller bearing structure in which a tapered roller is employed for the rolling element.

The inner wheels 27 and 28 force fitted to the outer diameter of the small diameter step portion 26 is fixed to the inner member 31 by caulking the end portion of the small diameter step portion 26 of the inner member 31 radially outwardly. The inner wheels 27 and 28 are held with respect to a shoulder portion 37 of the inner member 31 for positioning in an axial direction by caulking one end of the inner member 31, and is fixed to the inner member 31 in a state that a bearing clearance is set to be negative with a predetermined preload applied to the rolling element 32.

Figure 3:
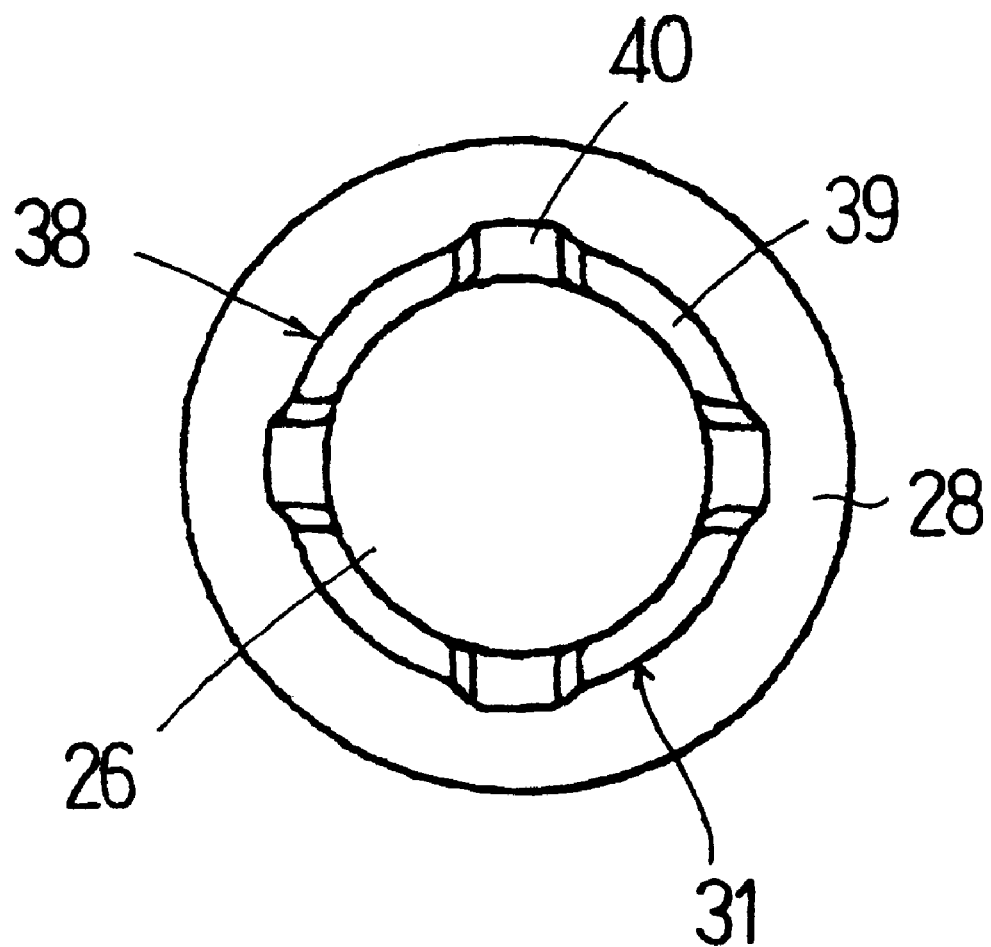
FIG. 3 is a side elevational view of a caulked portion of an inner member shown in FIG. 1 or FIG. 2.

This caulking is performed by inserting the small diameter step portion 26 of the inner member 31 to the inner diameter of the inner wheels 27 and 28, pressurizing the outer diameter of the end portion in the small diameter step portion 26 of the inner member 31 protruding to the inner side by a cylindrical punch or the like and plastically deforming outward in the diametrical direction. A caulked portion 38 formed by this plastic deformation protrudes outward to the outer diameter side from the inner peripheral surface of the inner wheel 28 as shown in FIG. 3, and is constituted by a plurality of, for example, four first areas 39 continuously formed in a partial area in a circumferential direction and a second area 40 formed between the adjacent first areas 39, protruding to the outer diameter side rather than the first area 39 and having a thickness thinner than that of the first area 39.

The first area 39 and the second area 40 can be simultaneously molded in one step by employing a pressing mold provided with radial protruding portions at four portions on the pressurizing surface. In this case, the second area 40 and the first area 39 are respectively formed in the protruding portion and a flat surface portion between the protruding portions. In addition to simultaneously forming both of the areas 39 and 40, both of the areas 30 and 40 may be formed in different steps, for example, the second area 40 may be formed after forming the first area 39.

Among the caulked portions 38, mainly the first area 39 fills the gap with respect to the inner wheel 28 so as to prevent the inner wheel 28 from being shaky, and the second area 40 serves a function of preventing the inner wheel 28 from falling out on the sake of the greater holding force than the first area 39. In this case, since an amount of displacement of the first area 39 is smaller than the second area 40 and the holding force against the inner wheel 28 is sufficiently secured by the second area 40, the caulked portion 38 can obtain a sufficient holding force as a whole by a little amount of displacement, so that an insufficiency of an amount of extra thickness is not generated at a time of caulking, and it is possible to improve a durability at the caulked portion 38. The caulking operation may be performed by a normal caulking method of forming a recess in the end portion of the inner member 31 so as to expand radially outwardly, in addition to the method mentioned above.

In this embodiment, the structure is made such that the bearing clearance is set to be negative in accordance with the caulking mentioned above and the preload is applied. The bearing clearance can be set to a desired negative bearing clearance by respectively controlling a pitch P0 and a groove diameter of the double-rows of track surfaces 21 and 22 of the outer member 24, an axial size from the small diameter end surface (or the shoulder portion 37 of the track surface 29 of the inner member 31) $P_1$ and a groove diameter of the track surface 29 of the inner wheel 27, an axial size from the small diameter end surface $P_2$ and a groove diameter of the track surface 30 of the inner wheel 28, and a ball diameter in the bearing working step so as to selectively combine.

The negative bearing clearance can be measured in accordance with the following way. For example, in the case of the embodiment shown in FIG. 2, at a time of force fitting the inner wheel 28 to the inner member 31, the force fit of the inner wheel 28 is temporarily stopped in the state that the bearing clearance is positive, the bearing clearance is measured in this state, for example, in accordance with an axial amount of movement of the outer member 24, thereafter, the inner wheel 28 is force fitted until being brought into contact with the shoulder portion 37 of the inner member 31 so as to be finished force fitting, the axial amount of movement of the inner wheel 28 from the state that the force fitting is temporarily stopped to the state that the force fitting is finished is measured, and a difference between the measured value of the axial moving amount of the inner wheel 28 and the measured value of the bearing clearance is determined as a negative bearing clearance after the assembly is completed.

In accordance with the embodiment of the present invention, since the preload is applied by the negative bearing clearance, it is possible to design so as to obtain a wide bearing span ($S_0$ (conventional apparatus shown in FIG. 4)<$S_1$ (embodiment shown in FIG. 1)<$S_2$ (embodiment shown in FIG. 2)) within the same space, whereby it is possible to largely improve the bearing rigidity. Further, the interior specifications can be changed within the same space, the bearing rigidity can be improved by increasing the number of the rolling elements, the deformation of the outer member 24 can be restricted by optimizing the thickness of the outer member 24 and the thickness of the flange 23, and the bearing rigidity can be improved. Further, a high preload can be maintained by restricting the dispersion of the amount of preload after being assembled to a narrow range. That is, since the fitting is reduced in the embodiment shown in FIG. 1 in comparison with the conventional apparatus shown in FIG. 4, and further reduced in the embodiment shown in FIG. 2, the dispersion component of the gap reduction amount due to a tolerance of fitting becomes zero, accordingly the low preload area generated due to the accumulation of the tolerance is eliminated, and the bearing rigidity is increased.

The embodiments shown in FIGS. 1 and 2 correspond to the embodiments of the structure employed for the driven wheel of the automobile, however, the present invention is not limited to this, and can be employed for a drive wheel of the automobile. In this case, the inner member is formed in a hollow shape in which a through hole is formed in a center portion thereof in an axial direction, and a spline, a serration or the like is formed on an inner diameter surface of the through hole. A shaft portion of a constant velocity joint is inserted to the through hole of the inner member, and a torque can be transmitted between both of the elements due to a connection with the spline, the serration or the like formed on the outer diameter surface of the shaft portion. Further, in the structure for the driven wheel, it is possible to restrict a temperature increase of the bearing and lighten by making the inner member in a hollow structure so as to improve a heat radiating effect.

The present invention also relates to a tire wheel bearing apparatus which can rotatably support front wheels of a front wheel drive hehicle (FWD vehicle) and a rear wheel drive vehicle (RWD vehicle) to a vehicle body and can restrict a uneven wear of a brake rotor and a brake judder.

A bearing apparatus for rotatably retaining a drive wheel of the FWD vehicle is structured such that a hub wheel, an outer joint member of a constant velocity joint and a bearing are united. In this case, the outer joint member of the constant velocity joint inserts a stem portion extending in an axial direction to a through hole in the hub wheel, is connected to the hub wheel by a serration or the like formed on an outer diameter of the stem portion and an inner diameter of the through hole in such a manner as to transmit a torque, and is screwed by a nut. The bearing apparatus is structured such that the hub wheel is rotatably supported by a bearing such as a double-row angular ball bearing or the like, a tire wheel is fixed to the hub wheel and the bearing is supported by a suspension apparatus of a vehicle body via a knuckle. An outer wheel of the bearing is fastened to the knuckle via a flange protruded from an outer periphery of the bearing by a bolt. Further, the hub wheel is provided with a flange, and is structured such as to fix a brake rotor to the flange by a hub bolt for fixing the tire wheel. In this case, with respect to the bearing apparatus rotatably retaining the driven wheel of the RWD vehicle, there is a structure in which the hub wheel and the bearing are united except the outer joint member of the constant velocity joint in the bearing apparatus for the drive wheel mentioned above or an outer wheel rotation type structure in which the tire wheel mounting flange is provided on an outer periphery of the outer wheel.

In general, in the tire wheel bearing apparatus, when a surface run out (or an axial run out) is generated in the brake rotor mounted to the flange of the hub wheel, there is a problem that a vibration at a time of braking after a high speed travel of the automobile is generated or a uneven wear of the brake rotor and a brake judder are generated. In order to prevent the uneven wear of the brake rotor and the brake judder, it is necessary to restrict the surface run out of the brake rotor, however, in order to restrict the surface run out of the brake rotor, it is necessary to restrict the run out of the flange of the hub wheel itself, the axial run out of the bearing, an assembling error (misalignment) or the like in addition to restricting the run out of the mounting surface for the brake rotor itself, so that it is necessary to improve an accuracy of each of the parts themselves. However, even when restricting the run out of the flange of the hub wheel itself, the axial run out of the bearing, the assembling error (misalignment) or the like in addition to the run out of the mounting surface for the brake rotor itself, as mentioned above so as to improve the accuracy of each of the parts themselves, it is hard to completely prevent the uneven wear of the brake rotor and the brake judder.

A description will be in detail given below of another embodiment of the present invention with reference to FIG. 5. The embodiment is applied to a bearing apparatus for rotatably retaining drive front wheels of a front wheel drive vehicle (FWD vehicle) or driven front wheels of a rear wheel drive vehicle (RWD vehicle) to a vehicle body with a view obtain an effect of restricting a surface run out of a brake motor even when a load in an opposite direction to that of an axial force is generated due to a moment load or the like as an automobile is turned.

Figure 5:
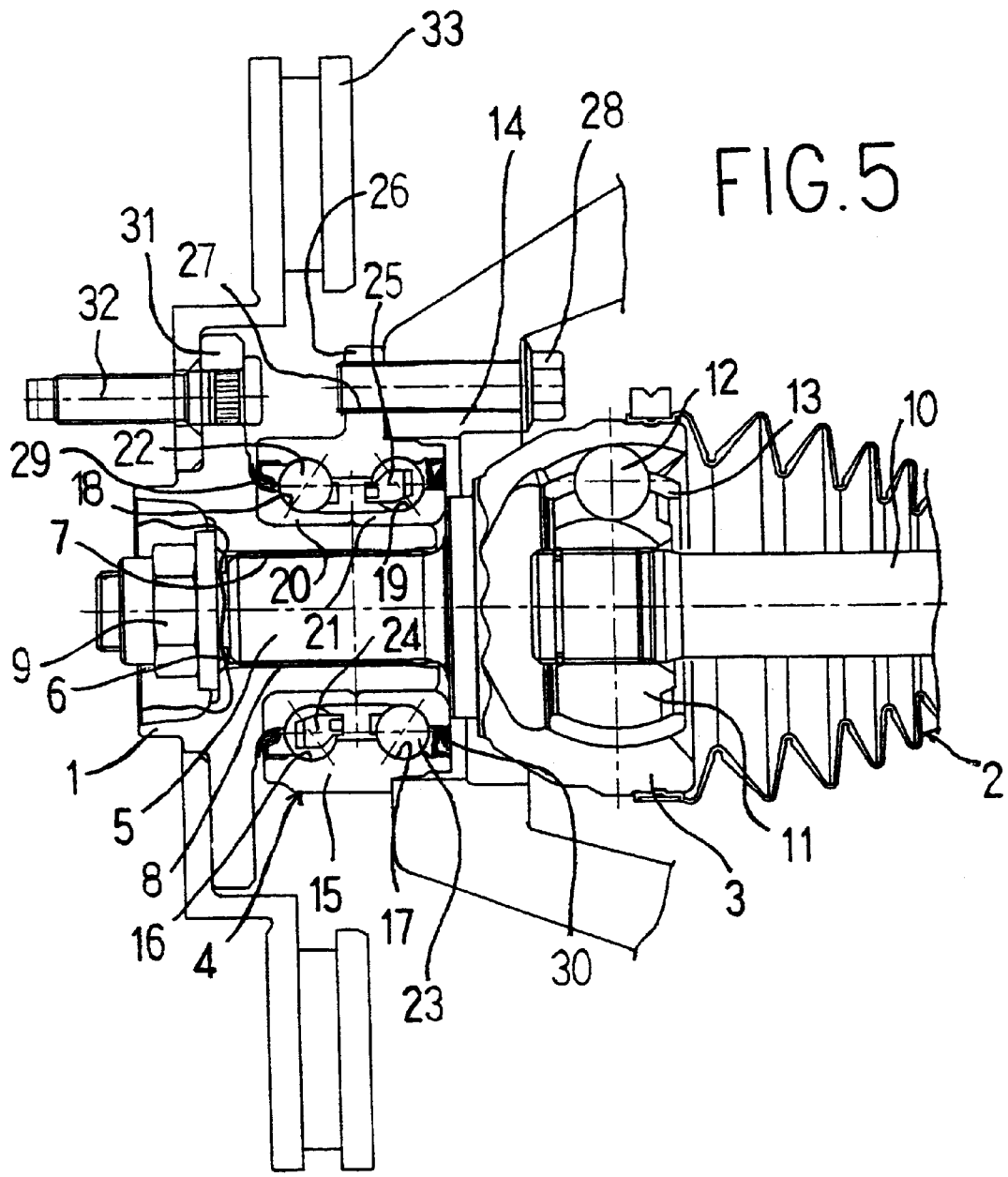
FIG. 5 is a sectional view of a tire wheel bearing apparatus in accordance with the present invention and a bearing apparatus for drive front wheels of a Front wheel drive vehicle showing another embodiment of the present invention.

FIG. 5 shows an embodiment in accordance with the present invention, and a bearing apparatus of the drive front wheels in the FWD vehicle. The bearing apparatus in accordance with this embodiment is structured such that a hub wheel 1 (an inner member), an outer joint member 3 (a connected member) of a constant velocity joint 2 and a bearing 4 are united. In this case, the outer joint member 3 of the constant velocity joint 2 inserts a stem portion 5 extending in an axial direction to a through hole 6 of the hub wheel 1, is connected to the hub wheel 1 in such a manner as to transmit a torque by serration portions 7 and 8 formed on an outer diameter of the stem portion 5 and an inner diameter of the through hole 6, and is fastened and fixed by a nut 9 (fastening means). In this case, the hub wheel 1 and the outer joint member 3 of the constant velocity joint 2 are integrally connected by a nut fastening, however, it is possible to integrally connect by a bolt fastening. The constant velocity joint 2 is constituted by an inner joint member 11 mounted to an end portion of a drive shaft 10, a plurality of torque transmitting balls 12 assembled between track grooves of the inner joint member 11 and the outer joint member 3, and a retainer 13 interposed between an outer peripheral surface of the inner joint member 11 and an inner peripheral surface of the outer joint member 3 for retaining the torque transmitting balls 12, in addition to the outer joint member 3 mentioned above.

The bearing apparatus has a structure of rotatably retaining the hub wheel 1 by the bearing 4, a tire wheel (not shown) is fixed to the hub wheel 1, and the bearing 4 is supported by a suspension apparatus (not shown) of a vehicle body via a knuckle 14. The bearing 4 has a double-row angular ball bearing structure, and is structured such that double-rows of track surfaces 16 and 17 are formed on an inner surface of an outer wheel 15 (an outer member), double-rows of track surfaces 18 and 19 opposing to the tack surfaces 16 and 17 of the outer wheel 15 are formed on outer peripheral surfaces of inner wheels 20 and 21 force fitted to an outer periphery of an end portion of the hub wheel 1, double-rows of rolling elements 22 and 23 are interposed between the outer wheel 15 and the track surfaces of the inner wheels 20 and 21, and the rolling elements 22 and 23 in the respective rows are supported by retainers 24 and 25 at equally spaced interval in a circumferential direction. A vehicle body mounting flange 26 is protruded from an outer periphery of the outer wheel 15 and is fixed to the knuckle 14 by engaging bolts 28 with female screws 27 formed at plural portions along a circumferential direction in the flange 26. In this case, in order to prevent foreign materials from entering into the bearing 4 from an external portion and prevent a grease charged therewithin from leaking out, seals 29 and 30 are provided. The hub wheel 1 is provided with a tire wheel mounting flange 31, and hub bolts 32 for fixing the tire wheel are mounted at positions with a equally spaced interval in a circumferential direction of the flange 31. A brake rotor 33 is fixed to the tire wheel mounting flange 31 of the hub wheel 1 by the hub bolt 32.

In this embodiment, a preload is applied by making the bearing clearance of the bearing 4 negative in accordance with a fastening operation of the nut 9. It is desirable to set an amount of the preload of the bearing 4 between 981 and 9810 N (100 and 1000 kgf. When the amount of the preload is smaller than 981 N (100 kgf, it is hard to increase a rigidity of the bearing itself and the bearing clearance causes the surface run out of the brake rotor 33. On the contrary, when the amount of the preload is greater than 9810 N (1000 kgf, it is possible to increase the rigidity of the bearing itself, however, since the load of the bearing 4 is increased at that degree, an excessive preload invites reduction of a service life of the bearing 4. In this case, the preload of the bearing 4 is set by setting an initial gap before fitting and determining an expected amount of the preload with taking a gap reduction due to the fitting operation or the like into consideration.

A rigidity of the bearing itself can be increased by applying the preload to the bearing 4, and a combining force (an axial force) between the hub wheel 1 and the constant velocity joint 2 can be increased by integrally connecting the hub wheel 1 with the outer joint member 3 of the constant velocity joint 2 with a predetermined axial force by fastening the nut 9. It is preferable to set the axial force for integrally connecting the hub wheel 1 with the outer joint member 3 of the constant velocity joint 2 by the nut 9 to 9810 N (1000 kgf) or more. Accordingly, in the case that the automobile is turned, since the predetermined axial force or more exists even when the load in the opposite direction to that of the axial force is generated due to the moment load or the like, the connecting portion has no end play, so that it is possible to restrict a surface run out of the brake rotor 33.

In order to restrict the surface run out of the brake rotor 33, it is necessary to restrict a flange run out of the hub wheel itself, an axial run out of the bearing 4, an assembling error (a misalignment) or the like in addition to restricting a run out of the mounting surface of the brake rotor itself, so that it is necessary to improve an accuracy of each of the parts themselves. In the embodiment in accordance with the present invention, the surface run out of the brake rotor 33 is restricted by increasing a rigidity of the bearing itself and increasing the axial force for connecting the hub wheel 1 to the outer joint member 3 of the constant velocity joint 2 by the nut 9.

Figure 6:
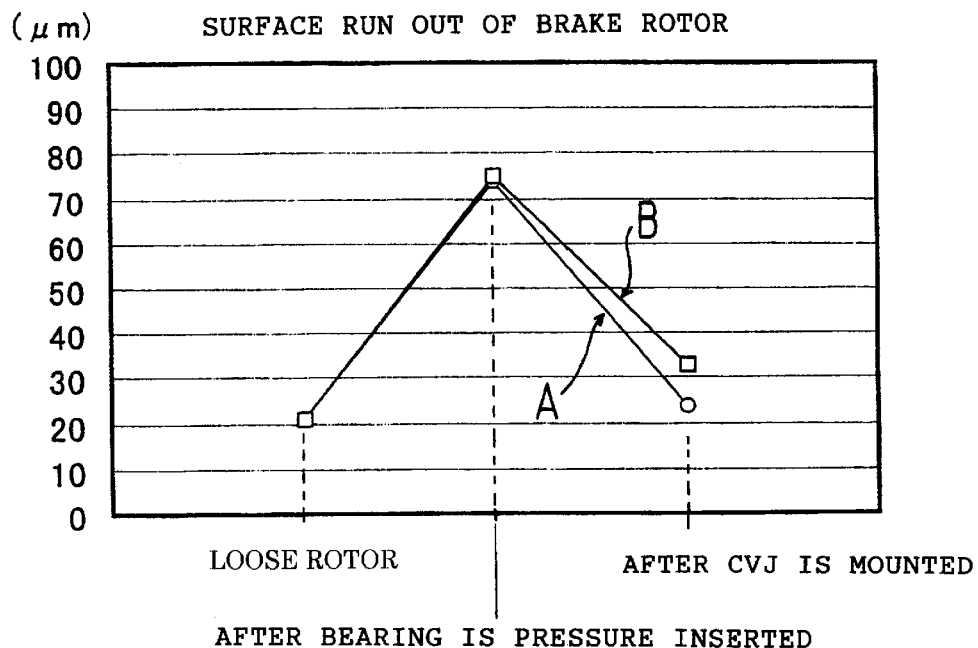
FIG. 6 is a view showing a characteristic of a surface run out of a brake rotor with respect to two samples.
Figure 7:
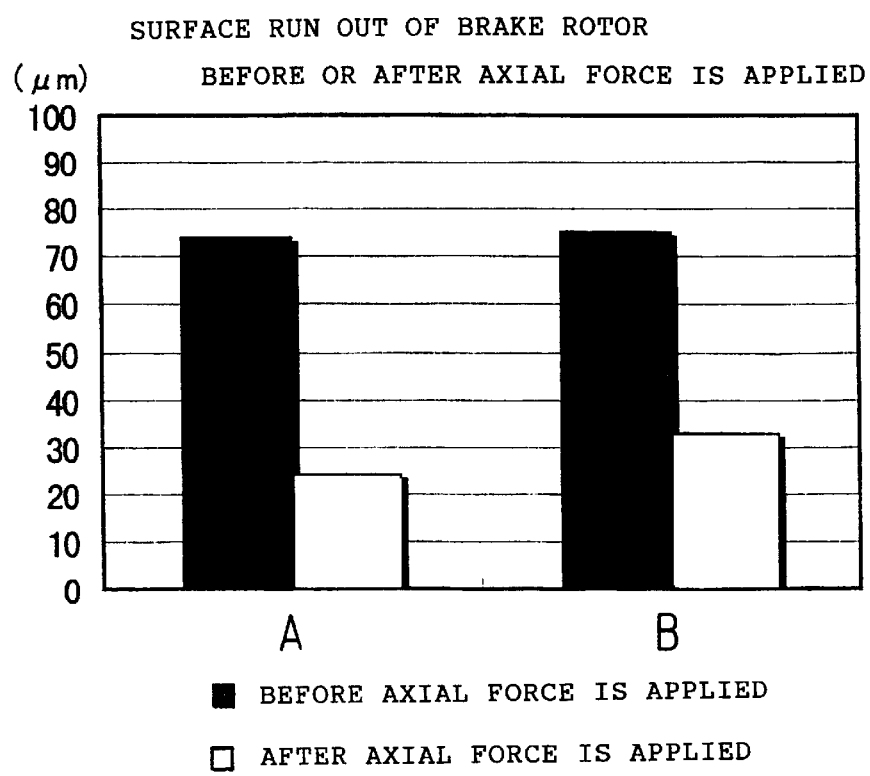
FIG. 7 is a bar graph showing a surface run out of a brake rotor before and after applying an axial force with respect to two samples.

FIG. 6 is a graph obtained by plotting values of a run out of the brake rotor 33 at each of only the brake rotor (Loose rotor), the structure after the bearing is force fitted and the structure after the constant velocity joint (CVJ) is mounted, with respect to two samples A and B of the bearing apparatus. FIG. 7 is a bar graph showing the values of the run out of the brake rotor 33 at each of the structure after the bearing is force fitted and the structure after the constant velocity joint (CVJ) is mounted.

When finally fastening by the nut 9 and applying the axial force, the surface run out of the brake rotor 33 is largely reduced. That is, the surface run out of the brake rotor 33 is about 75 $\mu$m before applying the axial force, however, the surface run out of the brake rotor 33 is reduced to about 30 $\mu$m after applying the axial force, so that it is apparent that a rigidity of a whole of the unit gives a great influence to the surface run out of the brake rotor 33.

Further, in this embodiment, when rotating the hub wheel 1 with reference to the outer diameter of the outer wheel 15 of the bearing 4, it is possible to restrict the width of the run out of the brake rotor 33 within a standard value in a state before assembling the automobile. It is desirable to set the standard value of the run out of the brake rotor 33 to be equal to or less than 50 $\mu$m or less. The tire wheel bearing apparatus with the brake rotor in which the run out is previously restricted has a high reliability, and the problem of the surface run out in the brake rotor 33 can be solved by using the tire wheel bearing apparatus in an automobile assembling plant.

In order to prevent the brake judder from being generated, it is necessary to set the surface run out of the brake rotor 33 to 50 μm or less in a state of assembling the bearing apparatus. In accordance with the embodiment of the present invention, if the surface run out of the brake rotor 33 can be restricted, for example, to about 30 μm even after considering the dispersion of the accuracy of each of the parts, it is possible to make the surface run out of the brake rotor 33 mentioned above equal to or less than 50 μm.

For example, it is possible to restrict the surface run out of the brake rotor 33 within a standard value in a state of assembling the tire wheel bearing apparatus with the brake rotor by fixing the outer wheel 15 of the bearing 4 to a measuring table (not shown), rotating the hub wheel 1 with reference to the fixed outer wheel 15 at one time, and measuring the width of the run out of the brake rotor 33 fixed to the tire wheel mounting flange 31 at that time by applying a measuring device (not shown) such as a dial gauge or the like to the brake rotor 33. In this case, the structure may be made such that before assembling the tire wheel bearing apparatus, that is, before assembling the hub wheel 1 and the bearing 4, the brake rotor 33 is fixed to the tire wheel mounting flange 31 of the hub wheel 1 so as to restrict the surface run out of the brake rotor 33 within the standard value with reference to the rotary shaft of the hub wheel 1.

In this case, in the bearing apparatus for the drive front wheels of the FWD vehicle in the embodiment mentioned above, the inner track surfaces 18 and 19 of the bearing 4 are formed on the inner wheels 20 and 21 independent from the hub wheel 1, however, the present invention is not limited to this, and can be applied to the structure of the type in which one inner track surface 18 (on an outboard side) of the bearing 4 is formed on the outer diameter of the hub wheel 1 or another inner track surface 19 (on an inboard side) of the bearing 4 is formed on the outer diameter of the outer joint member 3 of the constant velocity joint 2.

Figure 8:
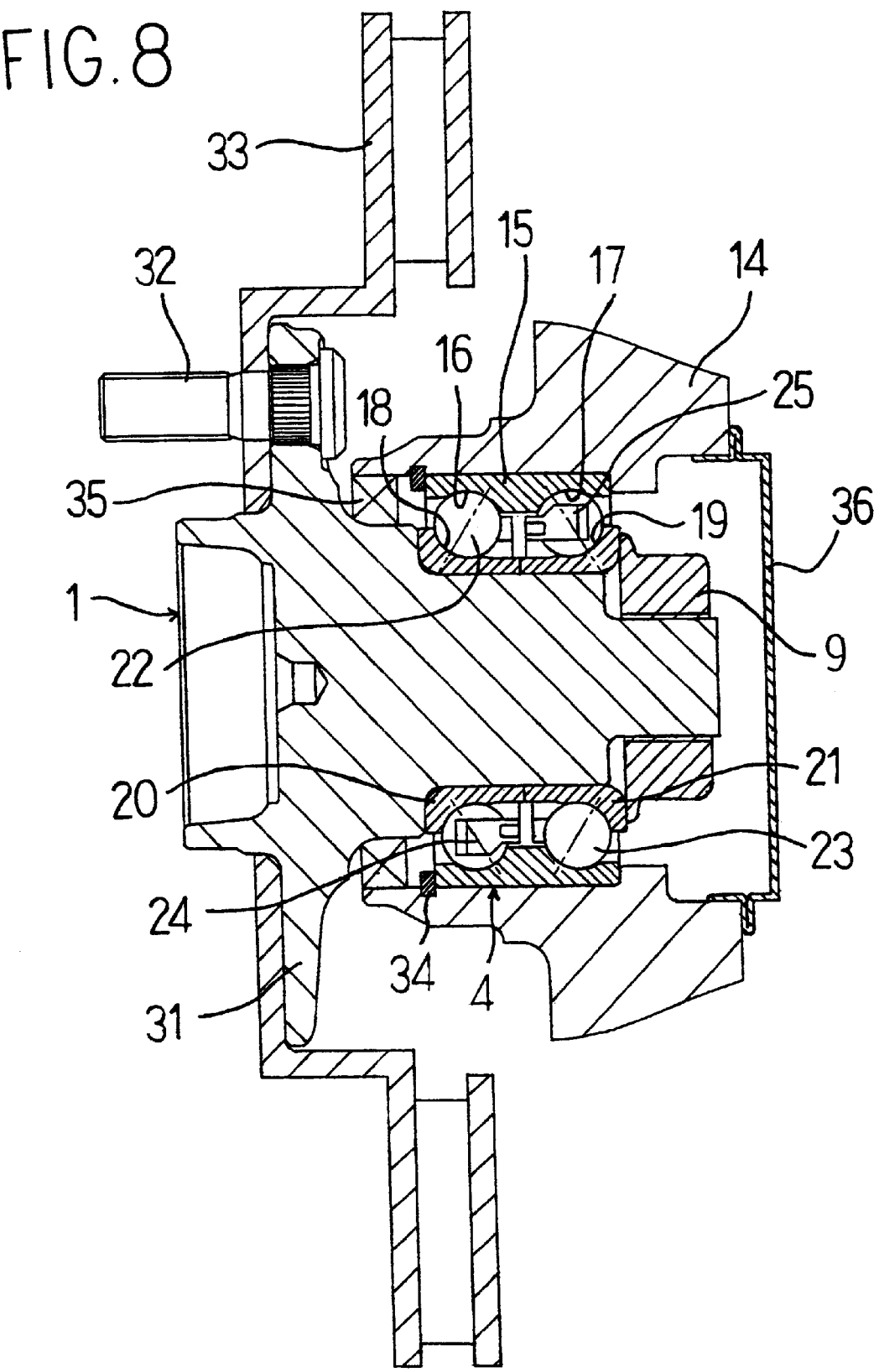
FIG. 8 is a cross sectional view of a bearing apparatus for driven front wheels of a front engine rear drive vehicle (FR vehicle), showing a modification.

Next, FIG. 8 shows a modified bearing apparatus for driven front wheels in a rear wheel drive vehicle (RWD vehicle). In this case, the same reference numerals denote the same elements as those of the bearing apparatus for the drive front wheels shown in FIG. 5. The modified bearing apparatus comprises the outer wheel 15 (the outer member) having the double-rows of track surfaces 16 and 17 integrally formed on the inner periphery thereof, the hub wheel 1 (the connected member) having the tire wheel mounting flange 31 formed at one end thereof and the inner wheels 20 and 21 (the inner member) force fitted on the other end thereof so as to form the double-rows of track surfaces 18 and 19 opposing to the track surfaces 16 and 17 of the outer wheel 15, the double-rows of rolling elements 22 and 23 interposed between the respective track surfaces of the outer wheel 15 and the inner wheels 20 and 21, and the retainers 24 and 25 interposed between the inner wheels 20 and 21 and the outer wheel 15 for retaining the respective rows of rolling elements 22 and 23 at a equally spaced interval in a peripheral direction. In the illustrated embodiment, a double-row angular ball bearing is employed for the bearing 4.

The outer wheel 15 is force fitted to the knuckle 14 and fixed by a stop ring 34. A seal 35 and a cap 36 are arranged at opposite sides of the bearing 4, respectively, so as to prevent the foreign materials from entering and prevent the grease charged therewithin from leaking out. The hub bolt 32 for fixing the tire wheel is mounted at the positions with a equally spaced interval in a circumferential direction of the tire wheel mounting flange 31 in the hub wheel 1. Further, the brake rotor 33 is fixed to the tire wheel mounting flange 31 of the hub wheel 1 by the hub bolt 32. The inner wheels 20 and 21 of the bearing 4 is force fitted to the end portion of the hub wheel 1 and the protruding end portion of the hub-wheel 1 is fixed by the nut 9 (the fastening means).

The bearing clearance is set to be negative by tightening the nut 9 so as to apply the preload, and the rigidity of the bearing itself is increased by applying the preload to the bearing 4. In the same manner as the case of the front wheel bearing apparatus of the FWD vehicle, it is desirable to set the amount of the preload of the bearing 4 to 981 to 9810 N (100 to 1000 kgf. When the amount of the preload is smaller than 981 N (100 kgf), it is hard to increase a rigidity of the bearing itself and the bearing clearance causes the surface run out of the brake rotor 33. On the contrary, when the amount of the preload is greater than 9810 N (1000 kgf), it is possible to increase the rigidity of the bearing itself, however, since the load of the bearing 4 is increased at that degree, an excessive preload invites reduction of a service life of the bearing 4. In this case, the preload of the bearing 4 is set by setting an initial gap before fitting and determining an expected amount of the preload with taking a gap reduction due to the fitting operation or the like into consideration.

A rigidity of the bearing itself can be increased by applying the preload to the bearing 4, and a combining force (an axial force) between the hub wheel 1 and the joint 4 can be increased by integrally connecting the hub wheel 1 with the joint 4 with a predetermined axial force by fastening the nut 9. It is preferable to set the axial force for integrally connecting the hub wheel 1 with the joint 4 by the nut 9 to 9810 N (1000 kgf) or more. Accordingly, in the case that the automobile is turned, since the predetermined axial force or more exists even when the load in the opposite direction to that of the axial force is generated due to the moment load or the like, the connecting portion has no end play, so that it is possible to restrict a surface run out of the brake rotor 33.

In order to restrict the surface run out of the brake rotor 33, it is necessary to restrict a flange run out of the hub wheel itself, an axial run out of the bearing 4, an assembling error (a misalignment) or the like in addition to restricting a run out of the mounting surface of the brake rotor itself, so that it is necessary to improve an accuracy of each of the parts themselves. The surface run out of the brake rotor 33 is further restricted by increasing a rigidity of the bearing itself and increasing the axial force for connecting the hub wheel 1 to the joint 4.

In this case, in the bearing apparatus for the driven front wheels of the RWD vehicle in the embodiment mentioned above, the inner track surfaces 18 and 19 of the bearing 4 are formed on the inner wheels 20 and 21 independent from the hub wheel 1, however, the present invention is not limited to this, and can be applied to the structure of the type in which one inner track surface 18 (on an outboard side) of the bearing 4 may be formed on the outer diameter of the hub wheel 1.

In the respective bearing apparatuses for the driven rear wheels of the FWD vehicle and the drive rear wheels of the RWD vehicle, it is not necessary to severely restrict the surface run out of the brake rotor 33 in the case of using a disc brake in the rear wheels in comparison with the case of the drive front wheels of the FWD vehicle and the driven front wheels of the RWD vehicle, and a reduced influence is given to the vehicle body vibration together with the brake vibration. Then, in this bearing apparatus, the structure is made such as to plastically deform an end portion of a stem portion in the outer joint member of the constant velocity joint (in the case of the FWD vehicle) and an end portion of the hub wheel (in the case of the RWD vehicle) so as to reduce the number of the parts and make the structure inexpensive and light and integrally connect the hub wheel and the constant velocity joint (in the case of the FWD vehicle) and the hub wheel (in the case of the RWD vehicle).

As the fastening means therefor, it is preferable to caulk so as to plastically deform the end portion of the constant velocity joint (in the case of the FWD vehicle) and of the hub wheel (in the case of the RWD vehicle) radially outwardly by means of pressurization with a cylindrical punch or the like. Due to the caulking operation, in the same manner as the case of the bearing apparatus for the front wheels mentioned above, the bearing clearance is set to be negative and the preload is applied to the bearing 4, thereby increasing the rigidity of the bearing itself. In this case, it is desirable to set the amount of the preload of the bearing 4 to 981 to 9810 N (100 to 1000 kgf.

Alternatively, the caulking operation can be performed by forming a recess in the end portion of the constant velocity joint (in the case of the FWD vehicle) and of the hub wheel (in the case of the RWD vehicle) and expanding the end portion radially outwardly so as to plastically deform.

In the respective bearing apparatus for the drive front wheels of the FWD vehicle and the driven front wheel of the RWD vehicle, the description is given of the case of utilizing the fastening operation by the nut 9 as the fastening means as mentioned above, however, it is possible to employ the fastening means in accordance with the caulking operation for the bearing apparatus, and it is possible to apply the predetermined amount of the preload and the axial force due to the caulking operation.

The present invention also relates to a bearing unit for drive wheels of an automobile, and more particularly to a bearing apparatus for drive wheels in which a hub wheel (an axle of a drive wheel), an outer joint member of a constant velocity joint and a tire wheel bearing are united. The bearing apparatus for the drive wheels in accordance with the present invention is used for rotatably retaining rear wheels of a front engine rear drive vehicle (RWD vehicle), front wheels of a front engine front drive (FWD vehicle), all the wheels of four wheel drive vehicle (4WD vehicle) or the like with respect to a suspension apparatus.

Figure 13:
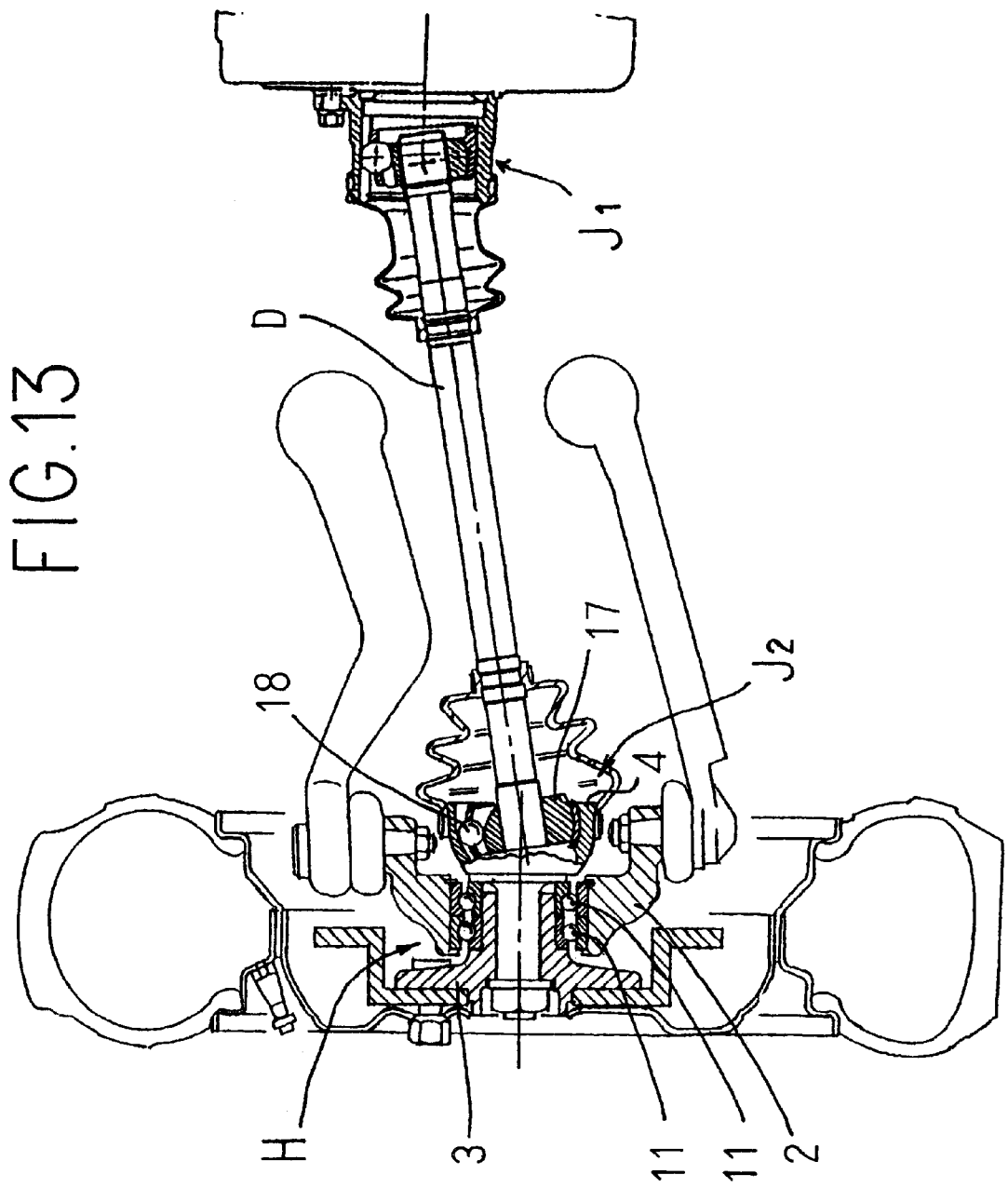
FIG. 13 is a sectional view around a drive wheel of an automobile.

Since a power transmission system for transmitting a power from an engine of an automobile to drive wheels is required to correspond to an angular displacement and an axial displacement generated by a change of a relation of a relative position between an engine and a tire wheel, for example, as shown in FIG. 13, a drive shaft D is interposed between an engine side and a drive wheel side, one end of the drive shaft D is connected to a differential gear via a sliding type constant velocity joint J1, and another end thereof is connected to an axle (a hub wheel) of the drive wheel via a fixed type constant velocity joint J2 . A displacement in an axial direction can be absorbed by a so-called plunging of the sliding type constant velocity joint J1. On the contrary, the fixed type constant velocity joint J2 can perform only an angular displacement.

The fixed type constant velocity joint J2 comprises an outer joint member 4 connected to a hub wheel 3, an inner joint member 17 mounted to the another end of the drive shaft D, and a plurality of torque transmitting balls 18 assembled between track grooves of the outer joint member 4 and the inner joint member 17 and held by a retainer. The hub wheel 3 is rotatably supported via a rolling element 11, and a wheel of the drive wheel is fixed to the hub wheel 3. A bearing apparatus H for the drive wheels is constituted by uniting the hub wheel 3, the constant velocity joint J2 and the tire wheel bearing.

There are proposed various kinds of bearing apparatuses for the drive wheels for rotatably retaining the drive wheels with respect to a suspension apparatus. The bearing apparatus for the drive wheels for retaining the front wheels of the FWD vehicle or the 4WD vehicle corresponding to the drive wheels as well as steered wheels is required to smoothly transmit a rotation of a drive shaft to the drive wheels at a constant velocity irrespective of a steering angle applied to the drive wheel by being combined with a constant velocity joint. Further, there is a case that the bearing apparatus of the tire wheel retaining rear wheels of the RWD vehicle and the 4WD vehicle is combined with the constant velocity joint as occasion demands.

Figure 14:
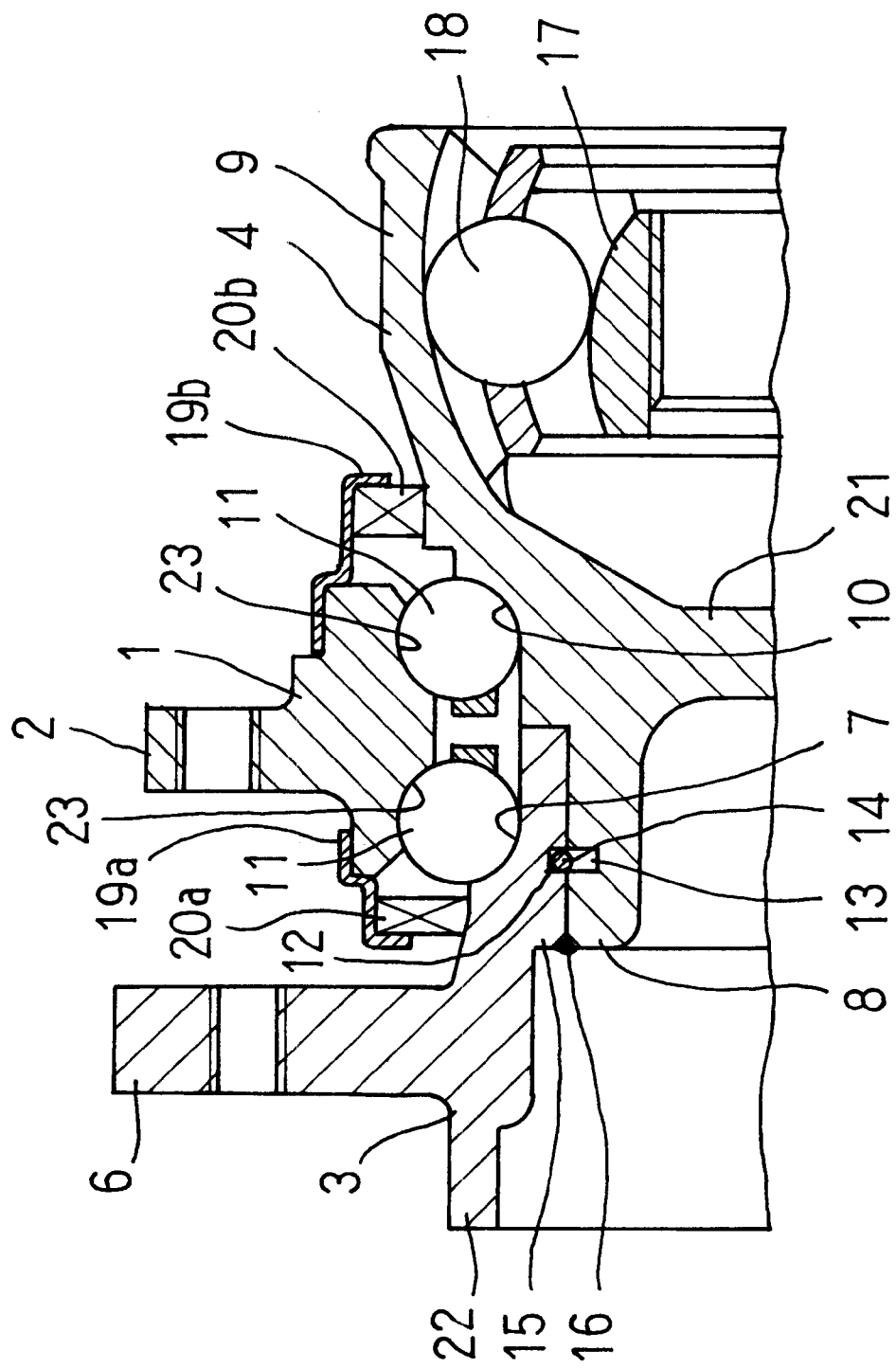
FIG. 14 is a sectional view showing a conventional art.

An example of the bearing apparatus for the drive wheels combined with the constant velocity joint and structured such as to be relatively compact and light is described in Japanese Unexamined Patent Publication No. 7-317754. FIG. 14 shows a conventional structure thereof. An outer member 1 supported by a suspension apparatus in a state of being assembled in a vehicle so as not to rotate has a mounting flange 2 for being supported to the suspension apparatus on an outer periphery, and has double-rows of outer track surfaces 23 on an inner peripheral surface. A hub wheel 3 and an outer joint member 4 are combined and arranged in an inner side of the outer member 1. The hub wheel 3 has a mounting flange 6 for retaining a tire wheel and a first inner track surface 7 is formed in an outer peripheral portion. Further, the hub wheel 3 is provided with a positioning cylinder portion 22 for positioning the tire wheel to the hub wheel 3 at a time of mounting the tire wheel to the mounting flange 6. The outer joint member 4 is constituted by a mouth portion 9 and a cylinder portion 8, the hub wheel 3 is outward fitted to the cylinder portion 8 and a second inner track surface 10 is formed on an outer peripheral surface of an intermediate portion. Double-rows of rolling elements 11 are assembled between the first and second inner track surfaces 7 and 10, and double-rows of outer track surfaces 23 so as to rotatably support the hub wheel 3 and the outer joint member 4 to an inner side of the outer member 1.

The hub wheel 3 is prevented from being taken out from the outer joint member 4 by respectively forming engaging grooves 12 and 13 at positions where an inner peripheral surface of the hub wheel 3 and an outer peripheral surface of the cylinder portion 8 of the outer joint member 4 are aligned with each other, and attaching a stop ring 14 so as to extend between both of the engaging grooves 12 and 13. Further, as denoted by reference numeral 16, the hub wheel 3 and the outer joint member 4 are connected by welding an outer peripheral edge portion of one end surface (a left end surface in FIG. 14) of the outer joint member 4 to an inner peripheral edge portion of a step portion 15 formed on an inner peripheral surface of the hub wheel 3.

Covers 19a and 19b made of a metal such as a stainless steel sheet or the like and formed in a substantially cylindrical shape, and seal rings 20a and 20b made of an elastic material such as a rubber, an elastomer or the like and formed in a ring shape are provided between opening portions at both ends of the outer member 1 and the hub wheel 3 and the outer joint member 4. These covers 19a and 19b and the seal rings 20a and 20b are shut the portion in which a plurality of rolling elements 11 are placed against an external portion, prevent the grease existing in this portion from leaking out to the outer portion, and prevent foreign materials such as rainwater, dusts or the like from entering to this portion. A partition wall 21 for closing an inner side of the inner joint member 4 is provided inside a middle portion of the outer joint member 4, thereby preventing the foreign materials entering to an inner side from a front end opening of the inner joint member 4 from reaching an inner portion of the mouth portion 9.

The bearing apparatus for the drive wheel constituted by the structure mentioned above mounts the outer member 1 to the suspension apparatus by the mounting flange 2 of the outer member 1 and mounts the drive wheel to the mounting flange 6 of the hub wheel 3. Further, an end portion of a drive shaft (D: See FIG. 13) for transmitting a rotational power from the engine is spline fitted to the inner joint member 17 of the constant velocity joint. When the vehicle travels, a rotation of the inner joint member 17 is transmitted to the outer joint member 4 and the hub wheel 3 via a plurality of balls 18 so as to rotate the drive wheel.

In the case of the conventional structure shown in FIG. 14, it is hard to secure a combining strength between the hub wheel 3 and the outer joint member 4 and it is hard to put the structure into practical use. The reasons are as follows. A great torque is applied to the connection portion between the hub wheel 3 and the outer joint member 4 for traveling the automobile. In spite of the great torque, in order to prevent the hub wheel 3 and the outer joint member 4 from relatively rotating by the connection portion, it is insufficient to only fit both elements 3 and 4. Accordingly, it is actually necessary to support the torque by the weld portion 16. Then, in order to sufficiently secure the strength of the weld portion 16, it is desirable to perform a thick all around build up welding. However, since the inner track surface 7 in the outboard side exists near the weld portion 16, a strain due to a thermal deformation is generated in the inner track surface 7 portion, so that there is a risk that a performance as the bearing apparatus for the drive wheel is deteriorated. In particular, a vibration is easily generated at a time of driving, and it is impossible to obtain a sufficient durability. Further, the inner track surface 7 is tempered due to a heat at a time of welding and a hardness can not sufficiently maintained, thereby reducing a rolling fatigue service life.

Further, with respect to the inner track surface 10 in an inboard side, as well as a great moment load is applied at a time when the vehicle suddenly turns or the like, an influence due to a heat generation of the outer joint member 4 is given since the torque transmitting balls 18 are positioned near the track groove rolling while transmitting the torque. Further, since it is hard to obtain a better heat radiating state than that of the outboard side because of the inboard side, a very severe load condition is required.

Figure 9:
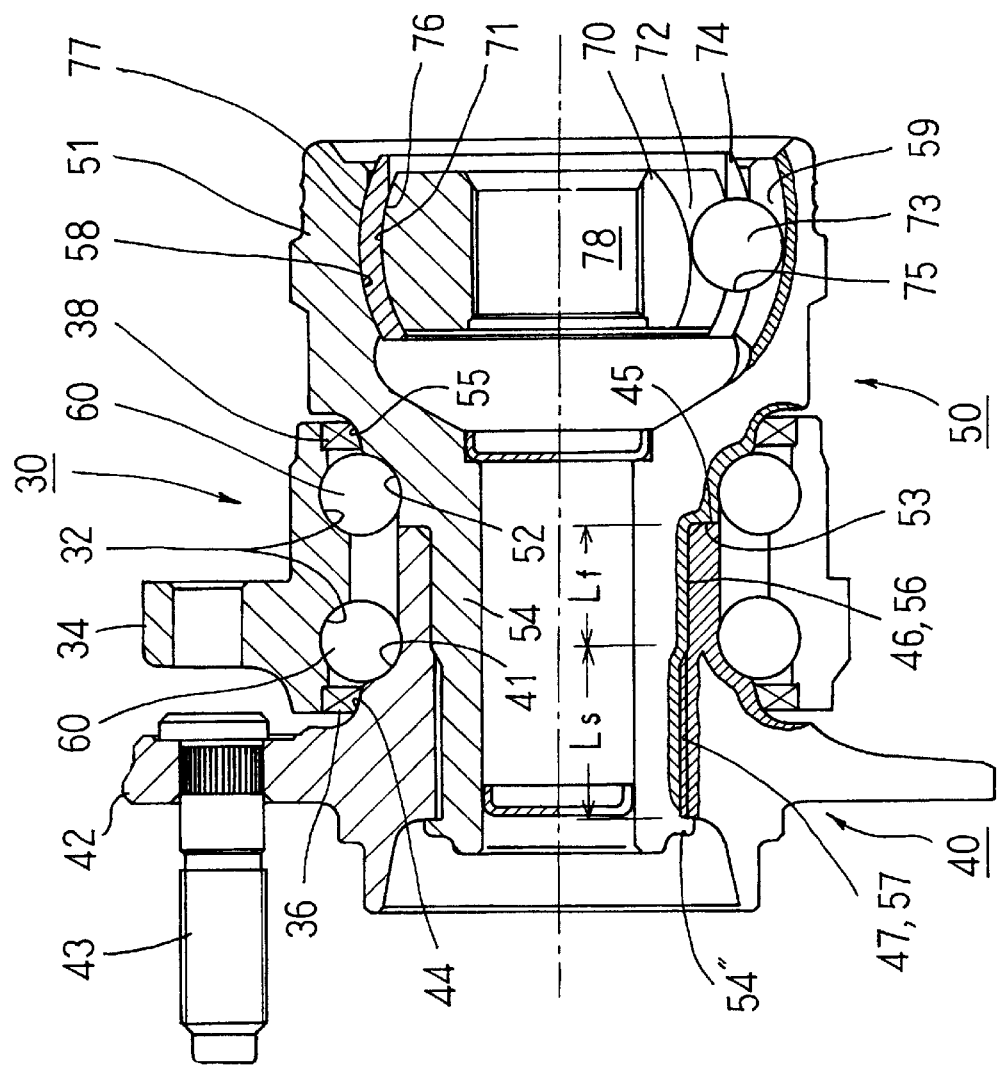
FIG. 9 is a sectional view of a bearing apparatus for a drive wheel showing other embodiment of the invention.

In an embodiment shown in FIG. 9, a bearing apparatus for a drive wheel is constituted by a tire wheel bearing part and a constant velocity joint part and is structured such as to transmit a rotation of an outer joint member 50 of the constant velocity joint part to an inner member 40 of the tire wheel bearing part. The tire wheel bearing portion assembles rolling elements 60 between the outer member 30 and the inner member 40 so as to rotatably support the inner member 40. The constant velocity joint part is constituted by an outer joint member 50, an inner joint member 70, a torque transmitting ball 73 assembled between the outer joint member 50 and the inner joint member 70 as a torque transmitting element, and a retainer 74 for retaining the torque transmitting balls. Double-rows of inner track surfaces 41 and 52 of the tire wheel bearing portion are provided in the inner member 40 and the outer joint member 50 in a distributing manner. That is, the inner track surface 41 on an outboard side is formed in the inner member 40 and the inner track surface 52 on an inboard side is formed in the outer joint member 50. In this case, the outboard means a side close to an outer side in a width direction in a state of being assembled in the automobile, and corresponds to a left side in each of FIGS. 9 to 14. On the contrary, the inboard side means a side close to an inner side in the widthwise direction, and corresponds to a right side in each of FIGS. 9 to 14. The double-rows of rolling elements 60 are assembled between the double-rows of inner track surfaces 41 and 52 and double-rows of outer track surfaces 32 provided in the outer member 30. Here, the case of using a ball for the rolling element is exemplified, however, it is possible to use a tapered roller. Seals 36 and 38 are attached to opening portions at both ends of the outer member 30, thereby preventing a grease charged therewithin from leaking and preventing water and foreign materials from entering.

A description will be in detail given of the tire wheel bearing part. The outer member 30 forms the double-rows of outer track surfaces 32 on an inner periphery, and is provided with a mounting flange 34 for mounting to the vehicle body, on an outer periphery. The inner member 40 is an element called as a hub wheel, is provided with a mounting flange 42 for mounting a drive wheel (See FIG. 13), and has hub bolts 43 for fixing a wheel disc planted at positions at a equally spaced interval in a circumferential direction of the mounting flange 42. Between a portion near a base end portion of the mounting flange 42 and the inner track surface 41 is formed a seal surface 44 with which a seal lip of the seal 36 is slidably brought into contact. Further, an end surface 45 on the inboard side of the inner member 40 constitutes a facing surface to a shoulder surface 53 of the outer joint member 50. The inner member 40 has a through hole in an axial core portion, and a cylindrical inserting portion 46 and a serration hole portion 47 are successively formed in this through hole in the order of the inserting portion 46 and the serration hole portion 47 from the facing surface 45 side.

The outer joint member 50 having an inner track surface in the inboard side 52 on an outer periphery is constituted by a mouth portion 51 and a stem portion 54, and is fitted to the inner member 40 in the stem portion 54. A shoulder surface 53 standing in a radial direction from a side end portion of the mouth portion of the inserting portion 46 constitutes the facing surface to the end surface 45 of the inner member 40 as mentioned above. By expanding the end portion of the stem portion 54 outward in a radial direction and caulking as shown by reference numeral 54, the inner member 40 and the outer joint member 50 are connected. In this case, the stem portion 54 is made hollow all around the length, however, may be partly solid as in the conventional art shown in FIG. 14. Further, the end portion for caulking may be formed by providing a recess portion in the axial end portion of the solid stem portion. The more the hollow space portion is, the lighter the structure is, and it is possible to obtain a heat radiating effect, so that there is an advantage that a durability of the bearing can be improved.

The inner joint member 70, the torque transmitting ball 73 and the retainer 74 are assembled within the mouth portion 51 of the outer joint member 50. A serration hole 78 is formed in the inner joint member 70 so as to be serration fitted to a drive shaft (D: See FIG. 13) for transmitting a power from an engine, and the inner joint member 70 is provided with a track groove 72 constituting a pair together with the track groove 59 of the outer joint member 50, at a equally spaced interval position in the circumferential direction of the outer spherical surface 71. The torque transmitting ball 73 is interposed between the track groove 59 of the outer joint member 50 and the track groove 72 of the inner joint member 70 and a torque is transmitted between both of the elements. Each of the torque transmitting balls 73 is assembled within a pocket 75 of the retainer 74. The retainer 74 is interposed between an inner peripheral surface 58 of the mouth portion 51 in the outer joint member 50 and an outer spherical surface 71 of the inner joint member 70 for retaining the torque transmitting balls 73 within the same plane, thereby securing the constant velocity of the joint.

The inserting portion 56 and the serration shaft portion 57 are formed at axial positions respectively corresponding to the fitting portion 46 and the serration hole portion 47 of the inner member 40, in the stem portion 54 of the outer joint member 50. The inner member 40 and the outer joint member 50 are connected by expanding and caulking the end portion of the stem portion 54 protruded outward from the through hole of the inner member 40. A twisting angle is applied to the serration portions 47 and 57, and a play in a circumferential direction is cancelled by forming a fastening margin between engaging teeth. In this case, a torque is transmitted by the serration portions 47 and 57. Further, a centering of the double-rows of inner track surfaces 41 and 52 is performed by the inserting portions 46 and 56. This centering has an important significance for achieving an improved bearing performance of the bearing apparatus since the double-rows of inner track surfaces 41 and 52 are formed in the different members, that is, the inner member 40 and the outer joint member 50 in a distributing manner. Further, an axial position of the facing surfaces 45 and 53 between the inner member 40 and the outer joint member 50 gives an influence to a distance between the double-rows of inner track surfaces 41 and 52. Accordingly, it is possible to adjust a bearing clearance (positive or negative) by adjusting one or both of working amounts of the facing surfaces 45 and 53.

A relation between a length Lf of the inserting portions 46 and 56 and a length Ls of the serration portions 47 and 57 is set to Lf<Ls. Accordingly, since the serration portions 47 and 57 start engaging earlier than the inserting portions, it is easy to position the serration portions 47 and 57 in a peripheral direction.

As illustrated, the inserting portions 46 and 56 are arranged between the double-rows of rolling elements 60, whereby no influence is given to the inner track surface even when a change is generated in the outer diameter of the inner member 40 due to the fastening margin of the inserting portion. The fastening margin S of the inserting portions 46 and 56 is set to a range $0\,\mu m \leq S \leq 60\,\mu m$. A lower limit is set to 0 μm because a force fitting force obtained by combining the inserting portions 46 and 56 and the serration portions 47 and 57 is equal to or less than the axial force by the caulked portion, thereby making the connection by the caulked portion effective.

A hatching expressing a section is omitted in a lower half portion of a center line in FIG. 9, and a hardened layer is expressed by a hatching. The inner member 40 is formed in accordance with a forging process with using a carbon steel, and the portion expressed by the hatching, that is, from a portion near the base end portion of the tire wheel mounting flange 42 via the seal surface 44, the inner track surface in the outboard side 41 and the end surface 45 corresponding to the facing surface to the outer joint member 50 to the inserting portion 46 and the serration hole portion 47 corresponding to the fitting portion to the outer joint member 50, a hardening treatment is applied so as to form a hardened layer having about Hv 510 to 900. Among the portions in which the hardened layer is formed, the base end portion of the tire wheel mounting flange 42 is hardened so as to prevent the base end portion from deforming and prevent a surface run out of the flange in spite of a moment load applied from the tire wheel mounting flange 42 to which the tire wheel is fixed. The seal surface 44 is partly overlapped with the base end portion mentioned above, however, corresponds to a portion with which the seal lip of the seal 36 is slidably brought into contact, so that the seal surface 44 is hardened in order to reduce a frictional resistance, achieve a desired seal effect and obtain a friction resistance. Since the inner track surface 41 portion generates a great surface pressure due to contact with the rolling element 60, the inner track surface 41 is hardened so as to secure a rolling fatigue service life. The end surface 45 is the facing surface to the outer joint member 50 and gives an influence to a distance between the inner track surfaces 41 and 52, the end surface 45 is hardened so as to maintain an accuracy of size and prevent a fretting friction. In this case, the outer peripheral surface portion between the inner track surface 41 portion and the end surface 45 is hardened so as to prevent the inner track surface 41 from being deformed in spite of the radial load applied from the rolling element 60 together with the hardened layer of the inner track surface 41 portion. Among the inner peripheral surfaces, the inserting portion 46 is hardened so as to prevent the inner track surface 41 from being deformed with resisting the fitting and fastening margin with respect to the inserting portion 56 of the outer joint member 50 and further to apply a creep resistance and a fretting resistance. Since the serration hole portion 47 serves to transmit the torque with respect to the serration shaft portion 57 of the outer joint member 50, the serration hole portion 47 is hardened so as to apply a predetermined strength (for preventing a tooth lack or the like). The portion between the serration hole portion 47 and the end surface of the inner member 40 is hardened so as to prevent deformation in spite of the load applied to the inner member 40 at a time of caulking the end portion of the outer joint member 50.

A material constituting the outer joint member 50 employs a carbon steel containing 0.45 to 1.10 weight % carbon amount, and a hardness of at least the end portion 54" is set to Hv 200 to 300. Accordingly, it is possible to secure a hardness (Hv 510 to 900) required for the inner track surface in the inboard side 52 portion and the track groove 59 portion of the mouth portion 51, and the caulking operation can be sufficiently performed. That is, when the hardness of the end portion before forming the caulked portion 54" is over Hv 300, a crack is generated in the formed caulked portion 54" at a time of caulking the end portion, and the caulked portion 54" and the inner member 40 are not closely attached due to an insufficient caulking, whereby the connecting force between the inner member 40 and the outer joint member 50 is insufficient. Further, a load required for forming the caulked portion 54" becomes excessive, whereby a damage such as an impression or the like is easily generated in the inner track surface 41 and the rolling element 60 due to the caulking operation, and further there is generated a possibility that the accuracy of the size in each of the parts is deteriorated. Because it is hard to restrict the hardness of the end portion before forming the caulked portion 54" to be equal to or less than Hv 300 when the carbon amount of the carbon steel constituting the outer joint member 50 is over 1.10. On the contrary, when the hardness of the end portion does not reach Hv 200, it is impossible to secure the hardness of the formed caulked portion 54'', and the connecting force by the caulked portion is insufficient. When the carbon amount of the carbon steel constituting the outer joint member 50 is less than 0.45 weight %, it is impossible to secure the hardness (Hv 510 to 900) required for the inner track surface in the inboard side 52 portion, and a service life of the inner track surface portion is reduced.

The hardened layer is formed on the outer peripheral surface of the outer joint member 50 as shown by the hatching in the lower half portion in FIG. 9. With respect to the mouth portion 51, the track groove 59 corresponding to the portion in which the torque transmitting ball 73 rolls is hardened for applying a service life resistance. Since a seal surface 55 corresponds to a portion in which the seal lip of the seal 38 slides, the seal surface is hardened for reducing the frictional resistance, achieving a desired seal effect and applying a service life resistance. Since the inner track surface 52 portion corresponds to a track on which the rolling element 60 rolls, the inner track surface 52 portion is hardened for keeping a service life resisting against the radial load and the thrust load applied from the rolling element 60. The shoulder portion 53 is the facing surface to the inner member 40 and gives an influence to a distance between the inner track surfaces 41 and 52, the end surface 45 is hardened so as to maintain an accuracy of size and prevent a fretting friction. The inserting portion 56 and the serration shaft portion 57 among the outer peripheral surfaces of the stem portion 54 are hardened for applying a creep resistance, a fretting resistance and the like in the same manner as the inserting portion 46 and the serration hole portion 47 in the inner member 40. On the contrary, the end portion of the stem portion 54 requires a ductility since the end portion of the stem portion corresponds to a portion to be caulked. Accordingly, the hardening treatment is not applied to the end portion for making it possible to caulk, and the end portion is left as a portion not hardened.

As mentioned above, the outer joint member 50 can sufficiently secure a rolling fatigue service life of the inner track surface since the inner track surface in the inboard side 52 portion is hardened in accordance with a hardening treatment. On the contrary, since the end portion is not hardened and is kept raw, the force required for plastically deforming the end portion is not too large or there is no case that the damage such as a crack or the like is easily generated at the end portion (the caulked portion 54'') in the case of plastically deforming the end portion. Accordingly, even in the case of increasing the hardness of the inner track surface in the inboard side 52 portion so as to secure the rolling fatigue service life as mentioned above, it is not troublesome to work the caulked portion for connecting the outer joint member 50 and the inner member 40. Further, since the hardened layer is formed all around the length of the inner peripheral surface of the inner member 40, it is possible to prevent the inner member 40 from being deformed and prevent the bearing inner gap from being shifted from the desired value even in the case that a great load is applied to the inner member 40 together with working the caulked portion. Further, it is possible to prevent the diameter of the inner track surface in the outboard side 41 formed on the outer peripheral surface of the inner member 40 from being changed and prevent an accuracy from being deteriorated, whereby it is possible to prevent the rolling fatigue service life of the inner track surface 41 from being reduced.

The hardened layer mentioned above may be discontinuously formed at each of the required portions, however, is useful for improving a strength and a durability of the inner member 40 and the outer joint member 50 by continuously forming the adjacent hardened layers, and a working efficiency for a hardening treatment is improved.

The hardening treatment method can be suitably selected among well-known techniques such as a high-frequency induction hardening, a case hardening, a laser hardening or the like. In this case, in order to apply a heat treatment in accordance with a hardening pattern mentioned above, the high-frequency induction hardening is suitable. The high-frequency induction hardening as a surface hardening treatment can freely select the hardened layer by effectively utilizing a characteristic of an induction heating, can apply an abrasion resistance and improve a fatigue strength. The induction heating is a method of utilizing an electromagnetic induction phenomenon so as to directly converting an electric energy into a thermal energy within a metal, thereby generating heat, and a lot of characteristics are achieved by the high-frequency heat treatment utilizing the same. In particular, since it is possible to locally heat, freely select a depth of the hardened layer, and control so as not to apply a significant thermal influence to the other portion than the hardened layer, it is possible to keep a performance of the base material.

Further, as a material of the inner member 40 and the outer joint member 50 to which the hardening treatment is applied, a carbon steel containing a carbon amount 0.45% or more, preferably 0.5 to 0.7% is suitable. The surface hardness of the hardened layer is set to be equal to or more than Hv 510, preferably, in a range between Hv 650 and 800. The hardness of the non-hardened portion can keep a ductility capable of performing the caulking operation, for example, by being set in a range between Hv 200 and 300.

Figure 10:
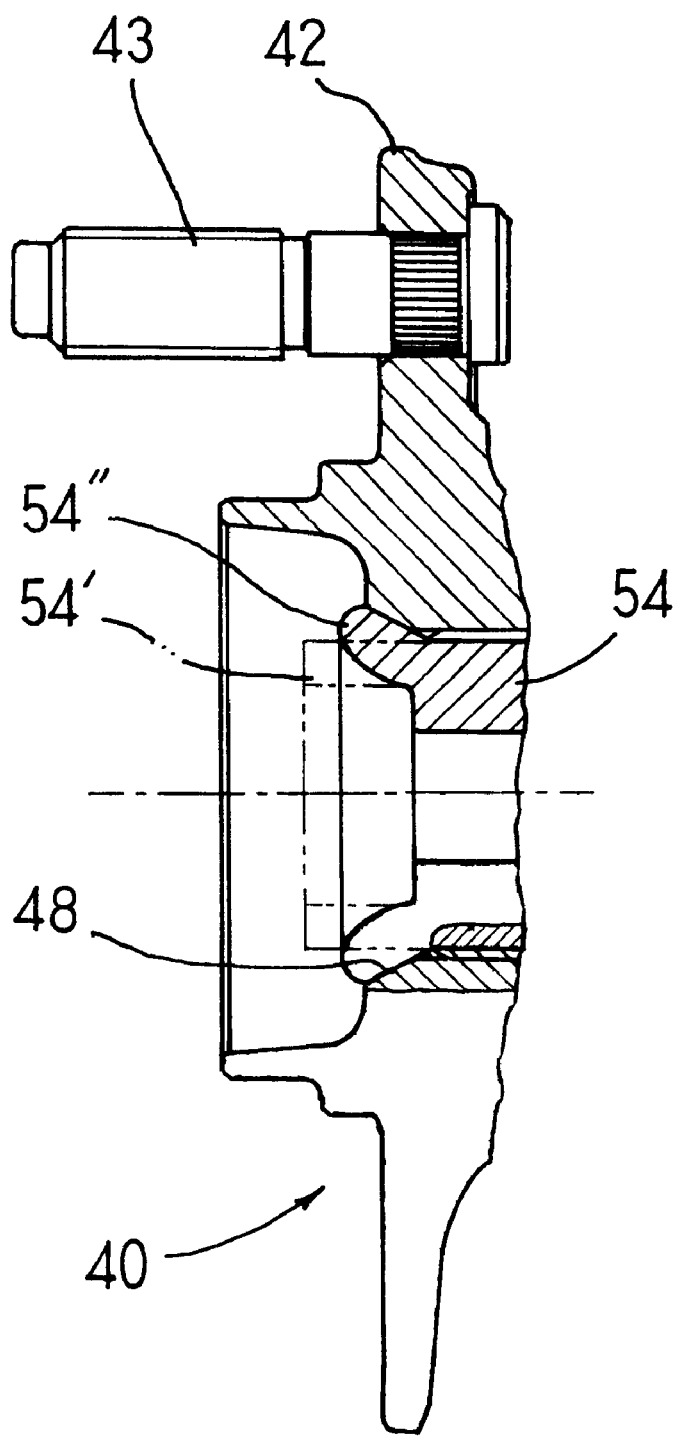
FIG. 10 is a sectional view in part of a modified bearing apparatus for a drive wheel.

In the embodiment shown in FIG. 9, the caulking operation is performed by drawing the outer periphery of the end portion of the stem portion 54, however, as shown in FIG. 10, it is possible to form the caulked portion 54'' by forming the hollow cylinder portion 54' in at least the end portion of the stem portion 54 and expanding the hollow cylinder portion 54' outward in the radial direction. In this case, when the end inner wall 48 of the inner member 40 is formed in a conical shape so as to have a greater diameter as closing to the end surface as illustrated, not only the caulking operation can be easily performed but also the inner member 40 is prevented from being deformed so as to achieve a secure connection. Further, in the same manner as that in FIG. 9, the hardened layer is formed as expressed by the hating in the lower half portion.

Figure 11:
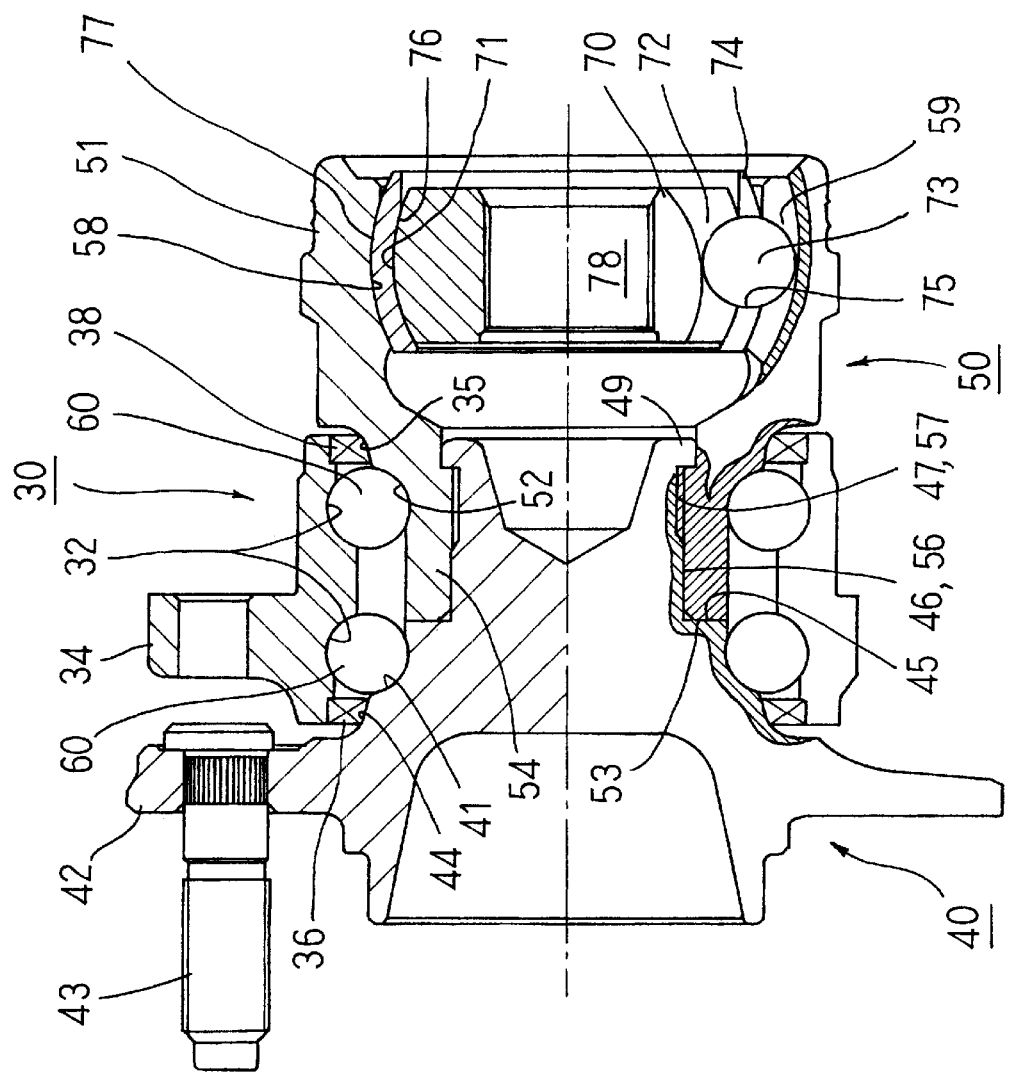
FIG. 11 is a sectional view similar to FIG. 9, showing another modification.

In all of the embodiments mentioned above, the stem portion 54 of the outer joint member 50 among the inner member 40 and the outer joint member 50 fitted with each other is set to the member positioned inside, that is, the inner fitting member, however, on the contrary, the structure can be made such that the inner member 40 is set to the inner fitting member as shown in FIG. 11. In this case, since the structure and the operation of the other portions in FIG. 11 are the same as those in FIGS. 9 and 10 mentioned above, a description thereof will be omitted.

Figure 12A:
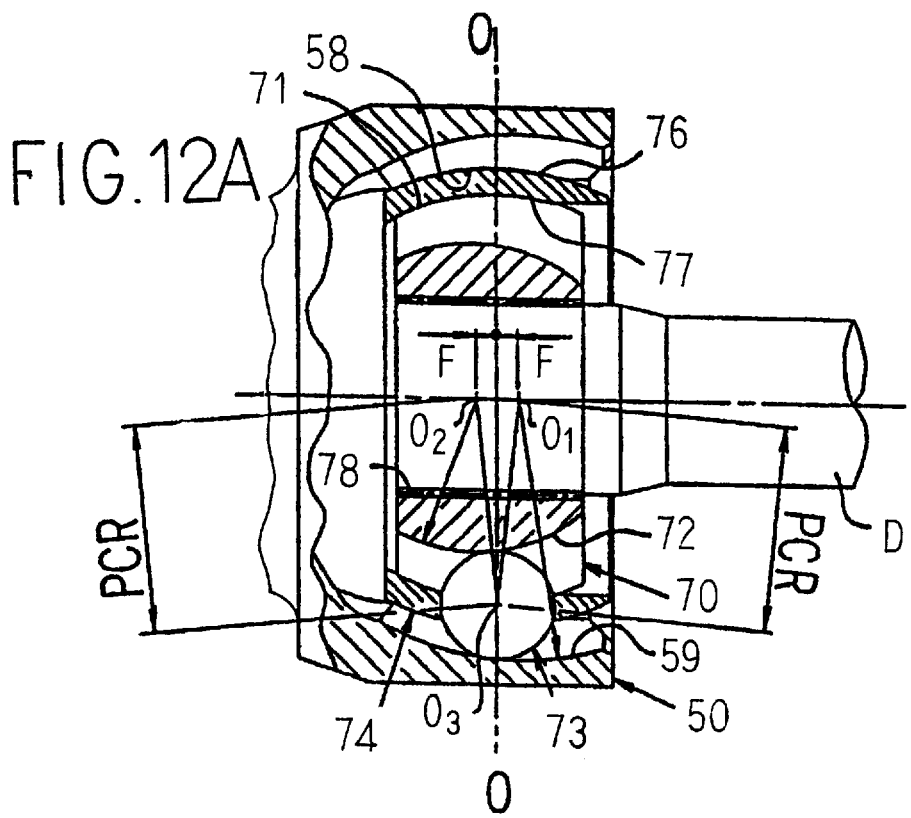
FIGS. 12A and 12B are longitudinal sectional view and a cross sectional view, respectively, showing a further modification.
Figure 12B:
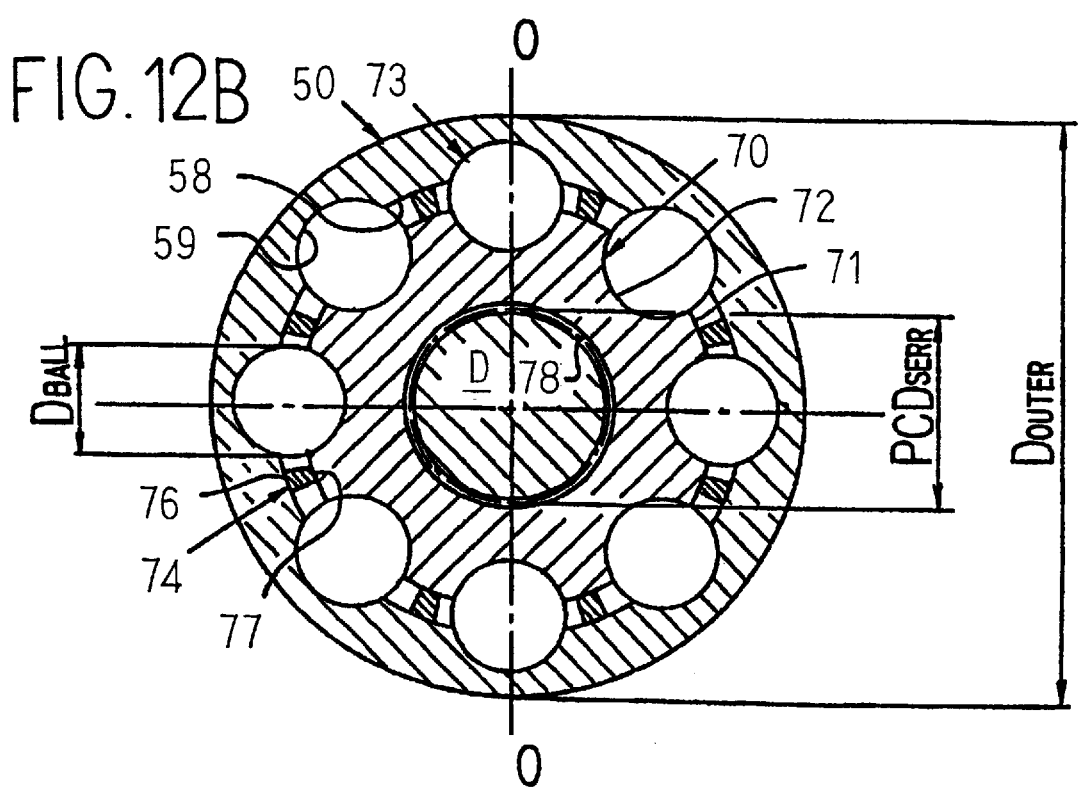

With respect to the constant velocity joint, the number of the torque transmitting balls is conventionally six in general, however, as shown in FIGS. 12A and 12B, it is possible to employ a type using eight torque transmitting balls 73. This constant velocity joint is mainly constituted by the outer joint member 50, the inner joint member 70, a plurality of torque transmitting balls 73 and a retainer 74, as illustrated. The outer joint member 50 has a spherical inner peripheral surface 58, and eight track grooves 59 extending in an axial direction are formed at equally spaced interval in a circumferential direction. The inner joint member 70 has a spherical outer peripheral surface 71, and eight track grooves 72 extending in an axial direction are formed at equally spaced interval in a circumferential direction. The inner joint member 70 has a serration hole 78 for connecting to the drive shaft D in the axial core portion. The track grooves 59 of the outer joint member 50 and the track grooves 72 of the inner joint member 70 form pairs so as to form eight ball tracks, and one torque transmitting ball 73 is assembled in each of the pairs of ball tracks. The torque transmitting balls 73 are held within the same plane by the retainer 74.

A center of curvature O1 of the track groove 59 of the outer joint member 50 and a center of curvature O2 of the track groove 72 of the inner joint member 70 are respectively off-set with respect to a center of a spherical surface of the inner peripheral surface 58 and a center of a spherical surface of the outer peripheral surface 71 by an even distance F in opposite directions along the axis, i.e., the center of curvature O1 is off-set forward the opening end of the joint and the center of curvature O2 the innermost part of the joint.

Both of a center of a spherical surface of an outer peripheral surface 76 of the retainer 74 and a center of a spherical surface of the inner peripheral surface 58 of the outer joint member 50 corresponding to a guide surface for the outer peripheral surface 76 of the retainer 70 are within a joint center surface O including a center O3 of the torque transmitting ball 73. Further, both of the center of a spherical surface of an inner peripheral surface of the retainer 74 and a center of a spherical surface of the outer peripheral surface 71 of the inner joint member 70 corresponding to a guide surface of the inner peripheral surface 77 of the retainer 74 are within the joint center surface O. Accordingly, the offset amount F of the outer joint member 50 equals to an axial distance between the center of curvature O1 of the track groove 59 and the joint center surface O, and the offset amount F of the inner joint member 70 equals to an axial distance between the center of curvature O2 of the track groove 72 and the joint center surface O, and both are equal to each other. The center of curvature O1 of the track groove 59 of the outer joint member 50 and the center of curvature O2 of the track groove 72 of the inner joint member 70 are positioned shifted to an opposite side (the center O1 of the track groove 59 is shifted to the open side of the joint and the center O2 of the track groove 72 is shifted to the back side of the joint) at an even distance (F) in an axial direction with respect to the joint center surface O. A length of a line connecting between the center of curvature O1 of the track groove 59 of the outer joint member 50 and the center O3 of the torque transmitting ball 73 and a length of a line connecting between the center O2 of the track groove 72 of the inner joint member 70 and the center O3 of the torque transmitting ball 73 are respectively PCR, and both distances are equal to each other.

When the outer joint member 50 and the inner joint member 70 are angular displaced at an angle θ, the torque transmitting balls 73 guided to the retainer 74 are always maintained within a binary surface (θ/2) of the angle θ with respect to any operating angle θ, so that the constant velocityity of the joint can be secured.

Here, in addition to the structure mentioned above, main sizes of the joint are set to the following values.

1) It is preferable in view of keeping a strength of the outer joint member or the like, securing a load volume and securing a durability to set a ratio r1 (=$PCT_{BALL}/D_{BALL}$) between a pitch circle diameter $PCD_{BALL}$ ($PCD_{BALL}=2\times PCR$) of the torque transmitting ball 73 and a diameter $D_{BALL}$ thereof to a range $3.3 \leq r1 \leq 5.0$, more preferably, to a range $3.5 \leq r1 \leq 5.0$ ($3.5 < r1 \leq 5.0$), however, in this embodiment, r1=3.93 is set.

2) A ratio r2 (=$D_{OUTER}/PCD_{SERR}$) between an outer diameter $D_{OUTER}$ of the outer joint member 50 and a pitch circle diameter $PCD_{SERR}$ of a serration of the inner joint member 70 is set to a range $2.5 \leq r2 \leq 3.5$, for example, to a value within a range $2.5 \leq r2 < 3.5$. In this case, the structure of the item 1) may be independently employed.

In the constant velocity joint in accordance with this embodiment, since the number of the torque transmitting balls 73 is eight and a rate of a load per one torque transmitting ball occupied in all of the load volume is less than the constant velocity joint using six torque transmitting balls, it is possible to reduce the diameter DBALL of the torque transmitting ball 73 and secure the thickness of the outer joint member 50 and the thickness of the inner joint member 70 in the same degree as that of the constant velocity joint having six balls. Further, it is possible to make the structure more compact while making the ratio r2 (=$D_{OUTER}/D_{SERR}$) small ($2.5 \leq r2 < 3.2$) and securing the strength, the load volume and the durability equal to or more than those of the constant velocity joint having six balls. The offset amount of the track grooves 59 and 72 is preferably set to the following value. As mentioned above, it is preferable in view of securing the allowable load torque, securing the strength of the retainer, reducing the track load, securing the durability and securing the maximum operating angle that the offset amount F of the track grooves 59 and 72 is set so that the ratio r1 (=F/PCR) is within a range $0.069 \leq R1 \leq 0.121$, however, in this embodiment, R1=0.104 (or 0.14) is set, and is significantly smaller than that of the constant velocity joint having six balls. Then, it is possible to lighten 10% or more by integrally structuring with the tire wheel bearing together with making compact in the axial direction.

Figure 27:
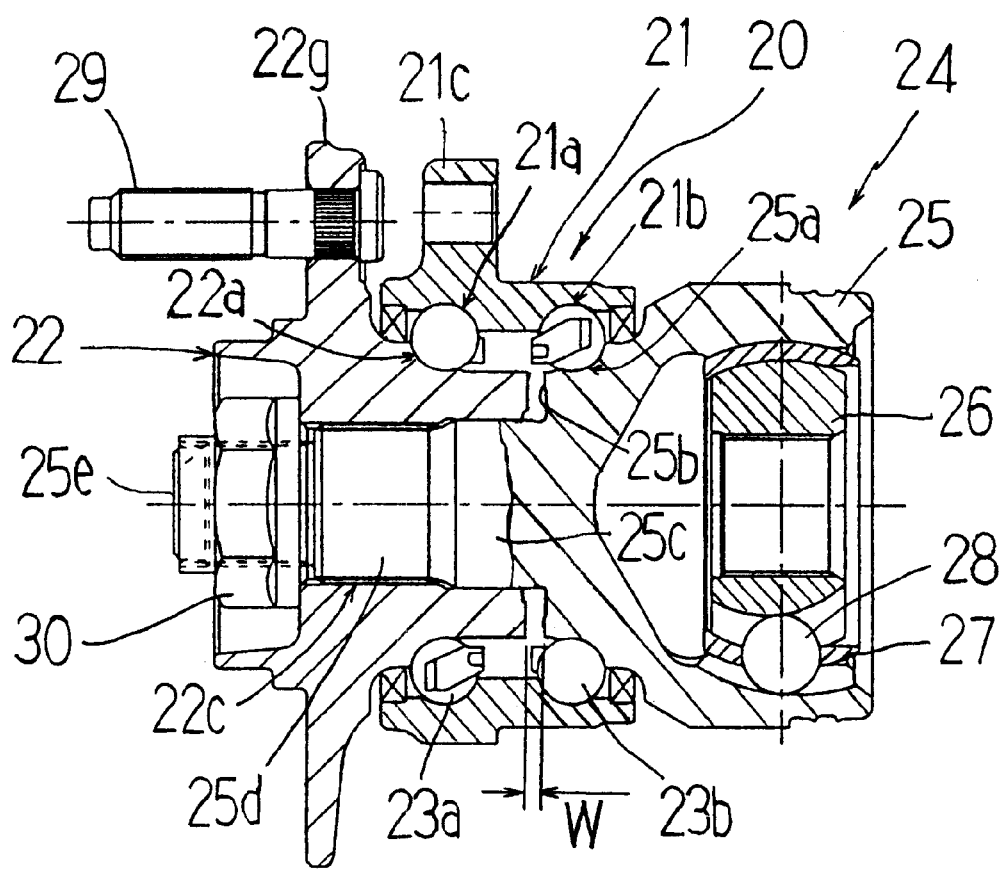
FIG. 27 is a sectional view of a bearing apparatus of a tire wheel for explaining an object of the present invention.

A bearing apparatus for a drive wheel thought in a step of developing the present invention is shown in FIG. 27. The bearing apparatus for the drive wheel is constituted by a tire wheel bearing portion 20 having an outer wheel 21, an axle 22 and double-rows of balls 23a and 23b, and a constant velocity joint 24 having an outer joint member 25, an inner joint member 26, a plurality of balls 28 and the like.

One inner track surface 22a among plural inner track surfaces opposing to plural outer track surfaces 21a and 21b provided on an inner periphery of the outer wheel 21 is formed on an outer periphery of the axle 22, and another inner track surface 25a is formed on an outer periphery of the outer joint member 25 in the constant velocity joint 24. A flange 21c for fixing to a vehicle body (not shown) is integrally provided on an outer periphery of the outer wheel 21.

The axle 22 is formed in a hollow cylindrical shape, and a spline 22c fitted and spline connected to the outer joint member 25 of the constant velocity joint 24 is formed therein. A flange 22g for attaching a hub bolt 29 is integrally provided on an outer periphery in one end side of the axle 22.

The constant velocity joint 24 is mainly constituted by the outer joint member 25, the inner joint member 26, a plurality of balls 28 interposed between both of the members 25 and 26 for transmitting a torque, and a cage 27 holding the balls 28. One end of a drive shaft (not shown) is connected to the inner joint member 26. The outer joint member 25 is constituted by an arm-shaped mouth portion and a stem portion, and a vertical shoulder portion 25b being vertical to an axial line is positioned at a boundary of both elements. The inner joint member 26, the balls 28 and the cage 27 are received within the mouth portion. A force fitting portion 25c having a cylindrical outer peripheral surface, a spline shaft portion 25d and a screw shaft portion 25e are continuously provided in the stem-portion from the shoulder portion 25b toward the axial end.

An assembly of the bearing apparatus for the drive wheel shown in FIG. 27 is performed as follows. In a state of interposing one row of balls 23a between the outer wheel 21 and the axle 22 and interposing one row of balls 23b between the outer wheel 21 and the outer joint member 25, the axle 22 is force fitted to the force fitting portion 25c formed in the stem of the outer joint member 25. The spline 22c of the axle 22 is spline connected to the spline shaft portion 25d of the outer joint member 25 and the nut 30 is screwed with the screw shaft portion 25e, thereby fastening the axle 22 to the outer joint member 25 by the nut 30.

In this case, it is advantageous in view of a rolling service life, a rigidity and a fretting of the bearing that the bearing apparatus for the drive wheel shown in FIG. 27 is used in a state that a bearing axial gap is negative, that is, a predetermined preload is applied, however, since it is hard in view of controlling the gap to measure a negative gap, the structure is made such that an initial gap is set by estimating a reduced amount of the gap generated by force fitting the axle 22 to the stem of the outer joint member 25 and a reduced amount of the gap generated by fastening the nut 30.

In the bearing apparatus of the tire wheel shown in FIG. 27, since there is no means for actually measuring an optimum amount of a preload (an optimum gap) even when the optimum amount of the preload is set in view of the service life and the rigidity of the bearing, and a fastening torque of the nut 30 has a dispersion, there is left problems in a reliability. Further, in the case that the nut fastening is performed so that a desired interval W exists between the end surface of the axle 22 and the shoulder 25b of the opposing outer joint member 25, since the interval W exists between both elements at a time of finishing force fitting the outer joint member 25 to the axle 22, the outer joint member 25 finely moves to the axle 22 side within a range of the interval W due to an impact at a time of drive, and there is a possibility that a preload equal to or more than necessity is applied to the bearing.

Figure 15:
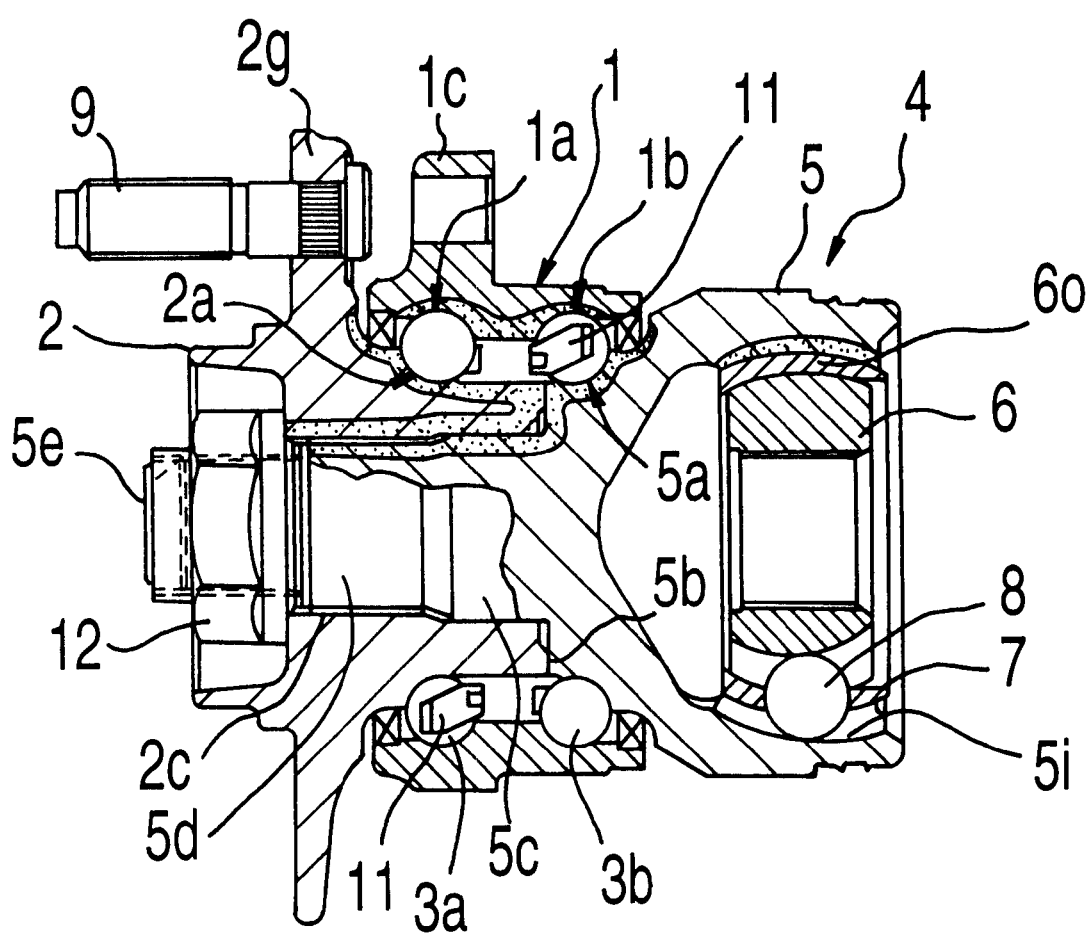
FIG. 15 is a sectional view of a bearing apparatus for a drive wheel, showing other embodiment of the invention.

A bearing apparatus for a drive wheel shown in FIG. 15 is structured such as to secure a negative gap. A basic structure of the bearing apparatus for the drive wheel is the same as that of the apparatus shown in FIG. 27. The bearing apparatus for the drive wheel has an outer member, that is, an outer wheel 1 provided with double-rows of track surfaces 1a and 1b on an inner periphery, an inner member, that is, an axle 2 provided with a track surface 2a opposing to one track surface 1a of the outer wheel 1 on an outer periphery, an outer joint member 5 of a constant velocity universal joint 4 provided with a track surface 5a opposing to another track surface 1b of the outer wheel 1 on an outer periphery, double-rows of balls 3a and 3b arranged between the opposing track surfaces of the outer wheel 1, the axle 2 and the outer joint member 5, and a retainer 11 thereof. In an upper half portion of a center line in FIG. 15, a hardened layer is expressed by dotted area.

A flange 1c for fixing to a vehicle body (not shown) is integrally provided on the outer periphery of the outer wheel 1. A flange 2g for attaching a hub bolt 9 is integrally provided on an outer periphery of a shaft end of the cylindrical axle 2, and a spline 2c to which the outer joint member 5 is spline connected is formed on an inner periphery of the axle 2. An inner joint member 6 is attached within the outer joint member 5 of the constant velocity joint 4 via a cage 7 and a plurality of balls 8 between the track grooves $5_i$ and $6_o$ of the outer and inner joint members 5 and 6, respectively, and one end of a drive shaft is connected to the inner joint member 6. A shoulder portion 5b continuously provided from the track surface 5a so as to form a step form is formed on an outer periphery of the front end portion of the outer joint member 5, and a cylindrical force fitting portion 5c, a spline shaft portion 5d and a screw shaft portion 5e are integrally continuously provided in an axial direction from the shoulder portion 5b.

An assembly of the bearing apparatus for the drive wheel structured in the manner mentioned above is performed by force fitting the axle 2 to the force fitting portion 5c formed in the stem of the outer joint member 5, spline connecting the spline 2c of the axle 2 to the spline shaft portion 5d and screwing a nut 12 to the screw shaft portion 5e so as to fasten the axle 2 to the outer joint member 5 in a state of interposing one row of balls 3a between the outer wheel 1 and the axle 2 and interposing one row of balls 3b between the outer wheel 1 and the outer joint member 5. This fastening is performed in a state of bringing the shoulder portion 5b of the outer joint member 5 opposing to the end surface into contact with the end surface of the axle 2, that is, in a negative gap.

Figure 16:
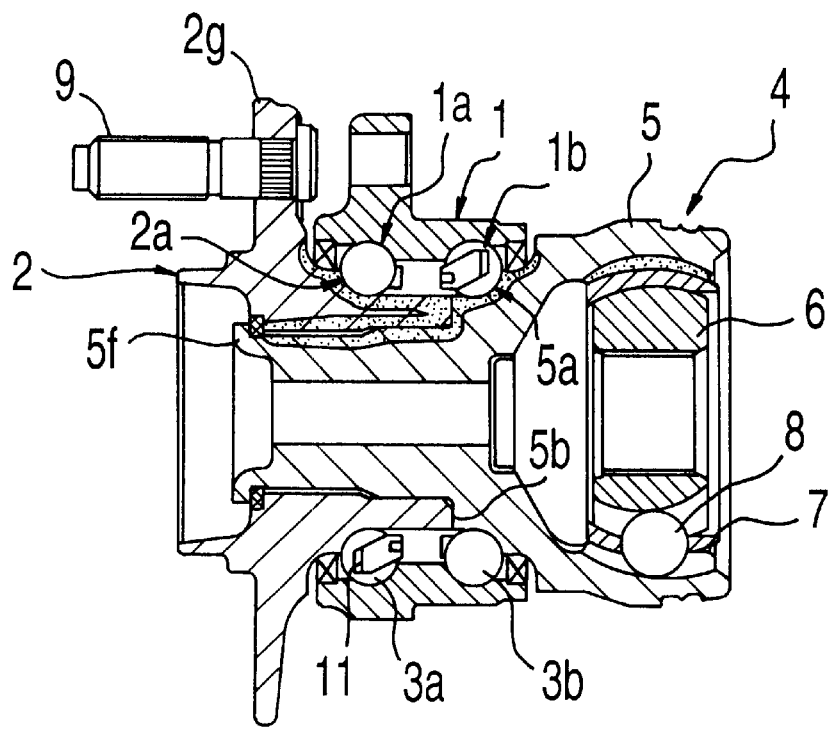
FIG. 16 is a sectional view similar to FIG. 15, showing a modification.

FIG. 16 shows a modification which is different from the embodiment shown in FIG. 15 on in a point that the outer joint member 5 of the constant velocity joint 4 is connected to the axle 2 in accordance with a caulking method, and the same reference numerals denote the same elements as those in FIG. 15. In FIG. 16, the assembly is performed by caulking a caulked portion 5f formed in the front end of the outer joint member 5 to the axle 2 side in a state of force fitting the outer joint member 5 into the axle 2 so as to bring the shoulder portion 5b into contact with the end surface of the axle 2.

Figure 17:
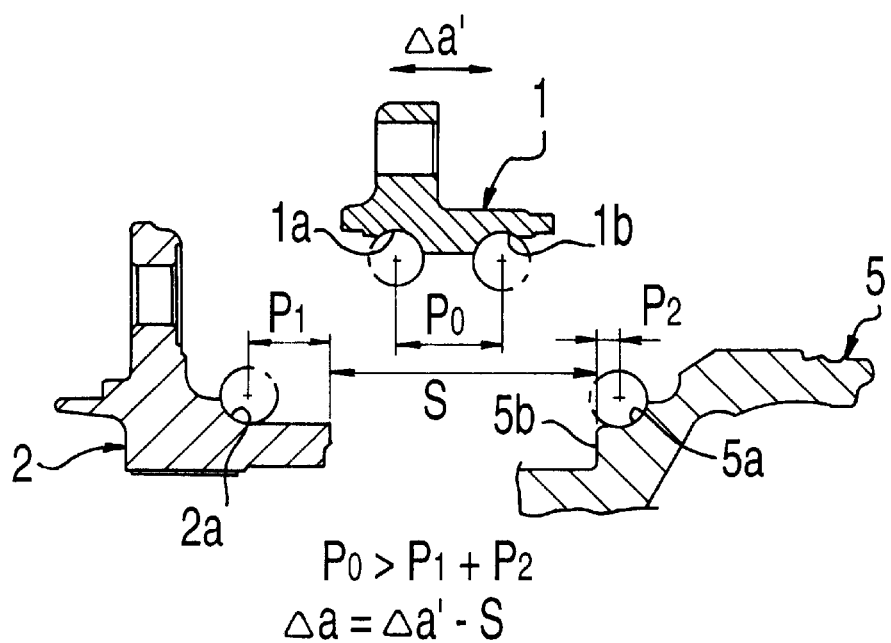
FIG. 17 is a schematic sectional view showing a relation of size between an outer wheel, an axle and an outer joint member.

The bearing clearance in the bearing apparatuses for the drive wheel in FIGS. 15 and 16 can be set to a desired negative gap by respectively controlling and selectively combining a pitch $P_0$ and a groove diameter of the double-rows of track surfaces 1a and 1b in the outer wheel 1, an axial size $P_1$ and a groove diameter between the track surface 2a of the axle 2 and the end surface, and an axial size $P_2$ between the track surface 5a of the outer joint member 5 and the shoulder portion 5b in accordance with a formula of relation $P_0 > P_1 + P_2$ of the constituting elements of the plural angular ball bearing, as shown FIG. 17, in the bearing working step. Accordingly, as in the apparatus shown in FIG. 17, it is not necessary to control the bearing clearance in accordance with a fastening torque of the nut in the assembling step, it is secure to set the bearing clearance, and no change is applied to the bearing clearance after assembling. Further, a reliability against the bearing service life or the like can be significantly improved by measuring the negative gap set to a desired value as mentioned above in accordance with the method mentioned below and securing this.

The bearing axial gap $\Delta a$ of the bearing apparatus for the drive wheel mentioned above can be measured in the order shown in FIGS. 18A–18C in the step of force fitting the outer joint member 5 to the axle 2.

Figure 18A:
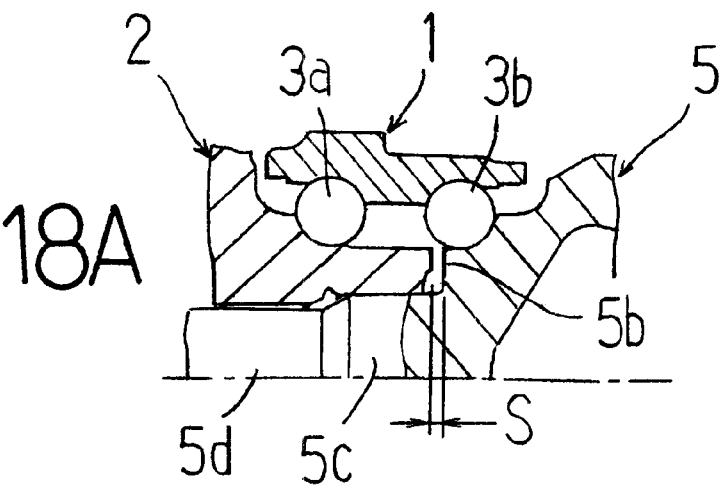
FIGS. 18A–18C are partial sectional views in the order of steps for explaining a gap control.
Figure 19:
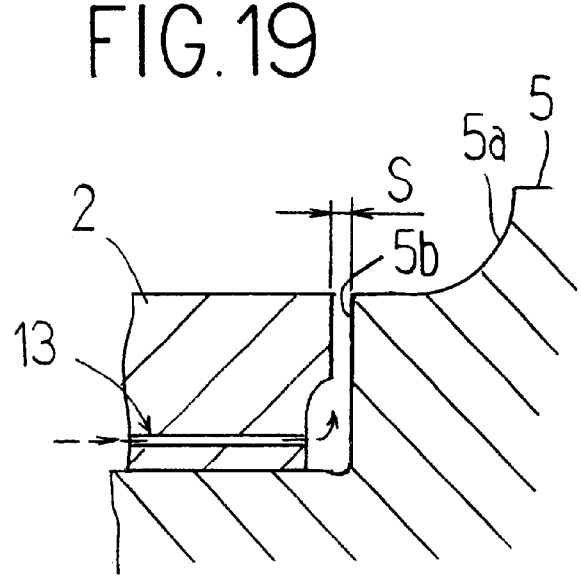
FIG. 19 is a partly enlarged sectional view of the axle and the outer joint member in an assembling step.

At first, the axle 2 is force fitted to the outer joint member 5 as shown in FIG. 18A and the force fitting is temporarily stopped when the shoulder portion 5b comes near the end surface of the opposing axle 2 to the desired interval S. The bearing axial gap at this time is positive, and the gap S at this time is measured. In this case, a method of measuring the gap S is not limited, for example, the gap S is measured by forming an air passage 13 communicating with the gap S in the axle 2 as shown in FIG. 19, injecting out a compressed air to the gap S from the air passage 13 and calculating a back pressure, a flow amount, a flow speed and the like of the compressed air at this time.

Figure 18B:
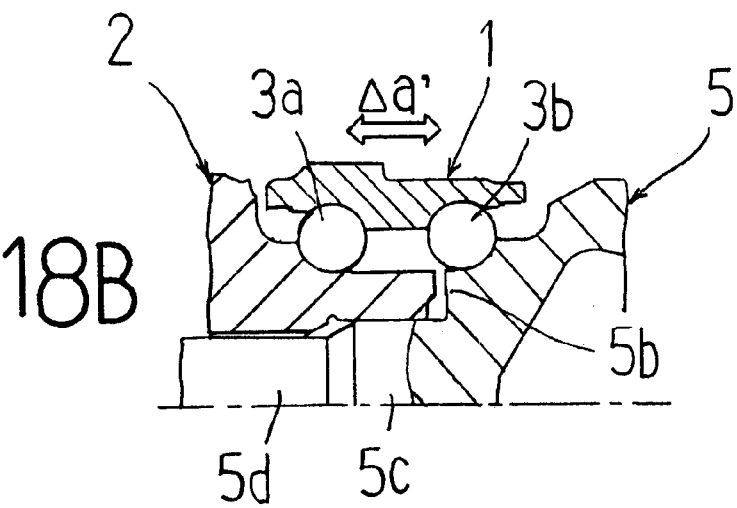
Figure 18C:
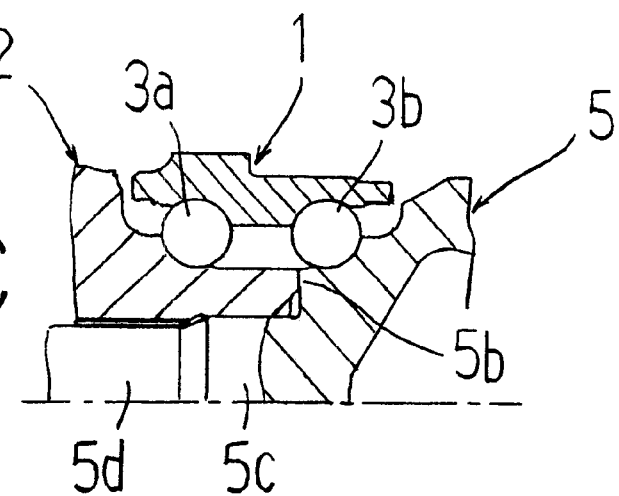

Next, a bearing axial gap $\Delta a'$ is measured from a maximum moving amount by oscillating the outer wheel 1 in an axial direction as shown in FIG. 18B.

Finally, the force fitting is completed by force fitting the axle 2 until the axle 2 is brought into contact with the shoulder portion 5b of the outer joint member 5 as shown in FIG. 4C. A stroke of force fitting at this time is S. In accordance with the operation mentioned above, it is possible to determine the negative bearing axial gap $\Delta a$ from a formula $\Delta a = \Delta a' - S$.

Figure 20:
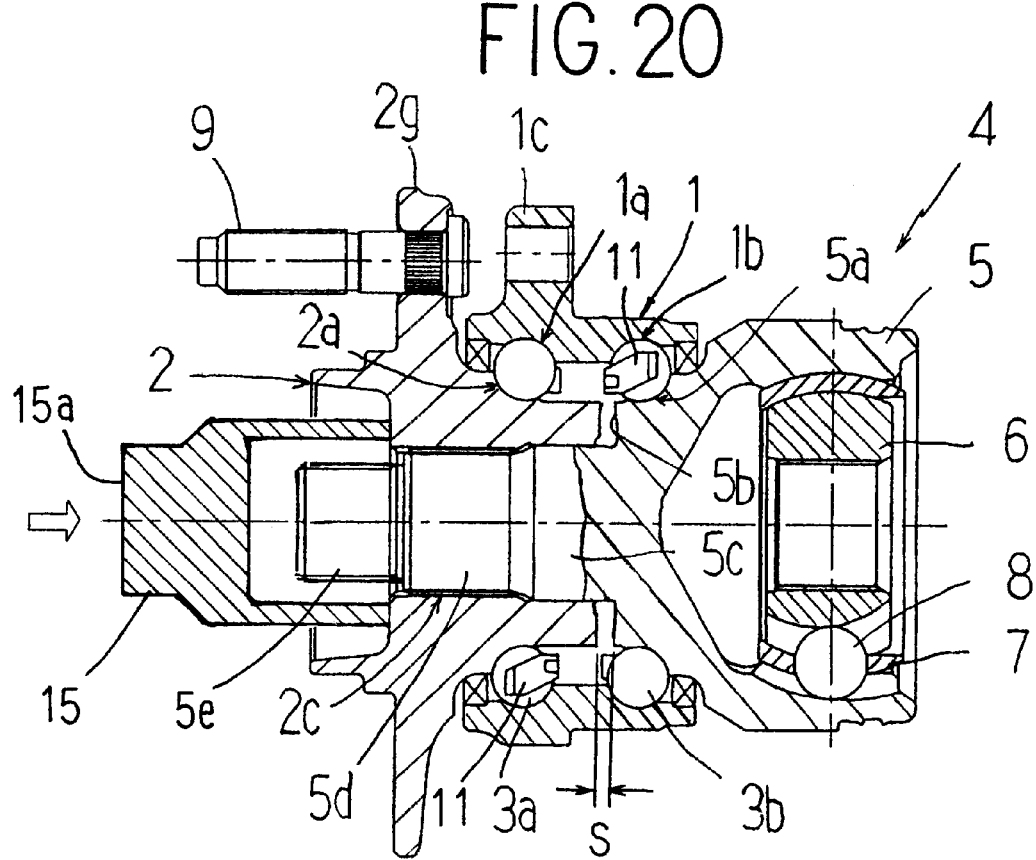
FIG. 20 is a sectional view of the bearing apparatus for the drive wheel in the assembling step.

In place of measuring the gap S mentioned above, the negative bearing axial gap $\Delta a$ may be determined by measuring a stroke of force fitting after temporarily stopping force fitting before completing the force fitting, measuring a difference (a moving amount) between a position of the end surface 15a of the force fitting jig 15 in a state shown in FIG. 18B and a position of the end surface 15a at a time of completing the force fitting, for example, as shown in FIG. 20, and calculating in accordance with a formula $\Delta a = \Delta a' - S$ from the measured value S. Further, on the contrary to FIG. 20, in the case of fixing the axle 2 and force fitting the outer joint member 5, the negative bearing axial gap $\Delta a$ can be determined by measuring the moving amount of the outer joint member and calculating in accordance with a formula $\Delta a = \Delta a' - S$ from the measured value.

The measuring method mentioned above can be applied to the bearing apparatus for the drive wheel of a type that an interval W is provided between the axle and the outer joint member as shown in FIG. 27. In this case, the negative bearing axial gap $\Delta a$ can be determined by measuring a stroke (S) of force fitting after temporarily stopping the force fitting of the axle 22 before completing the force fitting and calculating in accordance with the formula $\Delta a = \Delta a' - S$. In this case, there is a risk that when the interval W exists, the bearing clearance is changed within the range. Accordingly, it is advantageous in view of an operability and a reliability that the negative gap controlled on the basis of the measured value in a state of facing the axle to the outer joint member can be securely formed and maintained.

In the embodiments shown in FIGS. 15 and 16, the track surface 5a in the inboard side is directly formed on the outer peripheral portion of the outer joint member 5, however, as shown in FIG. 21, the method in accordance with the present invention can be applied to the bearing apparatus for the drive wheel employing an independent track wheel 14 in which the track surface 5a is formed on an outer periphery. In this case, the track wheel 14 can be force fitted to the outer peripheral surface of the small diameter step portion in the axle 2 and gripped between the shoulder portion of the small diameter step portion of the axle 2 and the shoulder surface 5b of the outer joint member 5 so as to be positioned in an axial direction. In this case, in this embodiment, as means for fixing the axle 2 and the outer joint member 5 in an axial direction, in place of the nut (FIG. 15) and the caulking (FIG. 16), a stop ring 15 is employed. That is, the outer joint member 5 is fitted to the axle 2 in the force fitting portion 5c, spline connected to the axle 2 in the spline portion 5d and prevented from being taken out by the stop ring 15.

In the upper half portion of the center line in FIG. 16, the dotted portion expresses the hardened layer. In this case, as the material constituting the outer joint member 5, there is employed a carbon steel containing 0.45 to 1.10 weight % carbon amount and a hardness of at least the end portion (the caulked portion 5f before being worked) is set to Hv 200 to 300. Accordingly, it is possible to secure a hardness (Hv 510 to 900) required for the inner track surface on the inboard side 5a portion and the track groove portion of the mouth portion and it is possible to sufficiently perform the caulking operation. That is, when the hardness of the end portion before forming the caulked portion 5f is over Hv 300, a crack is generated in a caulked portion 15e formed at a time of forming the end portion and the caulked portion 5f and the axle 2 are not closely attached due to an insufficient caulking, whereby a combination force between the axle 2 and the outer joint member 5 is insufficient. Further, the load required for forming the caulked portion 5f becomes excessive, so that there is generated a possibility that a damage such as an impression or the like is easily generated on the inner track surface 2a and the rolling element 1a due to the caulking operation, and a dimensional accuracy of each of the parts is deteriorated. Because it is hard to restrict the hardness of the end portion before forming the caulked portion 5f to be equal to or less than Hv 300 when the carbon amount of the carbon steel constituting the outer joint member 15 is over 1.10. On the contrary, when the hardness of the end portion does not reach HV 200, it is impossible to secure the hardness of the formed caulked portion 5f, and the connecting force by the caulked portion is insufficient. When the carbon amount of the carbon steel constituting the outer joint member 5 is less than 0.45 weight %, it is impossible to secure the hardness (Hv 510 to 900) required for the inner track surface in the inboard side 5a portion, and a service life of the inner track surface portion is reduced. Since the end portion (the caulked portion 5f before being worked) of the stem portion requires a ductility since the end portion of the stem portion corresponds to a portion to be caulked. Accordingly, the hardening treatment is not applied to the end portion for making it possible to caulk, and the end portion is left as a portion not hardened.

Thus, the outer joint member 5 can sufficiently secure a rolling fatigue service life of the inner track surface since the inner track surface in the inboard side 5a portion is hardened in accordance with a hardening treatment. On the contrary, since the end portion is not hardened and is kept raw, the force required for plastically deforming the end portion is not too large or there is no case that the damage such as a crack or the like is easily generated at the end portion (the caulked portion 5f) in the case of plastically deforming the end portion. Accordingly, even in the case of increasing the hardness of the inner track surface in the inboard side 5a portion so as to secure the rolling fatigue service life as mentioned above, it is not troublesome to work the caulked portion for connecting the outer joint member 5 and the axle 2. Further, since the hardened layer is formed all around the length of the inner peripheral surface of the axle 2, it is possible to prevent the axle 2 from being deformed and prevent the bearing inner gap from being shifted from the desired value even in the case that a great load is applied to the axle 2 together with working the caulked portion. Further, it is possible to prevent the diameter of the inner track surface in the outboard side 2a formed on the outer peripheral surface of the axle 2 from being changed and prevent an accuracy from being deteriorated, whereby it is possible to prevent the rolling fatigue service life of the inner track surface 2a from being reduced.

FIGS. 22A–22C show a modified embodiment of a gap control in the embodiment shown in FIG. 15. At first, the force fitting is temporarily stopped in a state of leaving a gap S between the facing surfaces as shown in FIG. 22A at a time of force fitting the outer joint member 5 to the axle 2 so as to assemble both elements. Then, in that state, the axial moving amount of the outer wheel 1 is measured as a bearing initial gap $\Delta a'$. Further, a distance between both end surfaces of the axle 2 and the outer joint member 5 at this time is measured as an initial total width $L_0$. Next, as shown in FIG. 22B, the facing surfaces of the axle 2 and the outer joint member 5 are faced with each other by continuously force fitting. A bearing clearance $\Delta a''$ at this time can be expressed by the formula $\Delta a''=\Delta a'-(L_0-L_1)$. Reference symbol $L_1$ denotes a total width after the force fitting. Finally, as shown in FIG. 22C, the assembly is completed by screwing a hub nut 12 into the screw portion 5e of the outer joint member 5. The bearing clearance $\Delta a$ at this time can be expressed by the formula $\Delta a=\Delta a'-(L_0-L_2)$. Reference symbol $L_2$ denotes a total width after fastening the nut. A reduction amount $\Delta n$ of the bearing by screwing the nut can be expressed by the formula $\Delta n=\Delta a-\Delta a''$.

FIGS. 23A–23C show a modified embodiment of a gap control in the case of integrally forming the axle 2 with the outer joint member 5 in accordance with the caulking operation in place of the nut screwing. At first, the force fitting is temporarily stopped in a state of leaving a gap S between the facing surfaces of both elements as shown in FIG. 23A at a time of force fitting the outer joint member 5 to the axle 2 so as to assemble both elements. Then, in that state, the axial moving amount of the outer wheel 1 is measured as a bearing initial gap $\Delta a'$. Next, as shown in FIG. 23B, the facing surfaces are faced with each other by continuously force fitting with using a preload and force fitting force receiving table and a caulking jig, and the caulking operation is performed in a state that the preload is applied. A bearing clearance $\Delta a$ at this time can be expressed by the formula $\Delta a=\Delta a'-(L_0-L_2)$. Reference symbol $L_0$ denotes an initial total width (FIG. 23A) and reference symbol $L_2$ denotes a total width (FIG. 23C) after caulking.

In FIG. 23B, there is employed a caulking operation (a coining) performed by force fitting the caulking jig into the outer joint member 5 and expanding the outer joint member 5 from the inner diameter side toward the outer diameter side so as to make the outer peripheral surface to eat into the inner peripheral surface of the inner member, however, as shown in FIGS. 24A and 24B, it is possible to employ a caulking operation performed by bending the axial end portion of the outer joint member 5. In this case, the gap can be controlled in the same manner as that in FIGS. 23A–23C.

Figure 25:
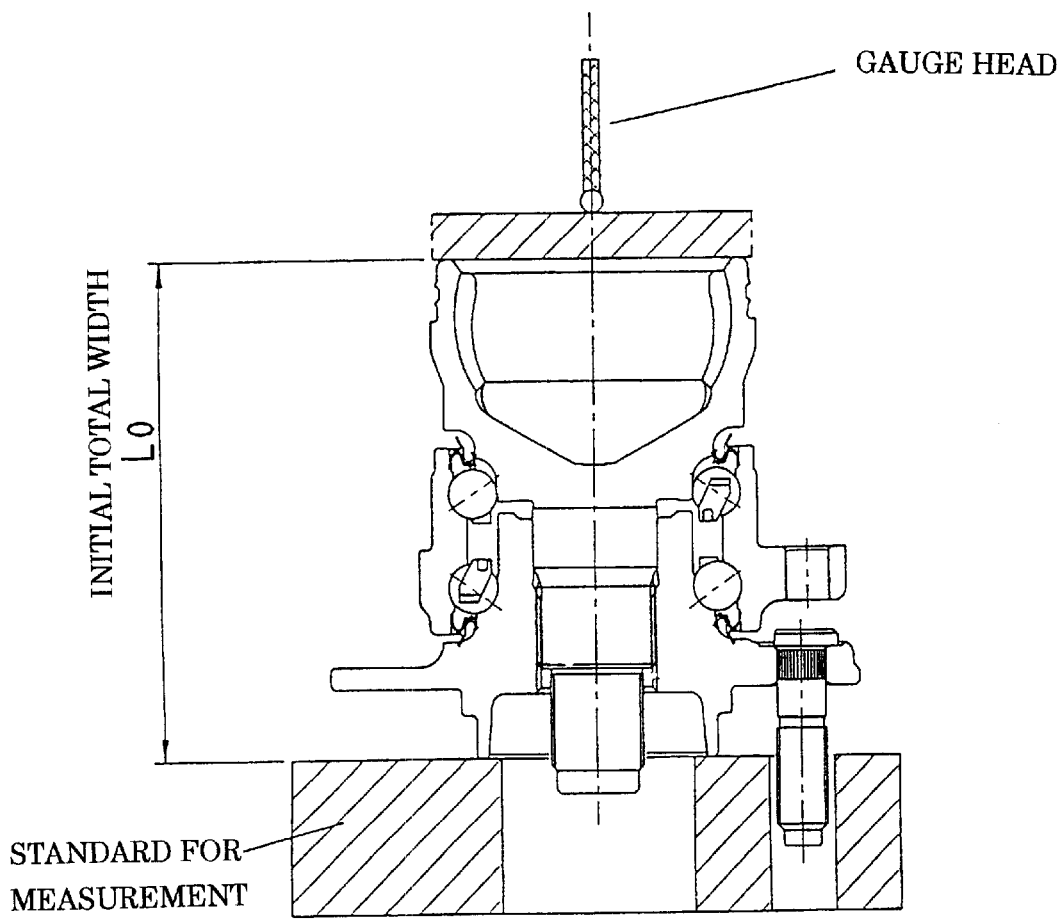
FIG. 25 is a sectional view for explaining a measuring method.
Figure 26:
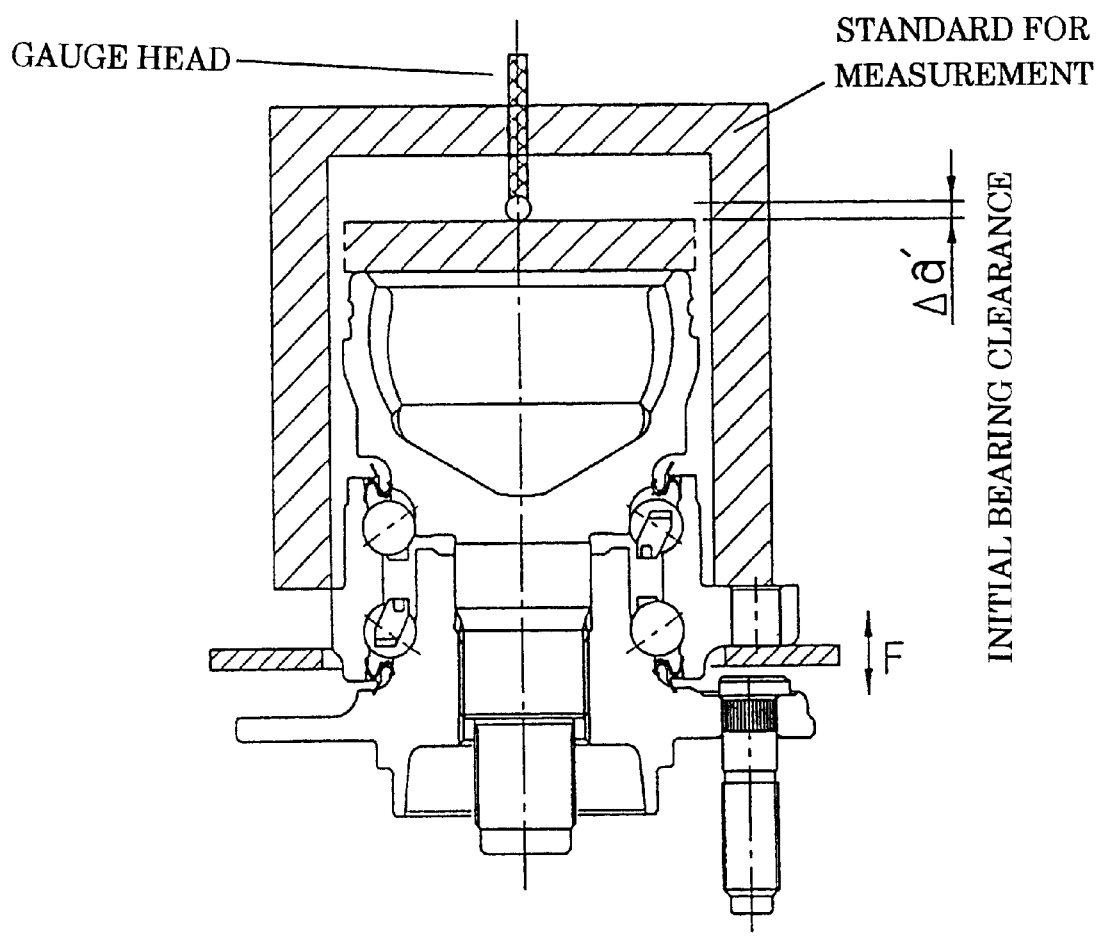
FIG. 26 is a sectional view for explaining a measuring method.

FIG. 25 exemplifies a method of measuring the total width. For example, in the case of measuring the initial total width $L_0$ as illustrated, an assembly in a state in FIG. 22A or FIG. 23A is mounted on a standard for measurement and a measuring device is brought into contact with an upper end thereof. FIG. 26 exemplifies a method of measuring a bearing initial gap. A lower end of the standard for measurement holding the measuring device is mounted on a flange 1c of the outer wheel 1 and the outer wheel 1 is moved in a vertical direction, whereby the moving amount is measured as the bearing initial gap $\Delta a'$.

Figure 39:
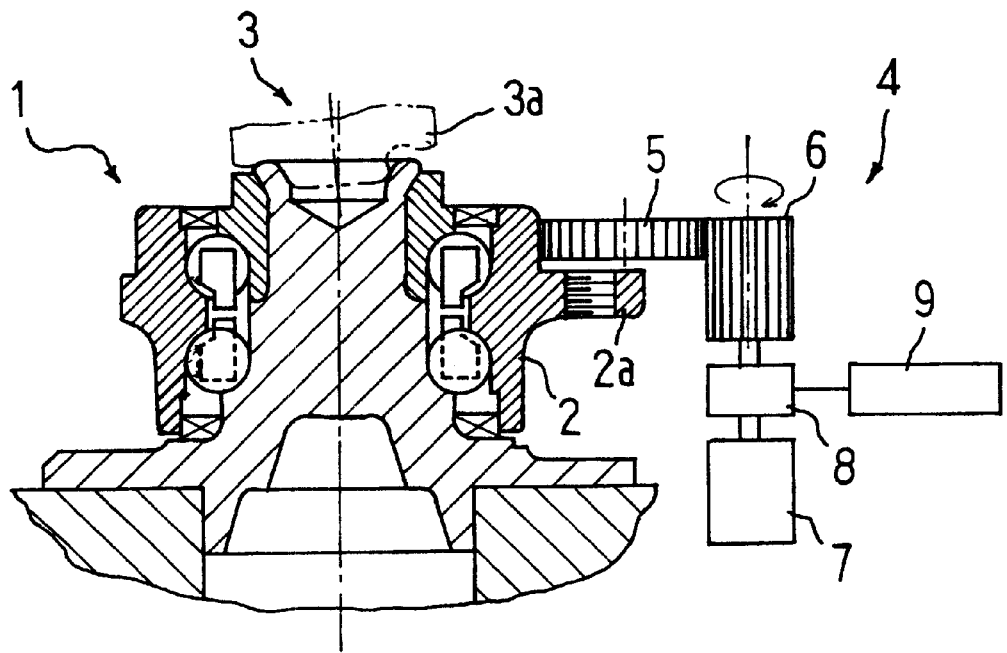
FIG. 39 is a schematic view for explaining a conventional art.

A technique of rotating a bearing at a time of assembling and working a bearing apparatus so as to measure a torque, thereby setting a preload as shown in FIG. 12 is described in Japanese Unexamined Patent Publication No. 11-44319. FIG. 39 schematically shows a structure of a preload monitor apparatus mounted to a combined bearing 1. A preload monitor apparatus 4 has a gear 5 to which a rubber member being contact with a side surface of an outer wheel 2 above a flange portion 2a is mounted, an outer wheel rotating gear 6 engaged with the gear 5, a motor 7 rotating and driving the gear 6, a torque detector 8 detecting a rotational torque of the motor 7, and a determining device 9 comparing a detected rotational torque with a predetermined value previously set. A wattmeter is used as the torque detector 8. The preload monitor apparatus 4 drives the motor 7, rotates the outer wheel 2 via the gears 6 and 5, detects a rotational torque of the outer wheel 2 by the torque detector 8, measures a preload on the basis of the detected rotational torque, and moves backward a swing motion type caulking apparatus 3 in the case that the measured preload reaches a predetermined value previously set, that is, a preload suitable for the combined bearing 1. Then, the preload monitor apparatus 4 confirms that an amount of preload is suitable by monitoring the rotational torque after finishing the caulking process by the swing motion type caulking apparatus 3.

Figure 40:
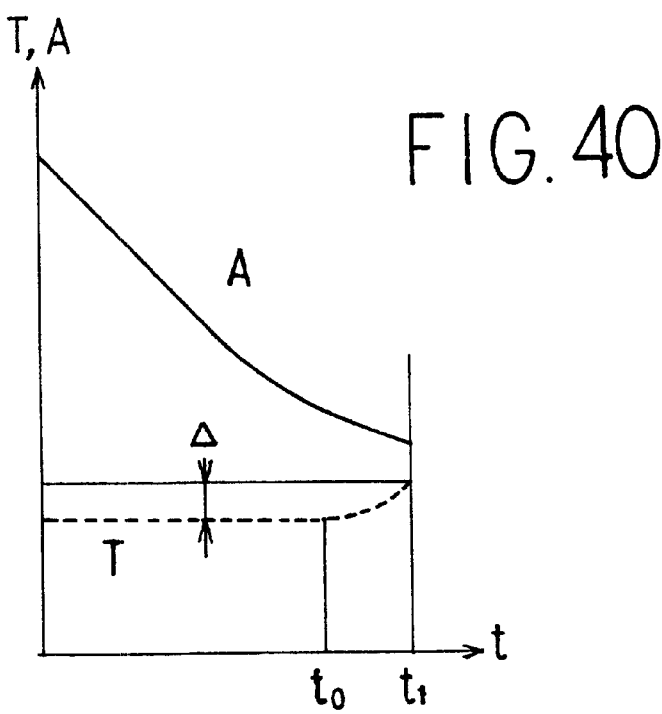
FIG. 40 is a graph showing a change of a caulking position A and a torque T of an oscillatory caulking apparatus with respect to a caulking process time t.

FIG. 40 is a graph showing a change of a position A and a torque T (vertical axis) of a caulking die 3a of the swing motion type caulking apparatus 3 with respect to a caulking process time t (horizontal axis). When gradually descending the position A of the caulking die 3a of the swing motion type caulking apparatus 3 so as to start the caulking process, a preload is applied to the combined bearing 1 after a certain time point $t_0$ and the rotational torque T starts changing. When the changing width reaches a predetermined width $\Delta$ previously set (a time point $t_1$), it is judged that the preload suitable for the combined bearing 1 is applied and the caulking process is finished. Accordingly, the position A of the caulking die 3a is returned to an original position.

In the conventional technique mentioned above, it is impossible to directly recognize by an amount of a preload what amount of preload is actually applied after the caulking process is completed. In the case of understanding a changing point of the torque and sensing a start of preload application, the torque is dependent upon the rotational number and a dispersion of torque is large, so that it is impossible to measure an accurate preload amount. In the combined bearing 1 shown in FIG. 39, the seal is attached, however, the torque is changed in accordance with whether or not the seal is provided even when the amount of the preload is the same.

Figure 28:
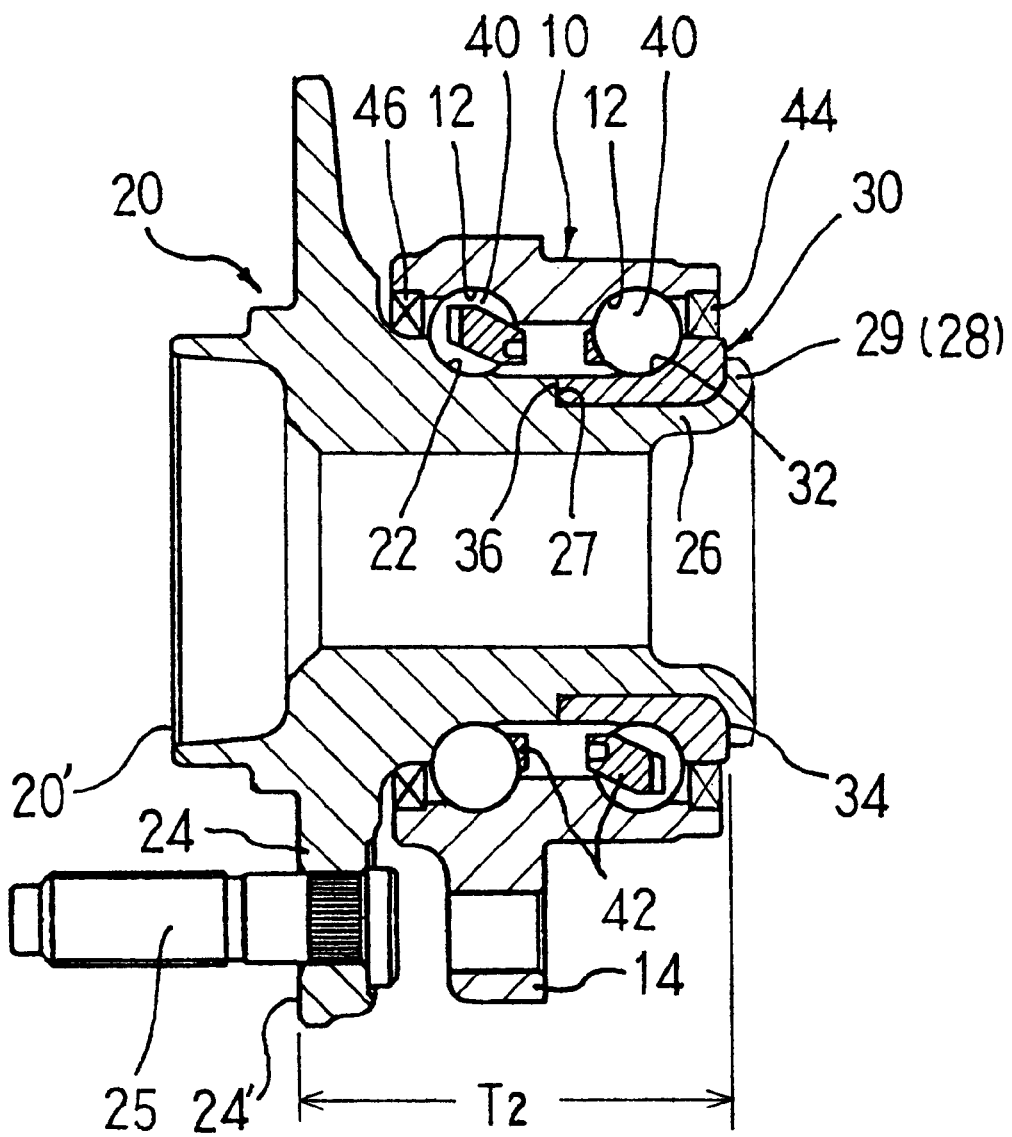
FIG. 28 is a sectional view of a bearing apparatus of a tire wheel showing still a further embodiment of the present invention.

A bearing apparatus of a tire wheel shown in FIG. 28 is mainly constituted by an outer member 10 having double-rows of outer wheel tracks 12 on an inner periphery, an inner member 20 and 30 having double-rows of inner wheel tracks 22 and 32 on an outer periphery, and double-rows of balls 40 interposed between the outer wheel track 12 and the inner wheel tracks 22 and 32 so as to freely roll.

The outer member 10 integrally has a flange 14 on an outer periphery, and is mounted to a suspension apparatus (not shown) of a vehicle body via the flange 14. The inner member 20 and 30 are here constituted by an axle 20 and an inner track wheel 30. A flange 24 for mounting a tire wheel (not shown) is integrally provided on an outer periphery of one end side of the axle 20, and a hub bolt 25 for fastening a wheel disc is planted at uniform intervals in a circumferential direction of the flange 24. A small diameter cylindrical portion 26 for fitting to the inner track wheel 30 is formed on an outer periphery in another end side of the axle 20. The inner track wheel 30 is force fitted to the small diameter cylindrical portion 26 of the axle 20, and is fixed in a state of facing a small end surface 36 to a shoulder portion 27 of the small diameter cylindrical portion 26 by caulking an end portion of the small diameter cylindrical portion 26 as shown by reference numeral 29. Accordingly, the inner member 20 and 30 integrally formed with the tire wheel is rotatably supported to the outer member 10.

Although, the illustrated bearing apparatus of the tire wheel is for a driven wheel, the bearing apparatus of the tire wheel may be used for a drive wheel by integrally forming the tire wheel 20 with a constant velocity joint as in an embodiment mentioned below. In FIG. 28, reference numeral 42 denotes a retainer for holding the ball 40. Further, seals 44 and 46 are mounted for preventing a lubricating grease charged into an inner portion of the bearing from leaking and preventing foreign materials, dirt water or the like from entering from an external portion.

When setting a bearing axial gap in the bearing apparatus of the tire wheel to $\delta_2$, the bearing axial gap $\delta_2$ can be actually measured without using a torque or the other parameters in a step of assembling the bearing apparatus of the tire wheel in the manner mentioned below in spite that the bearing axial gap $\delta_2$ is a negative value and can not be directly measured, so that a preload of the bearing apparatus of the tire wheel can be properly controlled.

Figure 29:
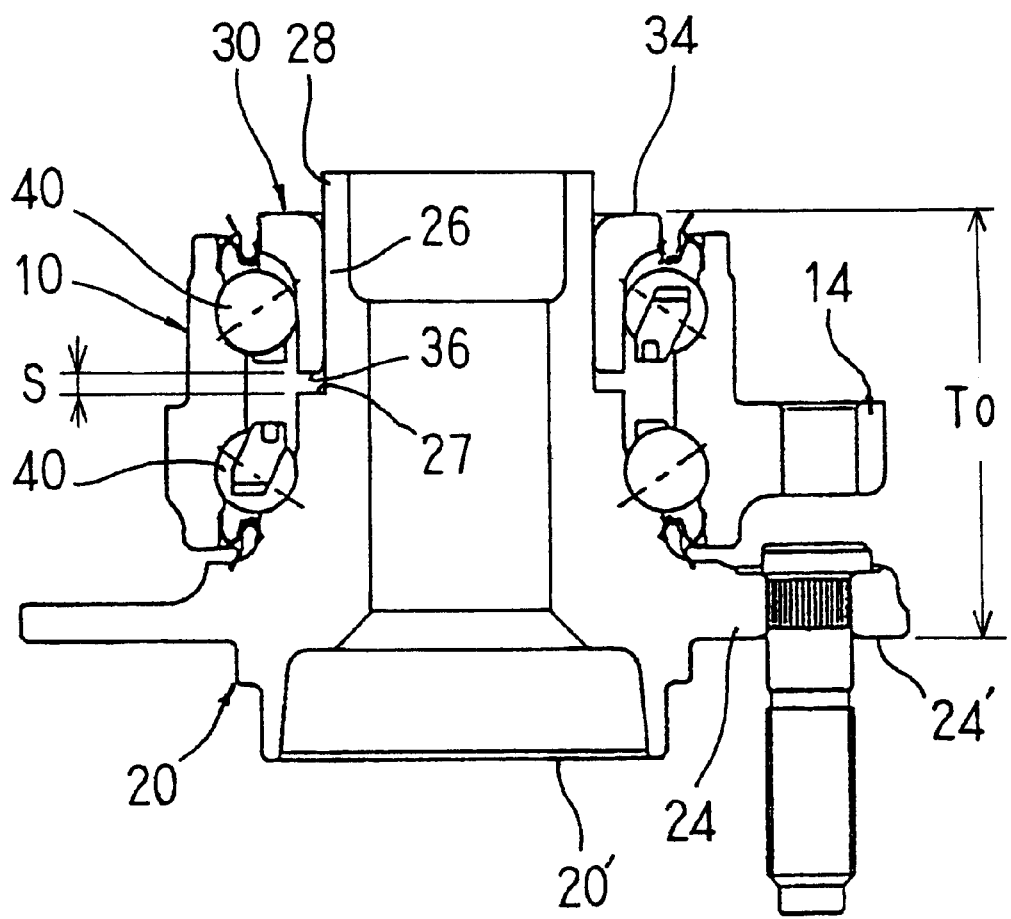
FIG. 29 is a sectional view of a force fitting step of the bearing apparatus of the tire wheel shown in FIG. 28.

At first, as shown in FIG. 29, in the step of assembling the bearing apparatus of the tire wheel, the inner track wheel 30 is force fitted to the small diameter cylindrical portion 26 of the axle 20, and the force fitting is temporarily stopped before the small end surface 36 of the inner track wheel 30 is brought into contact with the shoulder portion 27 of the small diameter cylindrical portion 26 in the axle 20. At this time, when force fitting the large end surface 34 of the inner track surface 30 to a predetermined position, a predetermined interval S is left between the small end surface 36 of the inner track wheel 30 and the shoulder portion 27 of the small diameter cylindrical portion 26 in the axle 20. Further, a bearing axial gap is positive. In this state, an axial size $T_0$ between a reference surface (the large end surface 34) of the inner track wheel 30 and a reference surface (a flange surface 24') of the axle 20 is measured, and an initial bearing axial gap $\delta_0$ is measured from an axial oscillating amount of the outer member 10.

Figure 30:
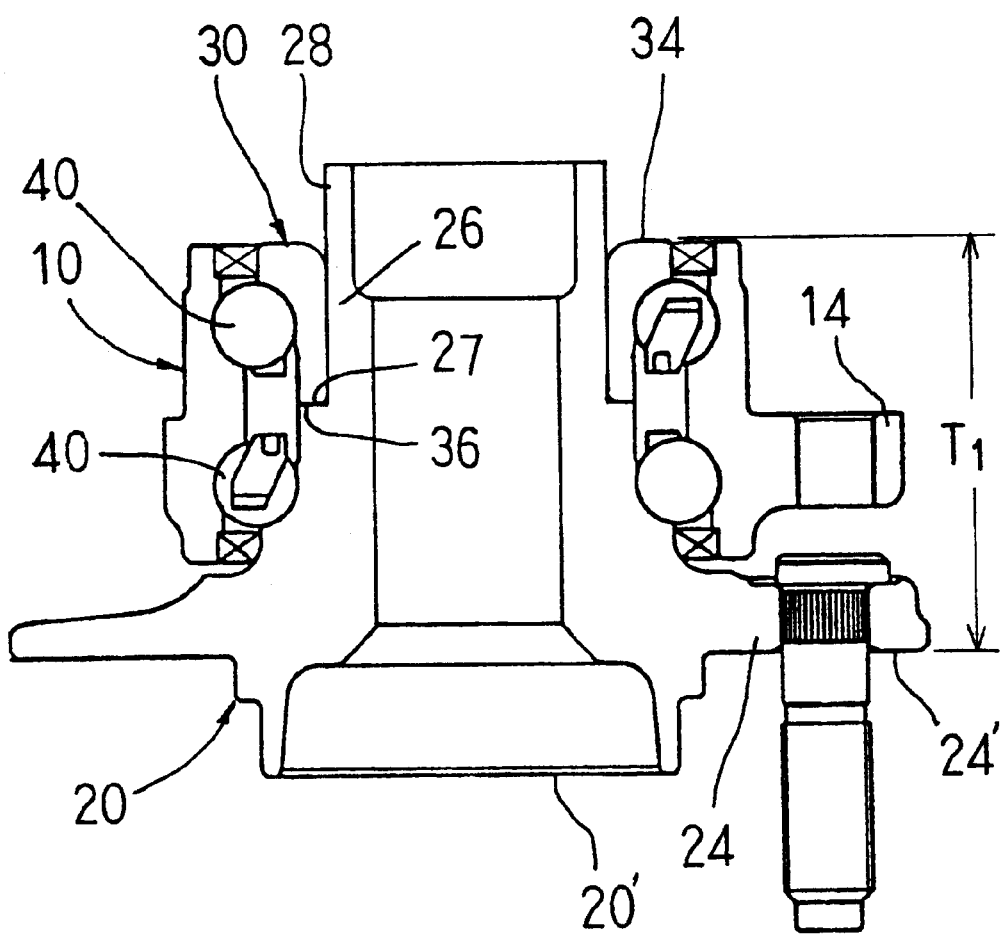
FIG. 30 is a sectional view at a time of completing a force fitting of the bearing apparatus of the tire wheel shown in FIG. 28.

Next, the force fitting is continuously performed, and as shown in FIG. 30, the small end surface 36 of the inner track wheel 30 is brought into contact with the shoulder portion 27 of the axle 20 and the force fitting is completed. After completing the force fitting, an axial size T1 between the reference surface 34 of the inner track wheel 30 and the reference surface 24' of the axle 20 is measured. Then, a bearing axial gap $\delta_1$ at this time is determined in accordance with the formula $\delta_1=\delta_0-(T_0-T_1)$.

Then, the inner track wheel 30 is fixed by bending and caulking the end portion 28 of the axle 20 as shown by reference numeral 29 in FIG. 28. Then, an axial size T2 between the reference surface 34 of the inner track wheel 30 after caulking and the reference surface 24' of the axle 20 is measured, and a bearing axial gap $\delta_2$ at this time is determined in accordance with the formula $\delta_2=\delta_1+(T_1-T_2)$.

Thus, an accurate value of the bearing axial gap $\delta_2$ after caulking can be determined on the basis of the actually measured value. Accordingly, it is possible to accurately control an amount of a preload corresponding to the bearing axial gap $\delta_2$.

In this case, as a reference surface for measuring the axial sizes (assembling widths) $T_0$, $T_1$ and $T_2$, a description is exemplified of the case of measuring by setting the flange surface 24' of the flange 24 in the axle 20 and the large end surface 34 of the inner track wheel 30 to the reference surfaces, however, with respect to the axle 20, the measurement may be performed by setting the end surface 20' in place of the flange surface 24' to the reference surface, and the same result as mentioned above can be obtained even in that case.

Figure 31:
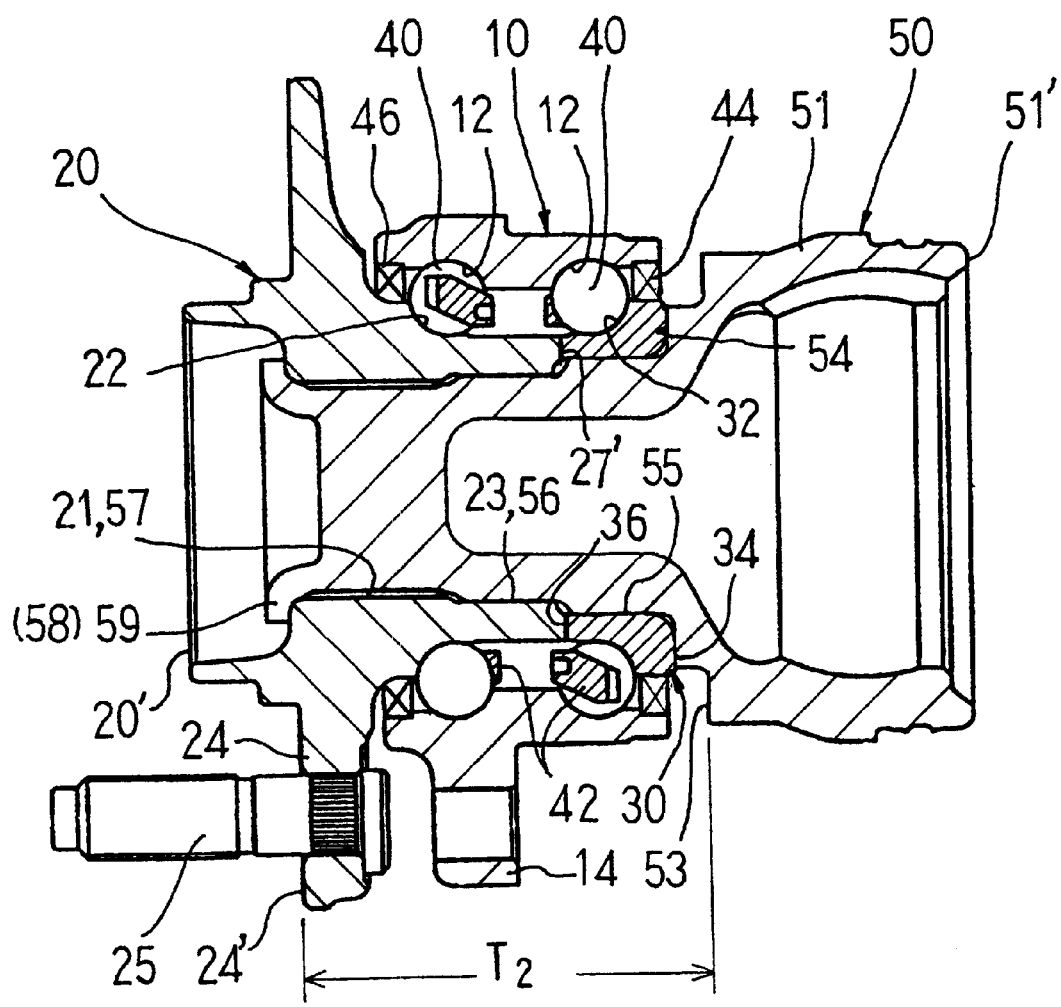
FIG. 31 is a sectional view similar to FIG. 28, showing a modification.

FIG. 31 shows a modified embodiment in the case of applying to a bearing apparatus of a tire wheel for a drive wheel. In this modification, the axle 20 and the outer joint member 50 of the constant velocity joint are integrally formed, and the inner track wheel 30 is fitted to the outer joint member 50. Since the inner track wheel 30 is not fitted to the axle 20, a small diameter cylindrical portion (26: See FIG. 28) is not required, so that it is possible to make a minimum outer diameter of the axle 20 large. As a result, it is possible to make a spline hole portion 21 of the axle 20 and a spline shaft portion 57 of the outer joint member 50 great, and accordingly it is possible to make the outer joint member 50 hollow as illustrated, whereby a light weight can be achieved. The bearing axial gap $\delta_2$ in the bearing apparatus of the tire wheel can be actually measured in a step of assembling the bearing apparatus of the tire wheel without using the torque and the other parameters in the manner mentioned below, whereby the preload of the bearing apparatus of the tire wheel can be properly controlled.

Figure 32:
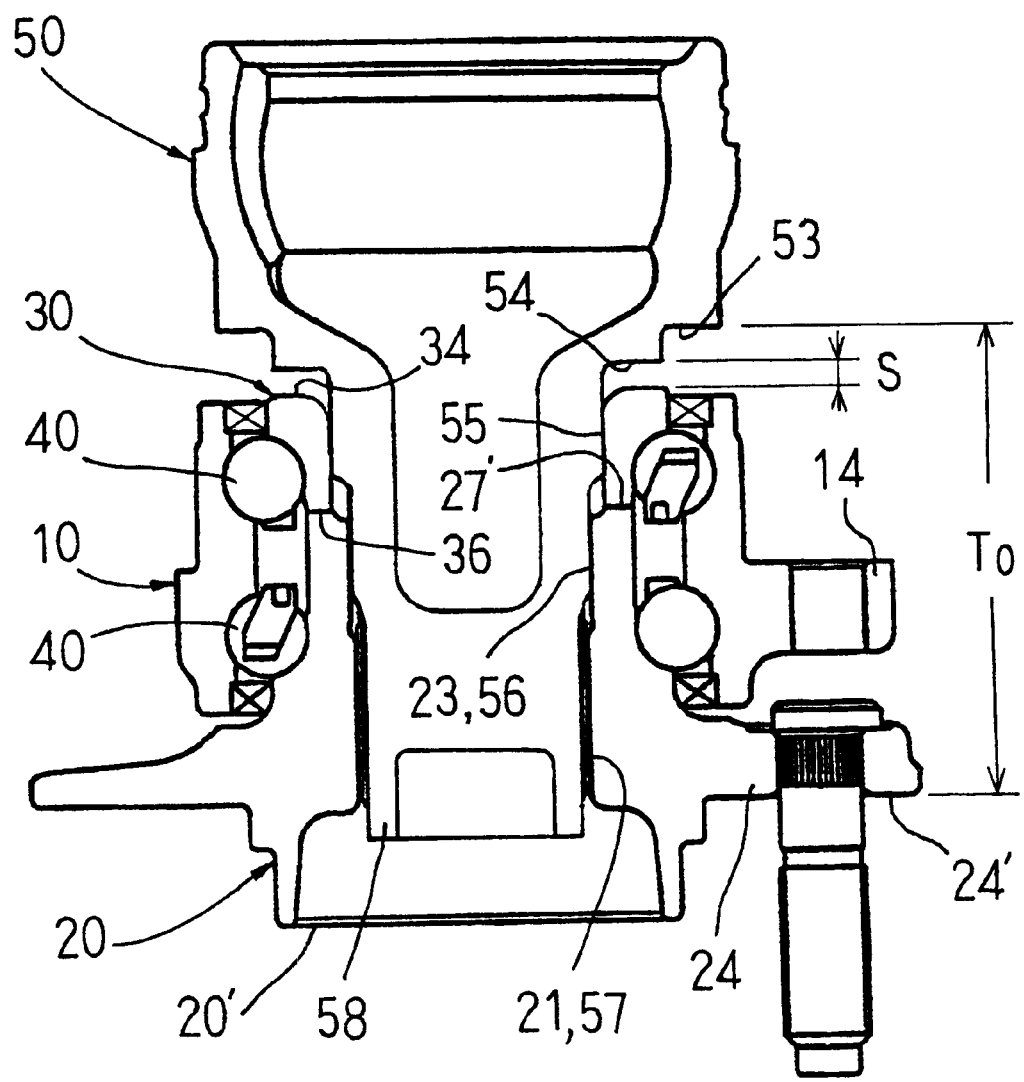
FIG. 32 is a sectional view of a force fitting step of the bearing apparatus of the tire wheel shown in FIG. 31.

At first, in the step of assembling the bearing apparatus of the tire wheel, as shown in FIG. 32, stem portions 55, 56, 57 and 58 of the outer joint member 50 are inserted to the inner track wheel 30 and the axle 20, the spline shaft portion 57 is partly fitted to the spline hole portion 21 of the axle 20, and the force fitting portions 55 and 56 are partly force fitted to the inner track wheel 30 and the force fitting portion 23 of the axle 20, respectively. Then, the force fitting is temporarily stopped before the facing surface 54 of the outer joint member 50 is brought into contact with the large end surface 34 of the inner track wheel 30. (At this time, it is supposed that the end surface 27' of the axle 20 and the small end surface 36 of the inner track wheel 30 are brought into contact with each other.) At this time point, when force fitting the outer joint member 50 to a predetermined position, a predetermined interval S is left between the facing surface 54 of the outer joint member 50 and the large end surface 34 of the inner track wheel 30, and a bearing axial gap is positive. In this state, an axial size $T_0$ between a reference surface (a shoulder surface 53) of the outer joint member 50 and a reference surface (a flange surface 24') of the axle 20 is measured, and an initial bearing axial gap $\delta_0$ is measured from an axial oscillating amount of the outer member 10.

Figure 33:
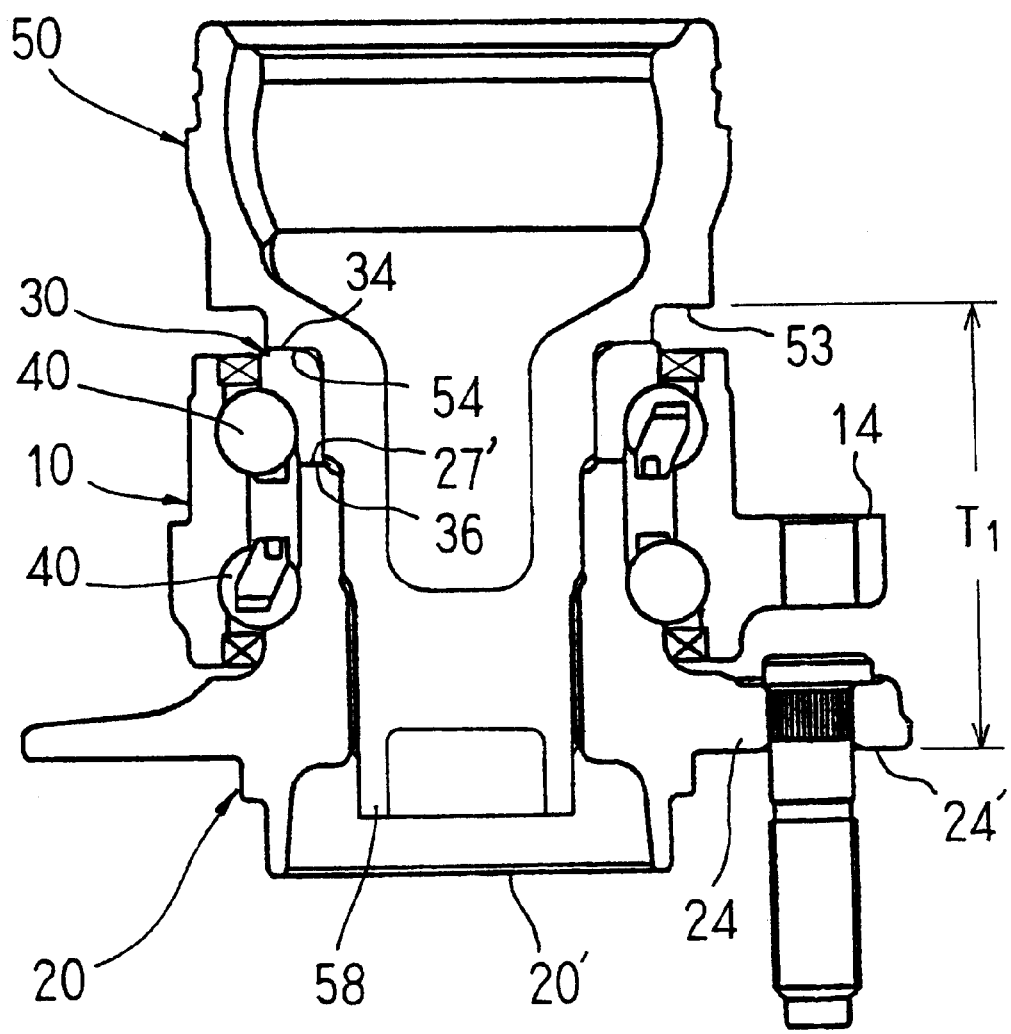
FIG. 33 is a sectional view at a time of completing a force fitting of the bearing apparatus of the tire wheel shown in FIG. 31.

Next, the force fitting is continuously performed, and as shown in FIG. 33, the facing surface 54 of the outer joint member 50 is brought into contact with the end surface 27' of the axle 20 and the force fitting is completed. After completing the force fitting, an axial size $T_1$ between the reference surface 53 of the outer joint member 50 and the reference surface 24' of the axle 20 is measured. Then, a bearing axial gap $\delta_1$ at this time is determined in accordance with the formula $\delta_1=\delta_0-(T_0-T_1)$.

Then, the end portion 58 of the stem portion in the outer joint member 50 is bent and caulked as shown by reference numeral 59 in FIG. 31. Then, an axial size $T_2$ between the reference surface 34 of the inner track wheel 30 after caulking and the reference surface 24' of the axle 20 is measured, and a bearing axial gap $\delta_2$ at this time is determined in accordance with the formula $\delta_2=\delta_1+(T_1-T_2)$.

Thus, an accurate value of the bearing axial gap $\delta_2$ after caulking can be determined on the basis of the actually measured value. Accordingly, it is possible to accurately control an amount of a preload corresponding to the bearing axial gap $\delta_2$.

In this case, as a reference surface for measuring the axial sizes (assembling widths) $T_0$, $T_1$ and $T_2$, a description is exemplified of the case of measuring by setting the flange surface 24' of the flange 24 in the axle 20 and the shoulder surface 53 of the outer joint member 50 to the reference surfaces, however, with respect to the axle 20, the measurement may be performed by setting the end surface 20' to the reference surface, and with respect to the outer joint member 50, the measurement may be performed by providing a new reference surface on an outer diameter.

Figure 34:
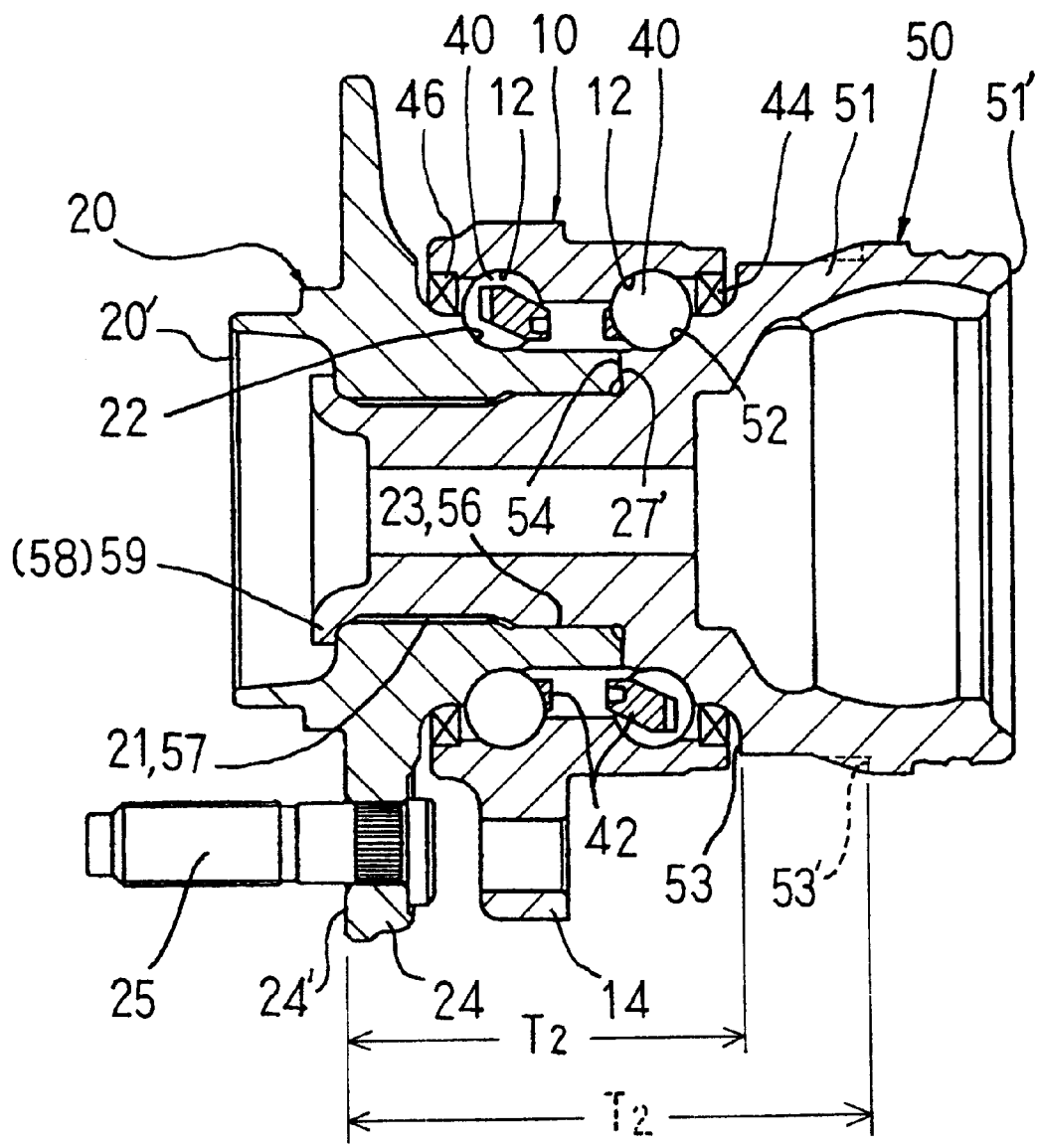
FIG. 34 is a sectional view similar to FIG. 31, showing a different modification.

FIG. 34 shows another modification of a bearing apparatus of a tire wheel for a drive wheel in which an inner wheel track (an inboard side inner race) 52 corresponding to the inner wheel track 32 formed in the inner track wheel 30 is directly formed in the outer joint member 50. That is, the bearing apparatus of the tire wheel is mainly constituted by an outer member 10 having double-rows of outer tracks 12 on an inner periphery, an inner member 20 and 50 having double-rows of inner wheel tracks 22 and 52 on an outer periphery, and double-rows of balls 40 interposed between the outer wheel track 12 and the inner wheel track 22 and 52 so as to freely roll. The same reference numerals are attached to the same elements as those already described with reference to FIGS. 28 and 31, and an overlapping description will be omitted.

In this case, the inner member 20 and 50 is constituted by an axle 20 and an outer joint member 50 of a constant velocity joint. A force fitting portion 23 for fitting to the outer joint member 50 is formed on an outer periphery of another end side of the axle 20. The outer joint member 50 is force fitted to the force fitting portion 23 of the axle 20 and is fixed in a state of bringing the facing surface 54 into contact with the end surface 27' of the axle 20, by caulking the end portion of the stem portion as shown by reference numeral 59. Accordingly, in accordance with the bearing apparatus of the tire wheel, the inner member 20 and 50 integrally formed with the tire wheel is rotatably supported to the outer member 10.

A bearing axial gap 62 in the bearing apparatus of the tire wheel in accordance with this embodiment can be actually measured in a step of assembling the bearing apparatus of the tire wheel without using the torque and the other parameters basically in the same manner as that of the case of the embodiments mentioned above, and a preload of the bearing apparatus of the tire wheel can be properly controlled thereby.

Figure 35:
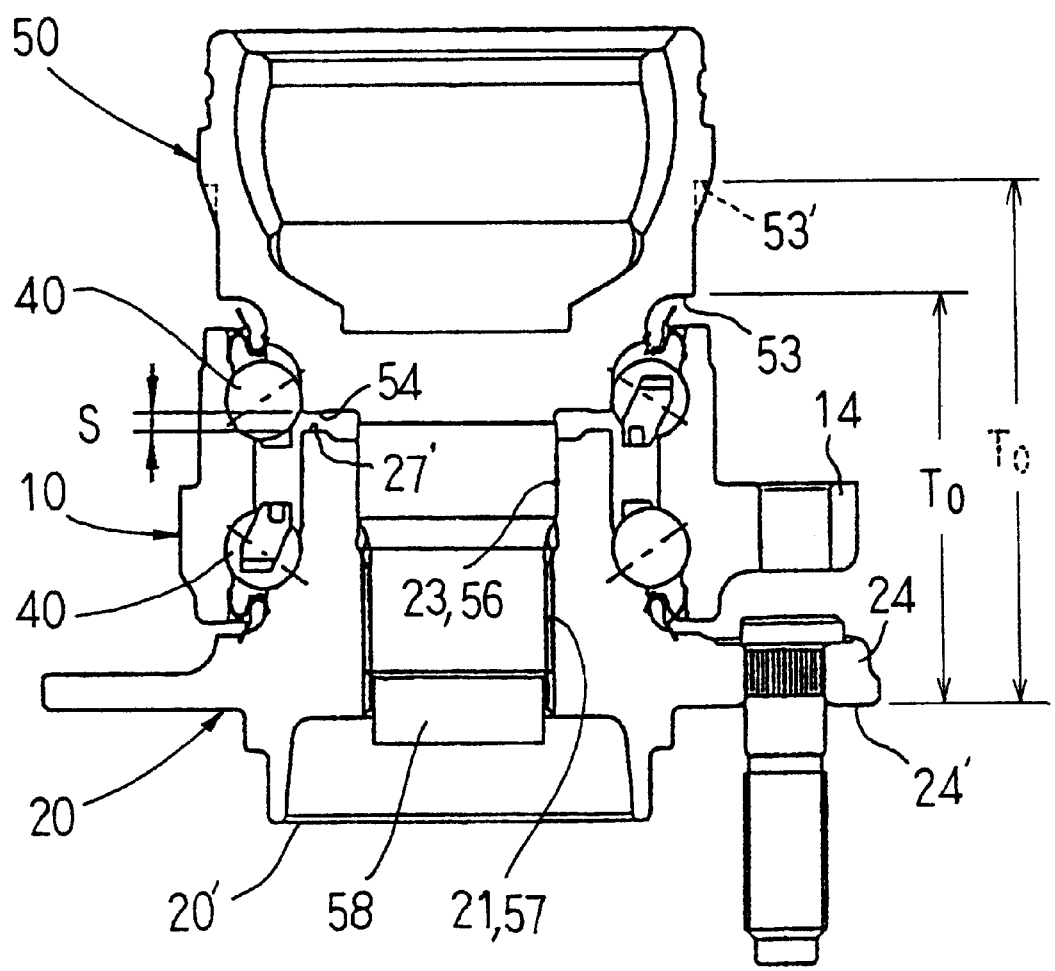
FIG. 35 is a sectional view of a force fitting step of the bearing apparatus of the tire wheel shown in FIG. 34.

At first, as shown in FIG. 35, in the step of assembling the bearing apparatus of the tire wheel, a stem portion of the outer joint member 50 is inserted to the axle 20, the force fitting portion 56 and the spline shaft portion 57 are partly inserted to the force fitting portion 23 of the axle 20 and the spline hole portion 21 respectively, and the force fitting is temporarily stopped before the facing surface 54 of the outer joint member 50 is brought into contact with the end surface 27' of the axle 20. At this time point, a predetermined interval S is left between the facing surface 54 of the outer joint member 50 and the end surface 27' of the axle 20, and a bearing axial gap is positive. In this state, an axial size $T_0$ between a reference surface (a shoulder surface 53) of the outer joint member 50 and a reference surface (a flange surface 24') of the axle 20 is measured, and an initial bearing axial gap $\delta_0$ is measured from an axial oscillating amount of the outer member 10.

Figure 36:
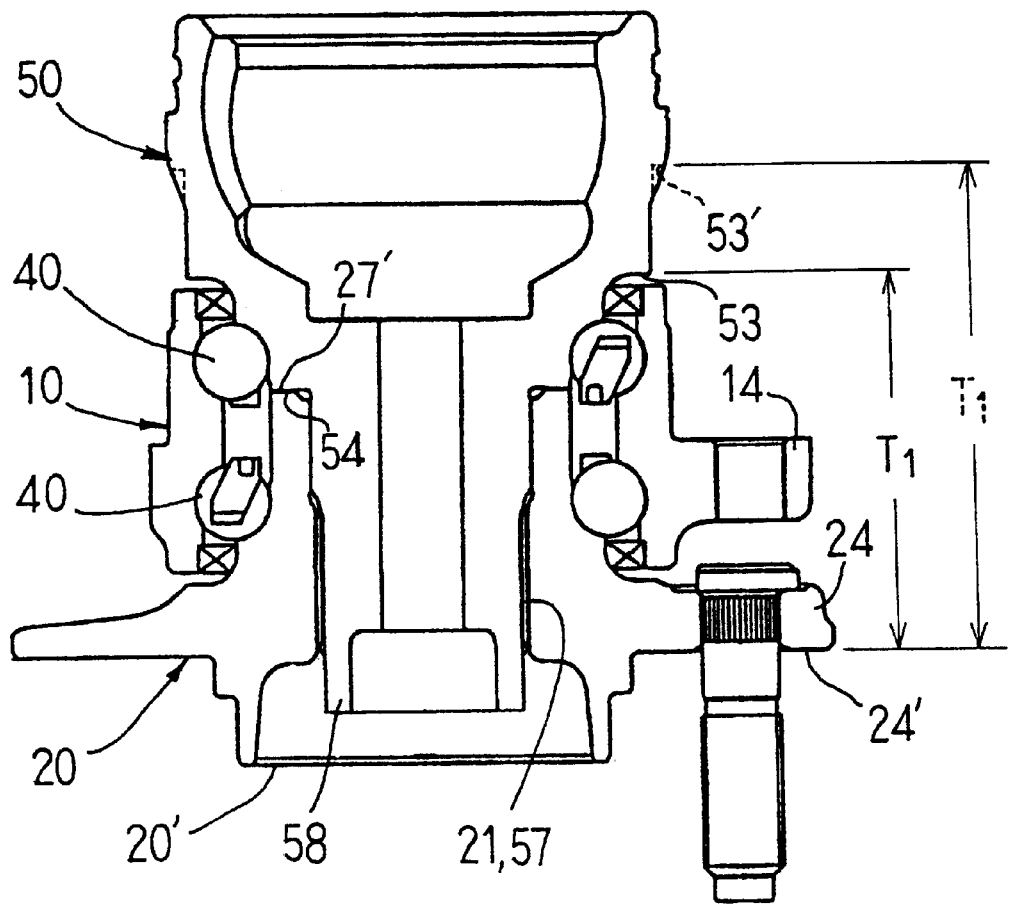
FIG. 36 is a sectional view at a time of completing a force fitting of the bearing apparatus of the tire wheel shown in FIG. 34.

Next, the force fitting is continuously performed, and as shown in FIG. 36, the facing surface 54 of the outer joint member 50 is brought into contact with the end surface 27' of the axle 20 and the force fitting is completed. After completing the force fitting, an axial size $T_1$ between the reference surface 53 of the outer joint member 50 and the reference surface 24' of the axle 20 is measured. Then, a bearing axial gap $\delta_1$ at this time is determined in accordance with the formula $\delta_1 = \delta_0 - (T_0 - T_1)$.

Figure 37:
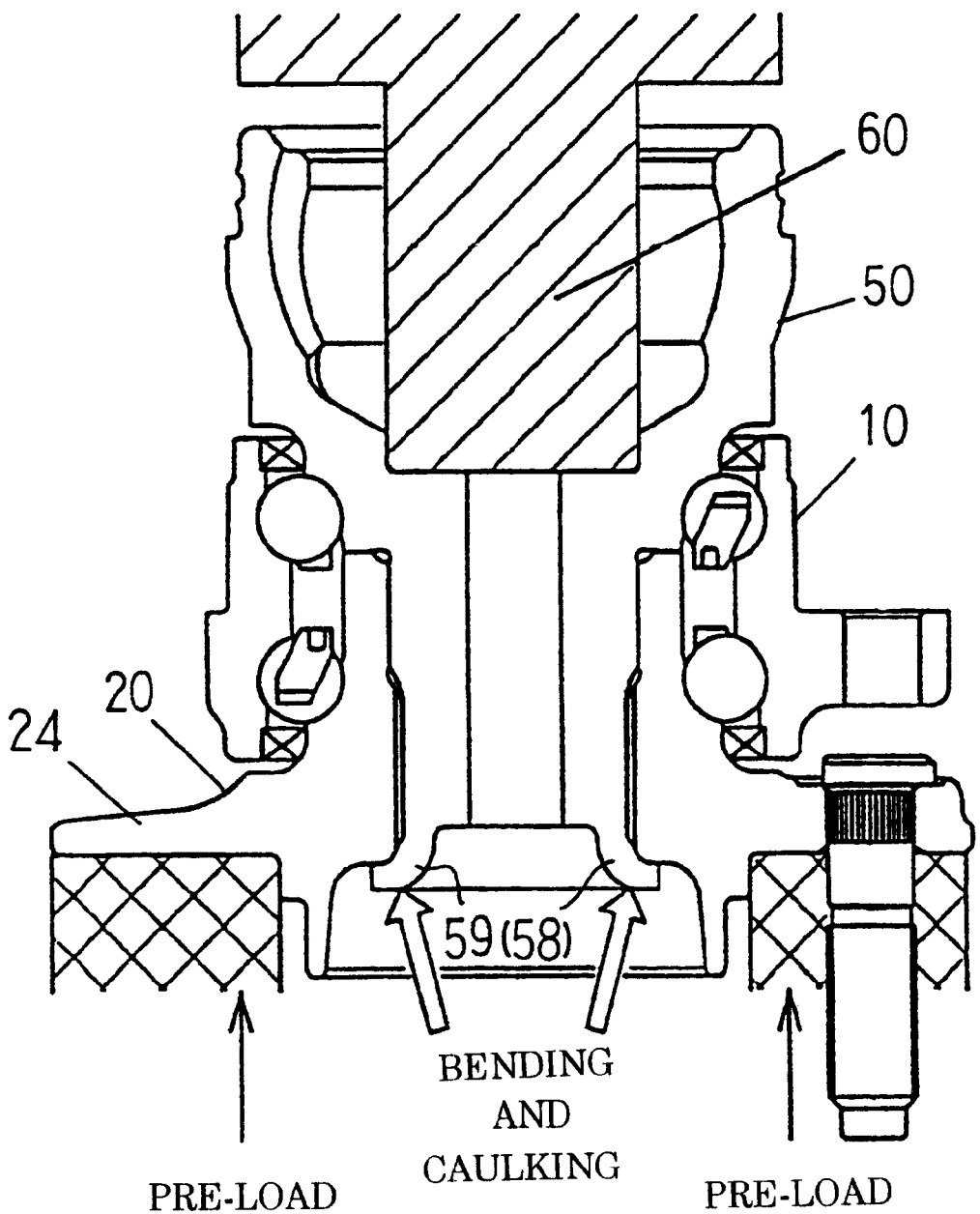
FIG. 37 is a sectional view exemplifying a caulking process method.

Then, as shown in FIG. 37, in a state of retaining the outer joint member 50 by a receiving table 60 for retaining the preload and the force fitting force, the preload is applied by pressing the flange 24 of the axle 20, and the end portion 58 of the stem portion in the outer joint member 50 is bent and caulked as shown by reference numeral 59. Then, an axial size $T_2$ between the reference surface 53 of the outer joint member 50 after caulking and the reference surface 24' of the axle 20 is measured (FIG. 34), and a bearing axial gap $\delta_2$ at this time is determined in accordance with the formula $\delta_2 = \delta_1 + (T_1 - T_2)$.

Thus, an accurate value of the bearing axial gap $\delta_2$ after caulking can be determined on the basis of the actually measured value. Accordingly, it is possible to accurately control an amount of a preload corresponding to the bearing axial gap $\delta_2$.

Also in this case, as a reference surface for measuring the axial sizes (assembling widths) $T_0$, $T_1$ and $T_2$, a description is exemplified of the case of measuring by setting the flange surface 24' of the flange 24 in the axle 20 and the shoulder surface 53 of the outer joint member 50 to the reference surfaces, however, with respect to the axle 20, the measurement may be performed by setting the end surface 20' in the flange 24 side to the reference surface, and with respect to the outer joint member 50, the measurement may be performed by providing a new reference surface 53' exemplified by a broken line in FIGS. 34 to 36.

Figure 4:
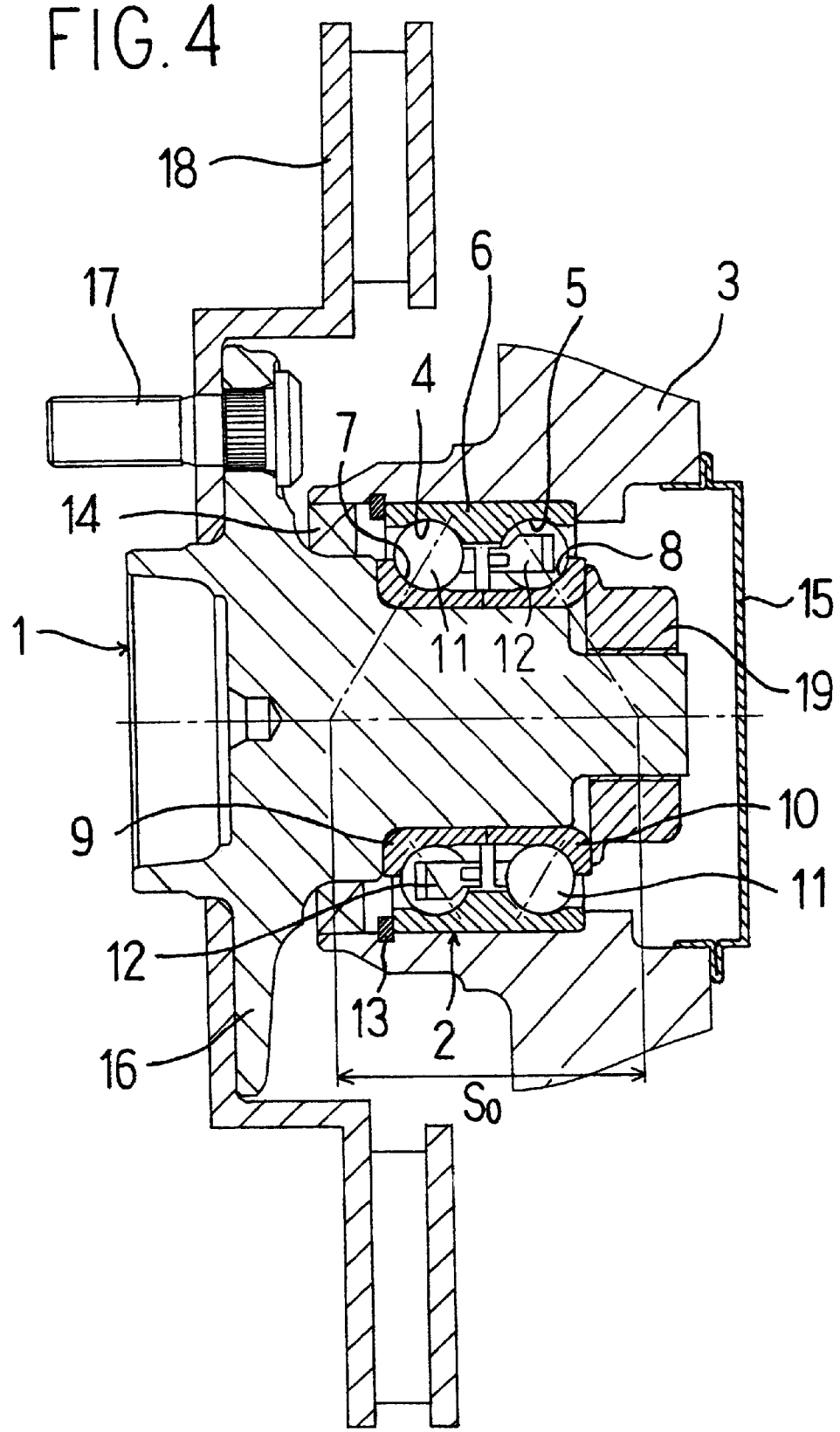
FIG. 4 is a sectional view showing a conventional tire wheel bearing apparatus.
Figure 38:
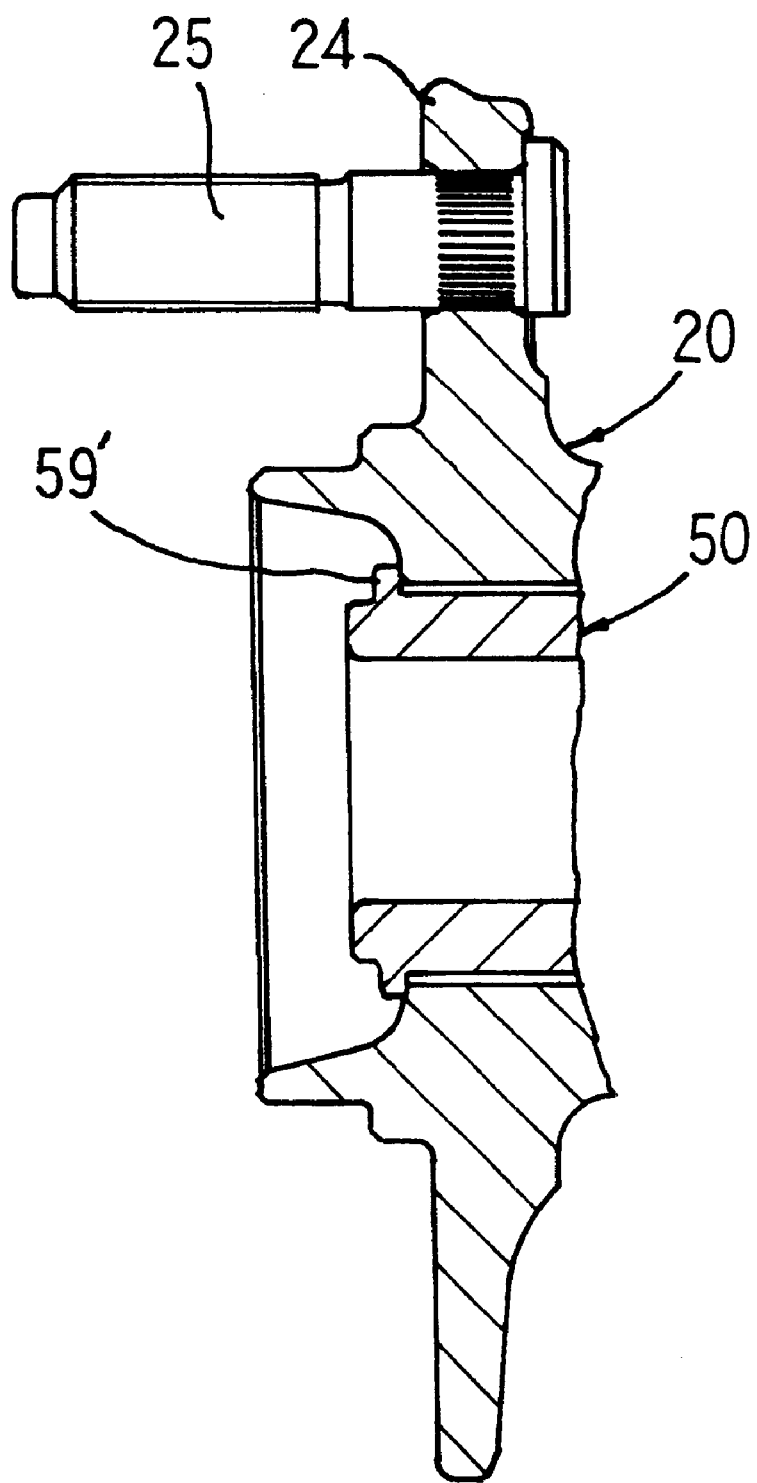
FIG. 38 is a sectional view exemplifying another caulking process method.

Further, as aspects of the caulking process, in addition to the caulking process performed by bending and caulking the end portions 28 and 58 as already mentioned with reference to FIGS. 28, 31, 34 and 37, a caulking process may be performed by drawing the outer periphery of the axial end portion of the outer joint member 50 as shown by reference numeral 59'0 in FIG. 38 as a modified embodiment of the embodiments shown in FIGS. 4 and 7. Of course, it is possible to employ a caulking process with using a so-called swing motion type caulking process apparatus as shown in FIG. 39.

The following basic Japanese Applications are hereby incorporated by reference:

Patent Application No. 11-269037 filed Sep. 22, 1999;
Patent Application No. 11-305865 filed Oct. 27, 1999;
Patent Application No. 11-315927 filed Nov. 5, 1999;
Patent Application No. 11-356430 filed Dec. 15, 1999;
Patent application No.2000-40069 filed Feb. 17, 2000.

What is claimed is:

1. A bearing apparatus for a drive wheel comprising:
a tire wheel bearing portion having an outer member provided with a mounting flange for mounting to a vehicle body on an outer periphery and double-rows of track surfaces on an inner periphery, and an inner member arranged in an inner side of the outer member via a rolling element and provided with a tire wheel mounting flange for mounting a tire wheel and track surfaces on an outer periphery;
a constant velocity joint portion provided at one end of a drive shaft and including an outer joint member having a track groove formed on an inner side, an inner joint member having a track groove corresponding to the track groove of the outer joint member formed, and a ball arranged between both track grooves of the outer joint member and the inner joint member;

one row of the track surfaces of the tire wheel bearing portion being provided on an outer diameter surface of the outer joint member so as to integrally form the tire wheel bearing portion and the constant velocity joint member, wherein a bearing clearance of the tire wheel bearing portion is a negative gap controlled on the basis of a measured value represented by a formula $P_0 > P_1 + P_2$ in a state that the inner member is brought into contact with the shoulder portion of the outer joint member, wherein $P_0$ represents a pitch and groove diameter of the double-rows of track surfaces in the outer member, $P_1$ represents an axial size and groove diameter between the track surfaces and an end surface of the inner member, and $P_2$ represents an axial size between an outer track surface and shoulder portion of the outer joint member.

2. A bearing apparatus for a drive wheel according to claim 1, wherein the track surface is directly formed on an outer diameter surface of the outer joint member.

3. A bearing apparatus for a drive wheel according to claim 1, wherein the bearing clearance is controlled by temporarily stopping a force fitting in a state that the bearing axial gap is positive at a time of integrally forming the outer joint member and the inner member in accordance with a force fitting, calculating a gap (S) between the shoulder portion of the outer joint member and the end surface of the opposing inner member in this state, measuring a bearing axial gap ($\Delta a'$) in this state and thereafter force fitting until the end surface of the inner member is brought into contact with the shoulder portion of the outer joint member, thereby determining a negative bearing axial gap ($\Delta a$) from a formula $\Delta a = \Delta a' - S$.

* * * * *